(12) United States Patent
Lawson et al.

(10) Patent No.: US 9,960,696 B2
(45) Date of Patent: May 1, 2018

(54) SWITCHED-MODE COMPOUND POWER CONVERTER WITH MAIN AND SUPPLEMENTAL REGULATORS

(71) Applicant: CogniPower, LLC, Malvern, PA (US)

(72) Inventors: Thomas E. Lawson, Malvern, PA (US); William H. Morong, Paoli, PA (US)

(73) Assignee: CognilPower, LLC, Malvern, PA (US)

( * ) Notice: Subject to any disclaimer, the term of this patent is extended or adjusted under 35 U.S.C. 154(b) by 0 days. days.

(21) Appl. No.: 15/245,282

(22) Filed: Aug. 24, 2016

(65) Prior Publication Data

US 2016/0365794 A1 Dec. 15, 2016

Related U.S. Application Data

(63) Continuation-in-part of application No. PCT/US2015/041681, filed on Jul. 23, 2015, which is
(Continued)

(51) Int. Cl.
*H02M 3/335* (2006.01)
*H02M 3/158* (2006.01)
(Continued)

(52) U.S. Cl.
CPC ........... *H02M 3/33561* (2013.01); *H02J 3/32* (2013.01); *H02M 1/4258* (2013.01);
(Continued)

(58) Field of Classification Search
CPC ..... H02M 3/335; H02M 3/33515; H02M 1/42
See application file for complete search history.

(56) References Cited

U.S. PATENT DOCUMENTS 6,115,267 A 9/2000 Herbert
6,462,963 B1 10/2002 Wittenbreder
(Continued)

FOREIGN PATENT DOCUMENTS

WO WO2008009025 A2 1/2008
WO WO2013074433 A2 5/2013

OTHER PUBLICATIONS

International Search Report and Written Opinion; dated Oct. 17, 2013 for the corresponding PCT Application No. PCT/US2012/064617.
(Continued)

*Primary Examiner* — Emily P Pham
(74) *Attorney, Agent, or Firm* — Mendelsohn Dunleavy, P.C.; Steve Mendelsohn

(57) ABSTRACT

In certain embodiments, a compound power converter passes the majority of power from input to output through only a single stage of power conversion. At least one embodiment includes a main converter with an auxiliary output. The auxiliary output energizes an energy storage element that provides input power for a supplemental converter capable of supplying the main output. The supplemental converter improves regulation and can provide hold-over power for Power Factor Correction (PFC) or Uninterruptible Power Supply (UPS) operation. In certain embodiments, the power converter has at least one multi-functional inductor that supports both main regulation and supplemental regulation in a time-multiplexed manner such that, during main regulation, input energy is transferred from the input node to the output node via the multi-functional inductor, and, during supplemental regulation, the stored energy is transferred from the at least one energy storage element to the output node via the multi-functional inductor.

30 Claims, 43 Drawing Sheets

Related U.S. Application Data a continuation-in-part of application No. 14/711,869, filed on May 14, 2015, now Pat. No. 9,455,643, which is a continuation-in-part of application No. 14/347,722, filed as application No. PCT/US2012/064617 on Nov. 12, 2012.

(60) Provisional application No. 62/029,663, provisional application No. 61/559,397, filed on Nov. 14, 2011.

(51) Int. Cl.
| | | |
|---|---|---|
| *H02J 3/32* | (2006.01) | |
| *H02M 1/42* | (2007.01) | |
| *H02M 3/156* | (2006.01) | |
| *H02M 1/00* | (2006.01) | |

(52) U.S. Cl.
CPC ..... *H02M 3/1584* (2013.01); *H02M 3/33569* (2013.01); *H02M 2001/007* (2013.01); *H02M 2003/1566* (2013.01); *Y02B 70/126* (2013.01); *Y02P 80/112* (2015.11)

(56) References Cited

U.S. PATENT DOCUMENTS

| | | | |
|---|---|---|---|
| 6,504,497 | B2 | 1/2003 | Jang et al. |
| 6,545,883 | B2 | 4/2003 | Xing et al. |
| 7,061,212 | B2 | 6/2006 | Phadke |
| 7,436,159 | B1 | 10/2008 | Wochele |
| 7,642,758 | B2 * | 1/2010 | Morong .............. G05F 1/46 323/206 |
| 7,965,064 | B2 | 6/2011 | Morong et al. |
| 7,978,483 | B2 | 7/2011 | Mazzola et al. |
| 8,344,638 | B2 | 1/2013 | Shteynberg et al. |
| 8,467,199 | B2 | 6/2013 | Lee et al. |
| 8,570,008 | B2 * | 10/2013 | Lawson .............. H02M 3/156 323/225 |
| 8,665,613 | B2 | 3/2014 | Degen et al. |
| 9,455,643 | B2 * | 9/2016 | Lawson .............. H02J 3/32 |
| 2010/0014330 | A1 | 1/2010 | Chang et al. |
| 2010/0039080 | A1 | 2/2010 | Schoenbauer et al. |
| 2010/0265628 | A1 | 10/2010 | Blinder et al. |

OTHER PUBLICATIONS

Non-Final Office Action; dated Nov. 17, 2014 for the corresponding U.S. Appl. No. 14/347,722.

Final Office Action; dated Dec. 24, 2014 for the corresponding U.S. Appl. No. 14/347,722.

Notice of Allowance and Fee(s) Due; dated Mar. 17, 2015 for the corresponding U.S. Appl. No. 14/347,722.

International Search Report and Written Opinion; dated Nov. 4, 2011 for the corresponding PCT Application No. PCT/US2015/041681.

Non-Final Office Action; dated Apr. 6, 2016 for U.S. Appl. No. 14/711,869.

Notice of Allowance; dated May 31, 2016 for U.S. Appl. No. 14/711,869.

* cited by examiner

SWITCHED-MODE COMPOUND POWER CONVERTER WITH MAIN AND SUPPLEMENTAL REGULATORS

This is a continuation-in-part of co-pending PCT application serial number PCT/US15/41681 filed on Jul. 23, 2015, which is a continuation-in-part of co-pending application Ser. No. 14/711,869 ("the '869 application"), filed on May 14, 2015, which is a continuation-in-part of co-pending application Ser. No. 14/347,722 ("the '722 application"), filed on Mar. 27, 2014, which claims the benefit of the filing dates of U.S. provisional application No. 61/559,397, filed on Nov. 14, 2011, and PCT application no. PCT/US12/64617, filed on Nov. 12, 2012, the teachings of all four of which are incorporated herein by reference in their entirety. The '869 application claims the benefit of the filing date of U.S. provisional application No. 62/029,663, filed on Jul. 28, 2014, the teachings of which are incorporated herein by reference in their entirety.

BACKGROUND

Field of the Invention

The present invention is related to electronics and, in particular, to AC/DC and AC/AC conversion.

Description of the Related Art

Energy Star mandates now require Power Factor Correction (PFC) for power supplies of 75 Watts and above. If trends continue, future requirements will be even more strict and will extend to lower-power devices.

Regulation of switched mode power converters is complicated by the phase shift implicit in an output filter. More filtration improves regulation under steady state conditions, but causes more delay in the feedback path. That delay complicates regulation under dynamic conditions. The performance of Pulse Width Modulated (PWM) converters is therefore a compromise between agility and stability. Morong et al. (U.S. Pat. Nos. 7,642,758 B2 and 7,965,064 B2) provide improved dynamic performance over PWM through prediction, but a real-time calculation burden is imposed.

One other technique to improve regulation is to load extra energy into the switched inductor. Bordillion (U.S. Pat. No. 6,552,917 B1) suggests energizing to an excess inductive current and recovering that excess energy on the primary side of the power converter at the end of each chopping cycle. That approach helps to solve the regulation problem, but incurs inefficiency because a portion of the inductive energy moves from primary to secondary, and then from secondary to primary to storage, without performing useful work.

Re-regulation is another approach. Placing a second, cascaded regulator after the first converter will surely improve regulation, but a second stage of power conversion may double the losses. A linear regulator can be employed, but reduced efficiency cannot be avoided. Others have proposed adding an auxiliary power supply to a flyback converter, including Webb et al. (U.S. Pat. No. 6,775,159 B2). The auxiliary supplies proposed are intended to power other circuitry, or to help produce the voltages needed for driving various power switches.

Most power converters with power factor correction (PFC) use a line filter followed by a diode bridge. These systems all incur diode losses in the bridge. A bridgeless, inductive, resonant approach is described by Cuk in U.S. Patent Application 2010/0259240 A1. Large inductors are needed to resonate at line frequencies. These converters have heretofore proven difficult in practice, so topologies using capacitive storage instead of inductive storage are seen as more desirable.

A preferred approach for higher power and higher efficiency PFC employs an active bridge, where two of the rectifier diodes are replaced by switches commutated at a frequency much higher than line frequency, allowing much smaller inductors. The active bridge has the advantage of removing one diode, and the associated diode drop, from the current path. Two diodes are eliminated if bipolar blocking switches are employed. For these reasons, active bridge systems have an advantage for performing PFC at high efficiency.

Conventionally, active bridge systems use a flyback stage regulated to perform PFC, producing an intermediate voltage of hundreds of volts stored in a capacitor. The stored energy is then down-converted using a buck converter to produce a regulated output. In such a system, all the power moves through the two cascaded conversion stages.

Several inventors have proposed a means of storing energy in a capacitor on the AC side of the isolation barrier. For example, in U.S. Pat. Nos. 6,952,354 and 7,061,776, Yang et al. propose adding an additional switch, an inductor, and three additional diodes to control the movement of power into and out of a storage capacitor in a single-stage topology. In addition to the extra complexity, all the power converted must traverse an extra semiconductor junction and the stored energy must pass through the extra inductor. In U.S. Patent Application No. 2004/0156217 A1, Phadke proposes adding an extra transformer winding, two diodes, and two extra switches in addition to the storage capacitor. Sufficient energy can then be stored in the capacitor to regulate the output voltage, but the storage voltage interacts with the AC line voltage to complicate the PFC control function. Also, since the flyback energy is divided between the output and the storage function, a mechanism must be provided to prevent the storage function from degrading the output regulation. Greater complexity or poor output regulation is the result. Others propose adding a second stage for re-regulation to address these shortcomings, but in so doing, defeat the purpose of building a regulated single-stage PFC controller.

There are examples in the prior art of single-inductor, multiple-output, switched-mode power converters. Li (U.S. Pat. No. 6,075,295), Caine (U.S. Pat. No. 4,847,742), and Gorder et al. (U.S. Pat. No. 5,617,015) describe controls to exactly balance the inductor energy loaded during the energize portion of the chopping cycle with the aggregate demand of the outputs. A limitation of non-predictive flyback or forward converters is that the energize termination is based on past or present conditions, but the energy transfer outcome depends on future conditions. That fact fundamentally limits regulation. The existence of multiple output voltages makes this form of regulation even more challenging. In addition, none of these multiple-output power converters have the capability to perform PFC.

Zero current switching is described by Vinciarelli in U.S. Pat. No. 4,415,959. Zero current switching is achieved by moving energy in discrete, quasi-resonant quanta.

AC powered converters increasingly require Power Factor Correction (PFC) for system efficiency and to conform to mandates. Power converters generally require an extra stage of power conversion to achieve near-unity Power Factor. There is a need for simple, efficient AC input power converters with near-ideal Power Factor that can replace physically larger and more costly two-stage converters.

SUMMARY

Certain embodiments of the present invention provide a switched-mode power converter comprising a main converter that powers an output and also powers an energy-storage element. According to these embodiments, energy from the energy-storage element also powers the converter output through a supplemental converter or regulator, responsive to control circuitry. This form of power converter is here referred to as a compound converter.

The energy-storage element may comprise a capacitor, a super capacitor, a battery, an inertial storage device, or another form of energy storage device. Note that a super capacitor is a particular type of capacitor.

Energy from the storage device may be used to power the converter output when input power to the converter is interrupted, or to meet peak power demands, or to reduce ripple.

The converter of certain embodiments of this invention may be powered from a DC or a rectified AC source. Energy from the storage element may be used to facilitate PFC when an embodiment of this invention is powered by an AC source.

The converter of certain embodiments of the present invention may also comprise circuitry to provide multiple voltages, or oppositely polled voltages at the output, or to provide an AC output at a variable frequency.

The compound converter technology can be used to provide PFC capability for power supplies of 75 Watts and above. In addition, the compound converter technology offers a way to add PFC capability to lower-power devices with stringent size and cost constraints.

In certain embodiments, the invention is an article of manufacture comprising a controller (e.g., CONTROL of FIG. 1) for a power converter for converting input power into regulated output power. The power converter comprises (a) the controller, (b) an input node (e.g., VOLTAGE IN of FIG. 1) configured to receive the input power, (c) a first output node (OUTPUT of FIGS. 1-2; OUT of FIGS. 36, 38, 40-43) configured to provide the regulated output power, (d) a first inductive element (e.g., L1 of FIG. 1; T1 of FIG. 2; T of FIGS. 36, 38, 40-43), (e) a first supplemental energy storage element (e.g., CSTOR of FIGS. 1-2; CS of FIGS. 36, 38, 40-41; CP of FIGS. 42-43), (f) a first energy gating element (e.g., S1 of FIGS. 1, 36, 38, 40-43; S1/S2 of FIG. 2) configured to enable the first inductive element to be energized from the input node, and (g) a supplemental regulator (e.g., SUPPLEMENTAL REGULATOR of FIG. 1; BUCK of FIG. 2; L, S3, and D2 of FIG. 36; L, S3, and S4 of FIG. 38; L, D4, S3, and S4 of FIGS. 40-41; L2, S2, S3, and D2 of FIG. 42; L2, S2, S3, S4, and D2 of FIG. 43) configured to enable energy to be transferred from the first supplemental energy storage element to the first output node. The controller is configured to provide (i) an input-to-output power path in which energy flows from the input node to the first output node via the first inductive element; (ii) an input-to-storage power path in which energy flows from the input node to the first supplemental energy storage element via the first inductive element; and (iii) a storage-to-output power path in which energy flows from the first supplemental energy storage element to the first output node via the supplemental regulator. The controller is configured to actively control whether energy flows from the first inductive element to (i) the first output node or (ii) the first supplemental energy storage element.

DETAILED DESCRIPTION

Figure 1:
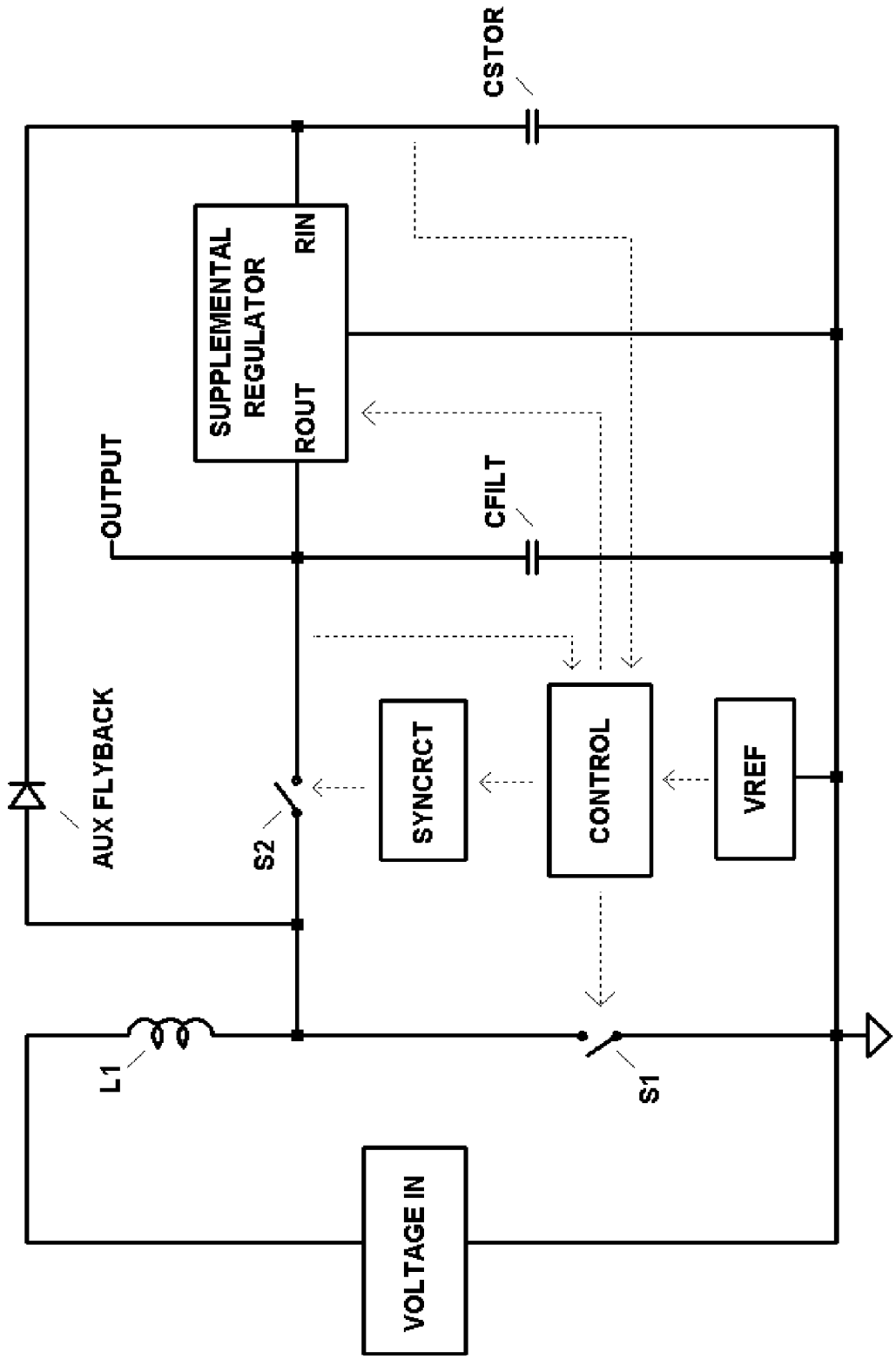
FIG. 1 illustrates one embodiment of the inventive compound power converter.

In one embodiment, the invention comprises a main switched mode power converter that passes the majority of the power and a subordinate converter that provides supplementary power, when needed. The source of supplemental energy is a second output voltage. The second voltage is held in a storage capacitor, usually charged to a voltage higher than the output voltage by an auxiliary path which includes a diode or switch. Disabling the main converter rectifier at the point of output regulation causes inductive energy to pass through the diode or switch into the storage reservoir. In this topology, a mechanism for regulating the main output is also the mechanism for generating the auxiliary output voltage.

The supplemental converter can be of any sort, including linear. The supplemental converter can then provide additional power, if needed, by moving energy from the storage capacitor to the output. Given the overriding control of the main synchronous rectifier and an alternate destination for excess inductive energy, it is not necessary to precisely meter the energy placed in the switched inductor during the energize portion of the switching cycle in order to achieve excellent regulation. The main converter regulation is local and immediate.

When the supplemental converter is a buck converter, the additional components may be an inductor, a diode, and a switch with control. The frequency of operation can be independent of the main flyback converter, or can be synchronous. The supplemental regulator can regulate to a slightly lower point than the main flyback converter. Control of the energize time will keep the reservoir voltage within bounds. The energize time control can be slow and approximate, because an exact reservoir voltage is not required, and the reservoir voltage can, by nature, change only slowly. The control for the supplemental buck converter can be energizing until the output reaches a set point, or the control can be based on predictive energy balancing for best regulation.

The compound structure of certain embodiments of the present invention may appear to add complexity, but in practice it can allow a reduction in size, cost, and parts count, in addition to improving efficiency. One embodiment, a power adapter with PFC, illustrates how a compound converter can replace cascaded converters to good advantage.

A conventional AC-DC power adapter with Power Factor Correction (PFC) comprises a flyback converter followed by a buck converter. In that topology, the power passes through two stages of conversion in series, each with commensurate losses. In a compound converter, the majority of energy is moved only once, (usually) through the flyback path. In one embodiment, a transformer used in the flyback mode provides the isolation barrier for the AC line. This embodiment employs an active bridge for high efficiency. To minimize the number of power switching elements, the active bridge directly energizes one of two primary windings on the flyback transformer. The two polarities of input current are detected and routed to the correctly polarized primary winding. Note that the same result could be achieved in a variety of functionally equivalent mechanisms, including a split secondary winding or by employing extra switches to steer currents appropriately to or from a single winding. In one embodiment, a nearly constant on-time control guarantees that the current and voltage at the AC input stay in phase. The on-time control is filtered so that the on-time cannot change substantially during a single AC cycle, but can provide the appropriate on-time after a number of AC cycles. Because the commutation period is very short compared to the AC line period, a small inductive line input filter may be used to average the input current. On the isolated side, energy is transferred first to the load until the regulation point is reached, and then to a storage capacitor, if extra inductive energy remains. Whenever the regulation point is not reached, there is no excess inductive energy, so the storage capacitor is not charged.

A supplemental buck converter can operate in synchrony, or totally independently. It can regulate the DC output to a voltage that may be an amount lower than the flyback regulation voltage. If the DC output falls below the buck regulation point, then the buck converter will supply energy to the output. In this fashion, a majority of the energy can pass directly from the input to the output through a single flyback stage of power conversion. Energy transferred by that stage passes through a minimum number of semiconductors and dissipative components for higher efficiency. During the portion of the AC cycle when not enough energy can be transferred by the flyback converter, the supplemental buck converter provides the energy shortfall. Energy provided by the buck converter has passed through two stages of power conversion, so greater losses are incurred. Nonetheless, most of the energy can pass directly from input to output through the flyback stage alone.

The buck converter can be used to minimize ripple or to improve regulation. The supplemental buck converter can be adaptively controlled to maximize efficiency by providing holdover power only when needed, or can be controlled to minimize ripple. In an Uninterruptible Power Supply (UPS) application, only the buck converter would deliver power when operating from the back-up DC power source.

This design has been tested in SPICE. The graphs of voltage and current presented were generated by SPICE.

FIG. 1 shows a compound power converter according to one embodiment of this invention. Inductor L1 is energized from power source VOLTAGE IN when circuitry of control block CONTROL closes switch S1. CONTROL block enables synchronous rectifier SYNCRCT which closes switch S2 while energy is available until the output reaches the regulation point. Capacitor CFILT filters the flyback OUTPUT. Whenever the regulation point is reached, switch S2 opens and inductor L1 flies back so that diode AUX FLYBACK becomes forward biased and augments the energy in capacitor CSTOR. CONTROL block maintains a substantially constant ON time for switch S1. That ON time is slowly modulated by the voltage on capacitor CSTOR to keep the storage voltage within bounds. The SUPPLEMENTAL REGULATOR can be of any sort. The SUPPLEMENTAL REGULATOR is powered from regulator input RIN. It can supply the OUTPUT through regulator output ROUT should the flyback path fail to do so. The SUPPLEMENTAL REGULATOR requires a minimum load to allow CONTROL block to keep CSTOR from rising above the upper limit. The relative contributions of the flyback path and the SUPPLEMENTAL REGULATOR can be adjusted by the CONTROL block through setting their relative regulation points. If the SUPPLEMENTAL REGULATOR turns on near the trough of the OUTPUT ripple, then it will contribute a small percentage of the total power. If the SUPPLEMENTAL REGULATOR turns on near the peak of the OUTPUT ripple, then it will contribute a larger percentage of the total power to the OUTPUT. The synchronous rectifier, SYNCRCT, can be omitted should a diode be placed in series with switch S2 to provide rectification.

For the circuit in FIG. 1, VOLTAGE IN cannot exceed the voltage at CSTOR for proper operation. If the capacity of CSTOR is large, then current-limiting of VOLTAGE IN may be needed.

Figure 2:
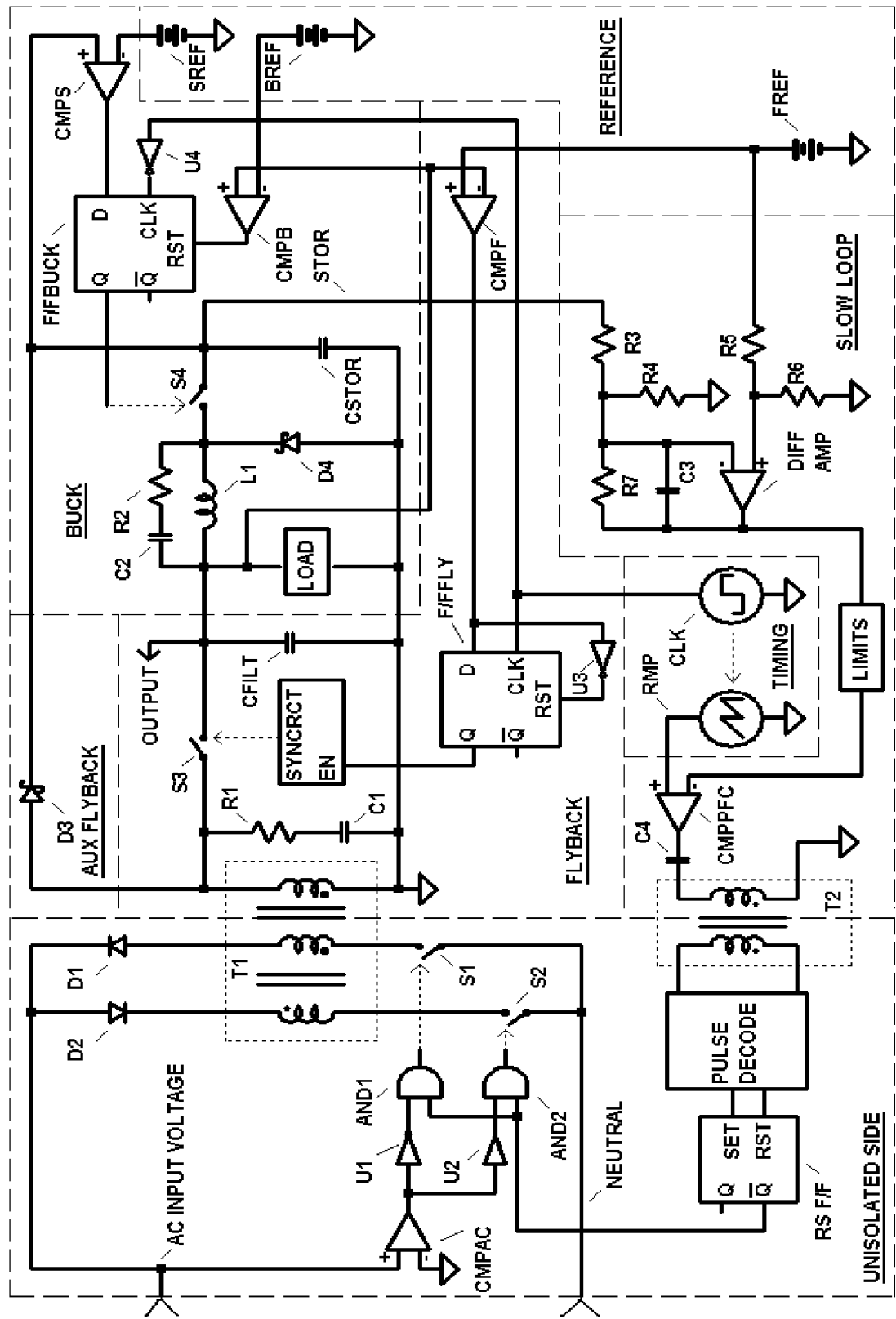
FIG. 2 illustrates one embodiment of a PFC power adapter using a compound converter.

FIG. 2 shows one embodiment of the present invention. The circuitry on the unisolated side of the isolation barrier relates to the NEUTRAL connection on the AC line. The energize portion of the flyback conversion cycle is under the control of the bistable flip-flop, RS F/F. That bistable is set and reset by circuits on the right hand side of the isolation barrier through pulse transformer T2. Note that the constant-on-time control of the unisolated circuitry does not need to be synchronous with the operation of the isolated side, though synchronization results in smoother operation.

The converter seen on the right-hand side of the isolation barrier includes a conventional flyback converter FLYBACK, utilizing a synchronous rectifier SYNCRCT, switch S3, a filter capacitor CFILT, and associated circuitry. The synchronous rectifier includes an enable input, EN, which, when set to logic 0 (i.e., disabled), causes switch S3 to be opened. When the synchronous rectifier is disabled while energy remains in the inductor T1, the flyback voltage rises to forward bias the AUX FLYBACK diode D3 through which energy is stored in capacitor CSTOR.

A more detailed explanation follows, beginning at the UNISOLATED SIDE. Comparator CMPAC responds to the polarity of the AC INPUT VOLTAGE. When the AC input voltage is negative, inverter U1 applies a logic 1 to gate AND1 so that switch S1 can be turned on, responsive to bistable RS F/F. When the AC input voltage is positive, buffer U2 applies a logic 1 to gate AND2 so that switch S2 can be turned on, responsive to bistable RS F/F. The result is that either switch S1 or switch S2 turns on when bistable RS F/F is set. The switch is selected to cause the correct polarity of current to flow in transformer T1. Transformer T1 may have a turns ratio other than one. In this example, the primary inductance is ten times the secondary inductance. Diodes D1 and D2 are needed only if switches S1 and S2 are not bipolar blocking. If, for example, bipolar blocking GaN switches were used for switches S1 and S2, diodes D1 and D2 would be omitted.

The combination of the PULSE DECODE block and bistable RS F/F serve to reconstruct the output of comparator CMPPFC as differentiated by capacitor C4, and passed to the UNISOLATED SIDE by transformer T2 at the Q output of bistable RS F/F. A negative edge at comparator CMPPFC is decoded by the PULSE DECODE block to produce a RST pulse at bistable RS F/F. A positive edge at comparator CMPPFC is decoded by the PULSE DECODE block to produce a SET pulse at bistable RS F/F. Comparator CMPPFC always switches to zero on the positive edge of conversion clock CLK, because ramp generator RMP falls to zero at that time, but circuit block LIMITS prevents the DIFF AMP output from falling below a minimum voltage. By that means, bistable RS F/F is always cleared at the rising edge of conversion clock CLK. Bistable RS F/F is set when ramp generator RMP exceeds the limited output of DIFF AMP. The Comparator CMPPFC sets a nearly constant ON time responsive to the difference between (i) the flyback reference FREF in the REFERENCE block and (ii) the storage voltage STOR. This feedback path is here labeled as SLOW LOOP. DIFF AMP, through the ratios of R3 to R4, and R5 to R6, produces a signal proportional to the difference from the desired relationship of STOR to FREF. Resistor R7 sets the gain of DIFF AMP, slowed by filter capacitor C3. In the example shown, the storage voltage STOR regulates approximately 20 Volts above the reference FREF. The output of DIFF AMP is clamped between preset limits by control block LIMITS. The LIMITS block can be fixed or dynamic. By clamping the output voltage of DIFF AMP, the LIMITS block acts to determine the minimum and maximum ON time allowed for switches S1 and S2. The limited output of DIFF AMP is compared to ramp generator RMP by comparator CMPPFC. The ramp generator signal RMP is preferably synchronous with the conversion clock CLK, as indicated in the TIMING block. The higher the voltage at comparator CMPPFC, the longer the energize period, and the more energy is loaded into transformer T1. When the storage voltage STOR is above the set point, the output of DIFF AMP is reduced, reducing ON time. In like fashion, when the storage voltage STOR is below the set point, ON time is increased. Filter capacitor C3 prevents the ON time signal CMPPFC from varying enough during a single cycle of the AC line to degrade the PFC performance.

Resistor R1 and capacitor C1 suppress spikes on the flyback winding of transformer T1. Bistable F/FFLY controls the enable input EN of the synchronous rectifier control SYNCRCT. The conversion clock CLK latches the output of comparator CMPF into bistable F/FFLY at the start of each conversion cycle. If the output voltage OUTPUT, is below the reference voltage FREF, then the enable EN will be set, allowing the synchronous rectifier control to act. If, at any time, comparator CMPF determines that OUTPUT has exceeded reference FREF, then bistable F/FFLY is cleared through inverter U3, which in turn disables the SYNCRCT control.

In one embodiment, the storage voltage STOR is used to provide holdover power to LOAD during zero crossings of the AC input voltage. A BUCK converter comprised of a two-terminal inductor L1, switch S4, and diode D4, moves energy from the higher storage voltage STOR to the OUTPUT. Resistor R2 and capacitor C2 suppress spikes at the inductor L1. A control loop, described below, operates the buck converter switch S4. The buck converter can be synchronous or asynchronous with the flyback converter. In this case, inverter U4 causes the buck stage to operate synchronously, but out of phase, with the flyback stage by inverting the conversion clock signal CLK before it is applied to the clock input of bistable F/FBUCK. Note that the duty cycle of conversion clock CLK can be varied to optimize the interaction of the two stages. The buck stage is enabled by sufficient voltage STOR, as determined by comparator CMPS. When voltage STOR exceeds voltage reference BREF by at least voltage SREF, comparator CMPS presents data of one to bistable F/FBUCK. When the output of bistable F/FBUCK is one, switch S4 closes to energize inductor L1 from capacitor CSTOR. Energizing continues until OUTPUT exceeds reference BREF, as determined by comparator CMPB. Comparator CMPB resets bistable F/FBUCK when the set point is reached. The current remaining in inductor L1 is recovered through diode D4, in conventional fashion.

Diodes D3 and D4 could optionally be replaced with synchronous rectifiers for improved efficiency. Switches S1, S2, S3, and S4 could optionally be replaced by saturable inductors. Capacitor CSTOR can be as small as capacitor CFILT, or as large as practical, or can be replaced by rechargeable batteries or other bidirectional storage medium. Larger values for capacitors CSTOR and CFILT will not cause destabilizing phase shift. Best values for inductance and capacitance depend on operating frequency and performance requirements. Flyback and buck operation can be discontinuous or not. Smoothest dynamic response is obtained with discontinuous operation. The relative values of references FREF, BREF, and SREF, and the settings in the LIMITS control, provide generous means for converter optimization.

Figure 3:
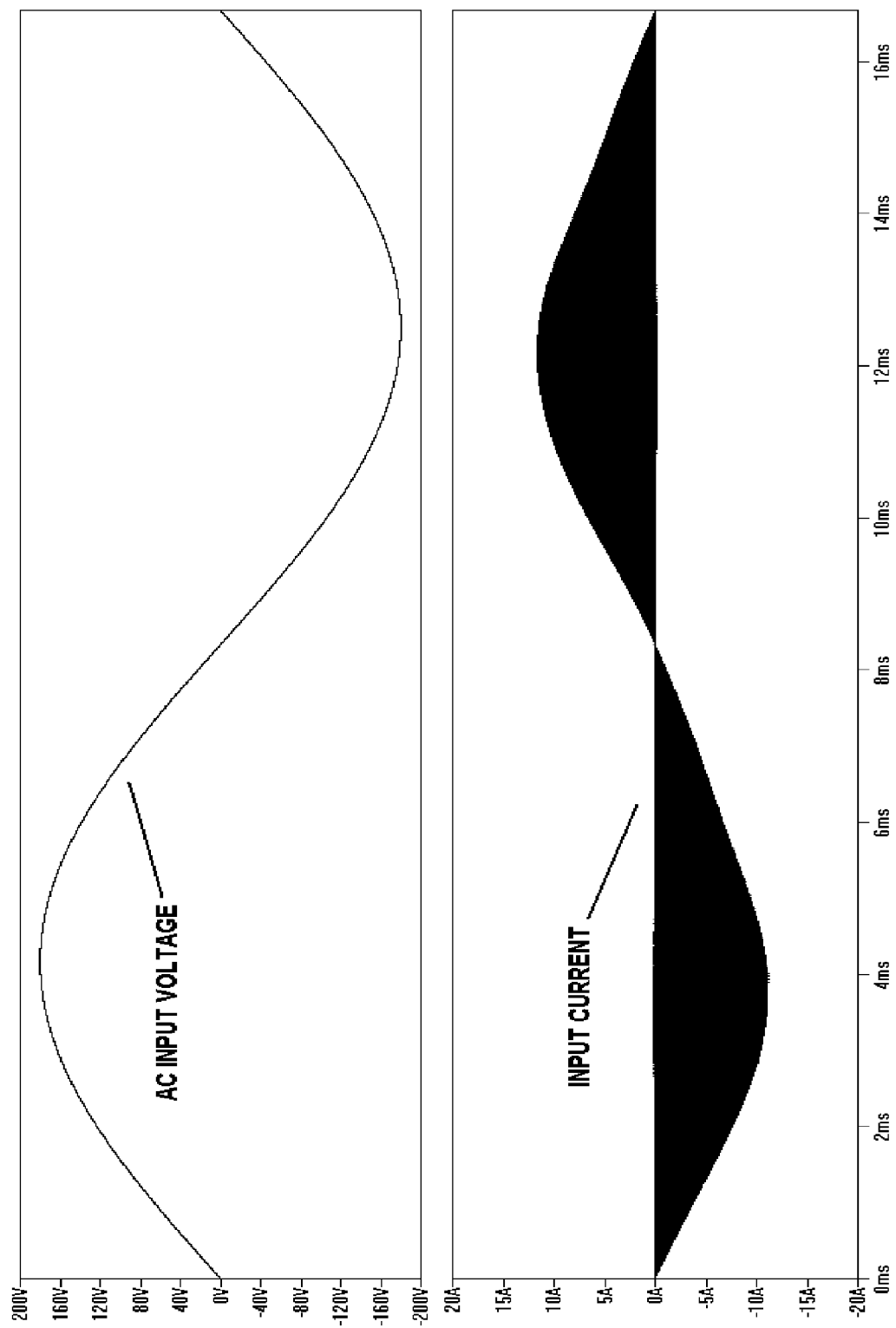
FIG. 3 shows the simulated performance of the PFC function of the circuit in FIG. 2.

FIG. 3 shows the performance of the PFC function, where input current is admitted in proportion to an AC input voltage. A minimal inductive line input filter will smooth the input current pulses that occur at the switching frequency and will leave a sinusoid current waveform in phase with the AC input voltage as the INPUT CURRENT waveform. The upper trace is the AC INPUT VOLTAGE itself. The converter is here operating at full load throughout the AC cycle. The slight distortion of the INPUT CURRENT waveform seen is due to insufficient time for settling of the storage voltage feedback amplifier DIFF AMP.

Figure 4:
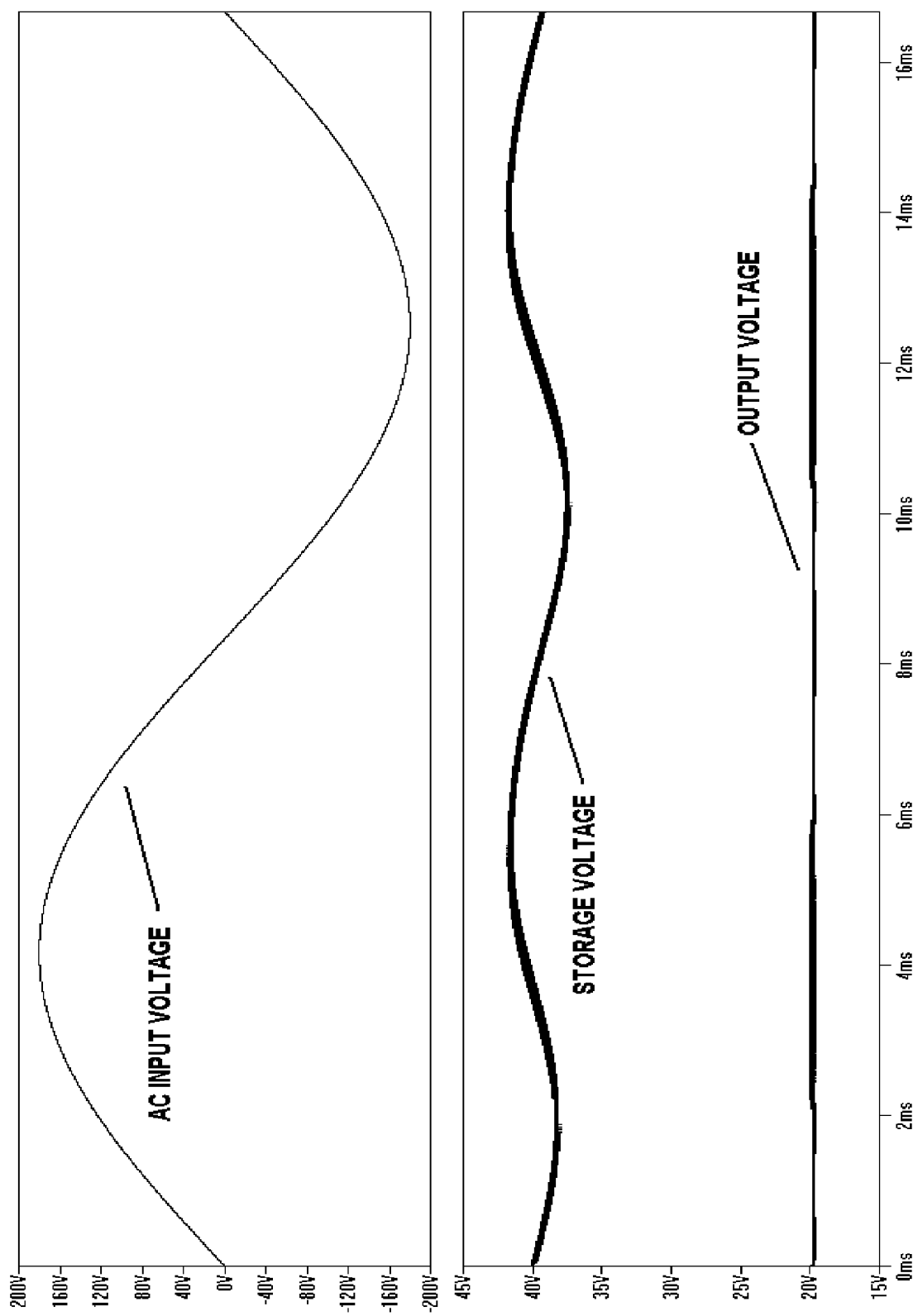
FIG. 4 shows the regulated and storage voltage outputs of the circuit in FIG. 2.

FIG. 4 again shows one cycle of the AC INPUT VOLTAGE on the upper axis. The lower axis shows both the STORAGE VOLTAGE (STOR) and the OUTPUT VOLTAGE (OUTPUT). Again, the converter is operating at full load for the entire AC input cycle. The regulated output voltage is 20 volts. The nominal storage voltage is 40 volts. The storage voltage can be seen to fall during zero crossing periods, and to rise when the input voltage is of larger magnitude. Some phase lag can be seen in the storage voltage because charging of the storage capacitor CSTOR does not begin until after the AC input has passed out of the zero crossing region. The amount of variation of the storage voltage during one AC cycle is a function of the load current and the value of CSTOR. A smaller value capacitor will serve for one AC cycle if a higher storage voltage is selected. At low loads, the STORAGE VOLTAGE becomes nearly constant.

Figure 5:
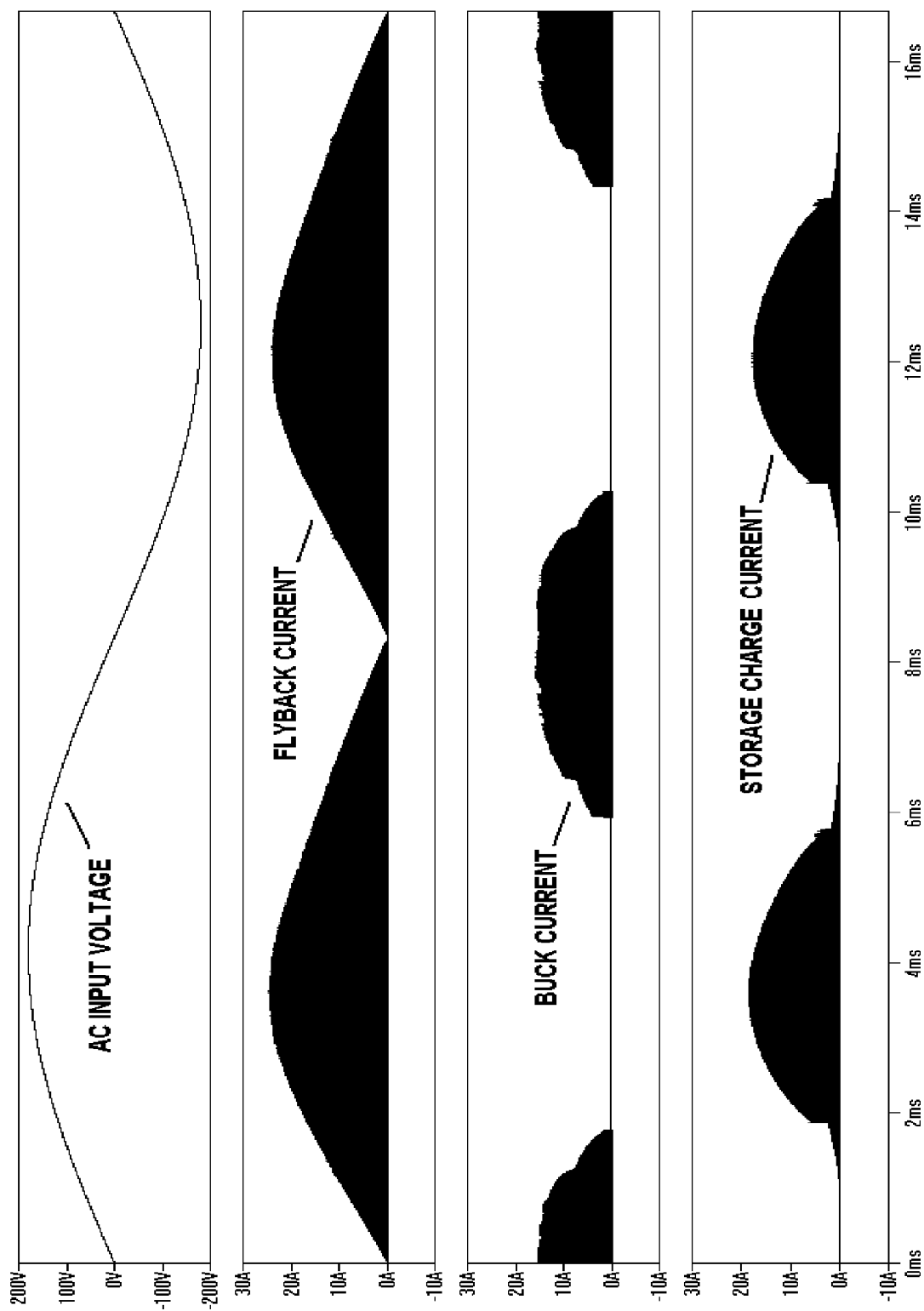
FIG. 5 shows the current distribution between the flyback and buck stages and storage charging.

FIG. 5 again shows one cycle of the AC INPUT VOLTAGE on the upper axis. The second axis shows the current FLYBACK CURRENT in the synchronous rectifier in the flyback path. The third axis shows the current BUCK CURRENT in the buck path. The lower axis shows the charging current STORAGE CHARGE CURRENT for the reservoir. The load is here 50% for the entire AC cycle. When the AC INPUT VOLTAGE is near its maximum magnitude, all the load current is provided by the flyback stage. When the AC INPUT VOLTAGE is near zero, all the load current is provided by the buck stage. There are intermediate periods when both buck and flyback converters are active. The lower the load, the smaller the percentage of power that is provided via the buck path. The buck path incurs a second set of losses, so less reliance on the buck path improves efficiency. At full load, 65% of the energy is typically transferred through the more efficient flyback path. At half load, near 80% of the load is typically supplied by the flyback stage. The flyback proportion continues to rise at lighter loads. Because achieving efficiency targets at low loads is the larger challenge in meeting industry efficiency standards, the improved low-load efficiency made possible by this topography is of particular value. STORAGE CHARGE CURRENT is seen to flow only when the AC INPUT VOLTAGE is of higher magnitude.

Figure 6:
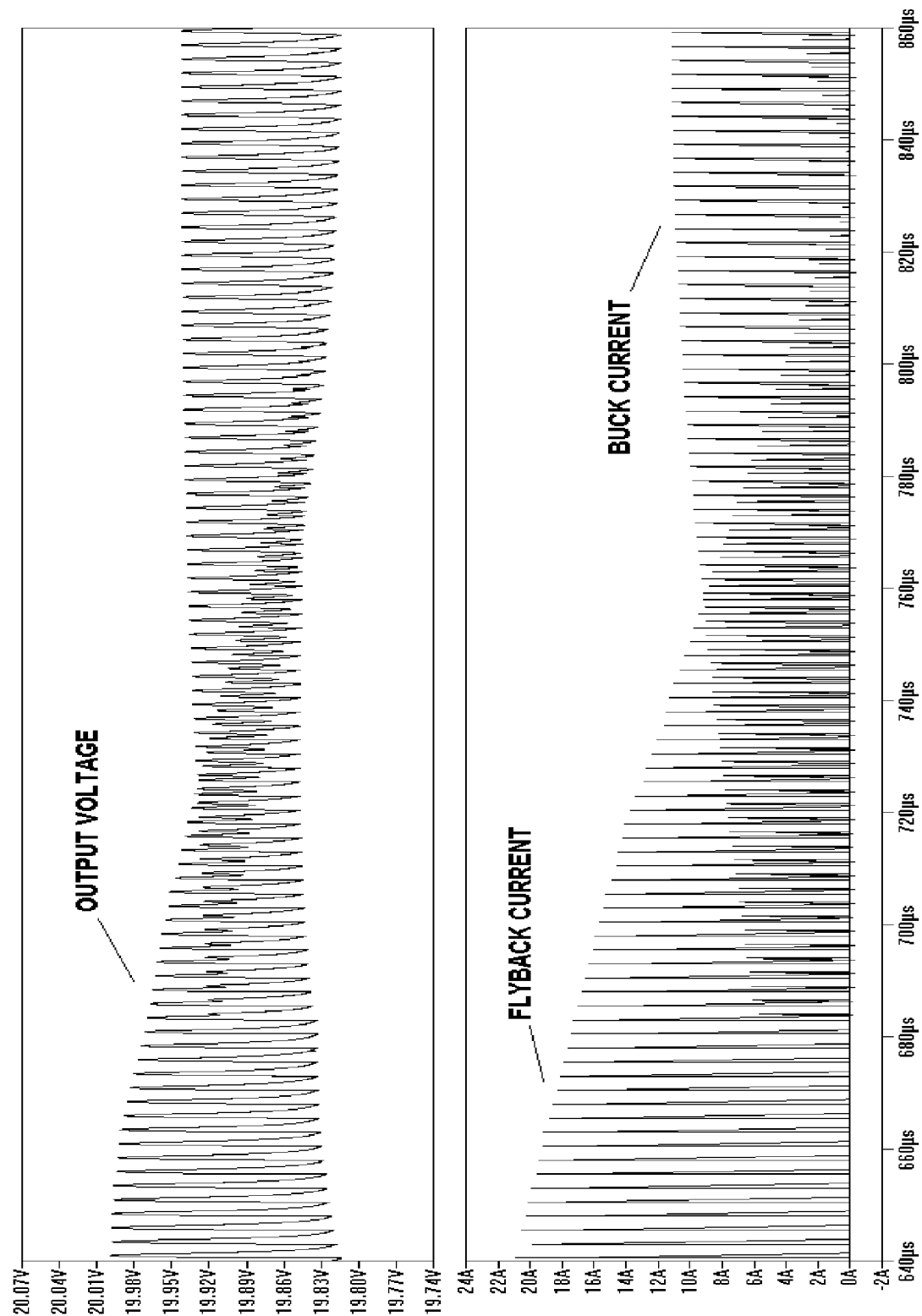
FIG. 6 details the transition between flyback and buck at zero crossing.

FIG. 6 shows a detail of an AC input voltage zero crossing at 50% load. The flyback reference voltage FREF is set at 20 volts. The buck reference voltage BREF is set about 100 mvolts lower. That difference prevents the buck stage from operating during most of the AC cycle, allowing higher efficiency. If lower ripple is the goal, then an equal reference for both stages will minimize ripple at the expense of efficiency. Even if only half the power moves through just the flyback stage, then that represents the potential for a 25% reduction in losses.

The upper axis shows OUTPUT VOLTAGE. At about 660 us, it is seen to drop from the flyback reference to the buck reference as the flyback converter begins to go out of regulation because of an approaching zero crossing at the input voltage. The buck converter begins to contribute when the output falls below BREF, around 685 us. For a period, both the flyback and buck stages operate alternately. At around 830 us, the flyback current falls to zero, and the buck stage briefly does all the work. Shortly after, just past the AC input voltage zero crossing, the flyback stage again begins to contribute. In this example, at half load, approximately 80% of the current passes through only the flyback stage. If both stages were 90% efficient at half load, then a conventional two-stage converter would provide 81% overall efficiency. This converter would provide 90%*80%+81%*20% or 88% overall efficiency. As the load approaches zero, the losses incurred by the power converter of FIG. 2 approach half those of a conventional, two-stage converter. Note that there are known methods for further improving the efficiency of flyback or buck conversion stages. These methods use components that command a premium price, so marginal efficiency improvements become increasingly costly. Certain embodiments of the present invention provide a mechanism for a greater efficiency improvement while using more ordinary components.

This converter provides an extra degree of control compared to a conventional, two-stage converter. By statically or dynamically adjusting the difference between FREF and BREF, the trade-off between ripple and regulation versus efficiency can be controlled. Even when the difference between flyback and buck references is zero, an efficiency advantage over the conventional two-stage alternative is enjoyed because of the power which is transferred through only the flyback stage.

Figure 7:
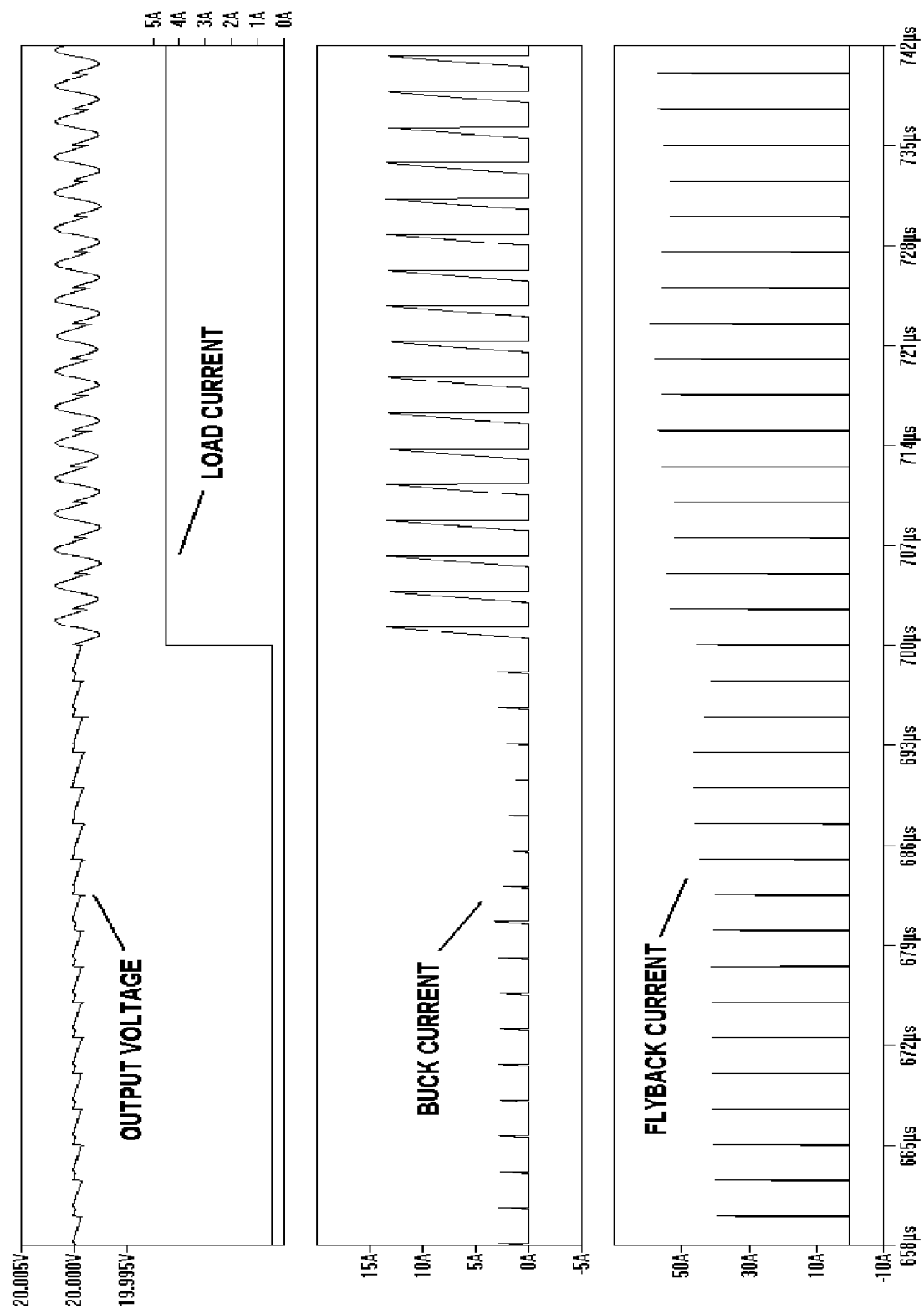
FIG. 7 details the transient regulation.

FIG. 7 is a detail of the transient response during an instant step from 10% to 90% load with BREF set equal to FREF. The waveforms will look different at different points in the AC cycle. At 10% load, almost all of the energy for the load is being delivered by the flyback stage. The intentionally slow response of the PFC loop prevents the flyback converter from supplying additional energy in response to the increased load, as seen in the FLYBACK CURRENT appearing on the lower axis. The increase seen in FLYBACK CURRENT delivered to the load represents the cessation of transfer to storage. In contrast, the buck stage can act immediately to maintain regulation, as seen by the BUCK CURRENT increase on the middle axis. The output voltage is seen to be supported by current from the buck and flyback stages in alternation. This alternation reduces ripple, reducing the size required for the filter capacitor.

The regulation in discontinuous mode shown in FIG. 7 completely lacks the undershoot and overshoot characteristic of conventional pulse width modulated switched mode power controls. Because any excess flyback inductive energy is directed to the storage capacitor, regulation is equally good when the load current drops suddenly. Certain embodiments of the present invention will operate in continuous mode without alteration provided that higher-current power components are employed.

Figure 8:
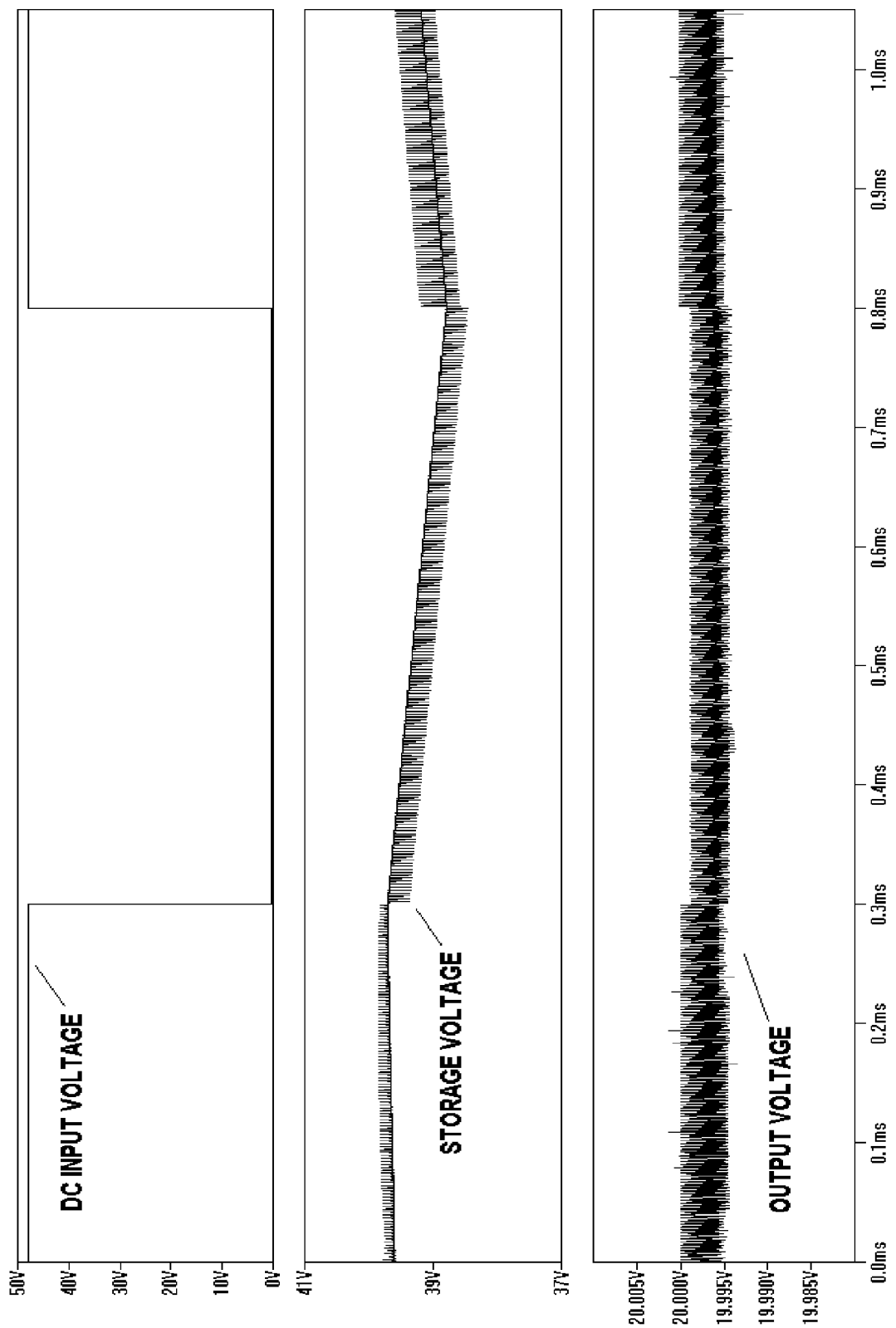
FIG. 8 shows a variation for DC to DC conversion

FIG. 8 shows DC to DC conversion at 50% load. The DC INPUT VOLTAGE is shown at 48 VDC, but it drops to zero volts for one ms. The supplemental power converter supplies the load during the interruption of the DC input voltage, as seen in the OUTPUT VOLTAGE. The STORAGE VOLTAGE is seen to drop during holdover and to begin to be recharged afterward. PFC does not apply in circumstances of DC input; however, the regulation and flexibility offered by this topology remain valuable for regulation, efficiency, redundancy, and flexibility. Note that in this configuration, some load is placed on the reservoir during normal operation to allow the regulation of STOR. BREF is here set close to FREF such that the supplemental buck operates at a low current under static conditions during normal operation.

Another embodiment will function in the same fashion with a DC input voltage. By removing the unused T1 primary winding and corresponding diode, switch, and control, either polarity of DC input voltage can be accommodated. If isolation is not required, then T1 and T2 can be eliminated, and the switched inductor energized directly through a switch responsive to CMPPFC.

Figure 9:
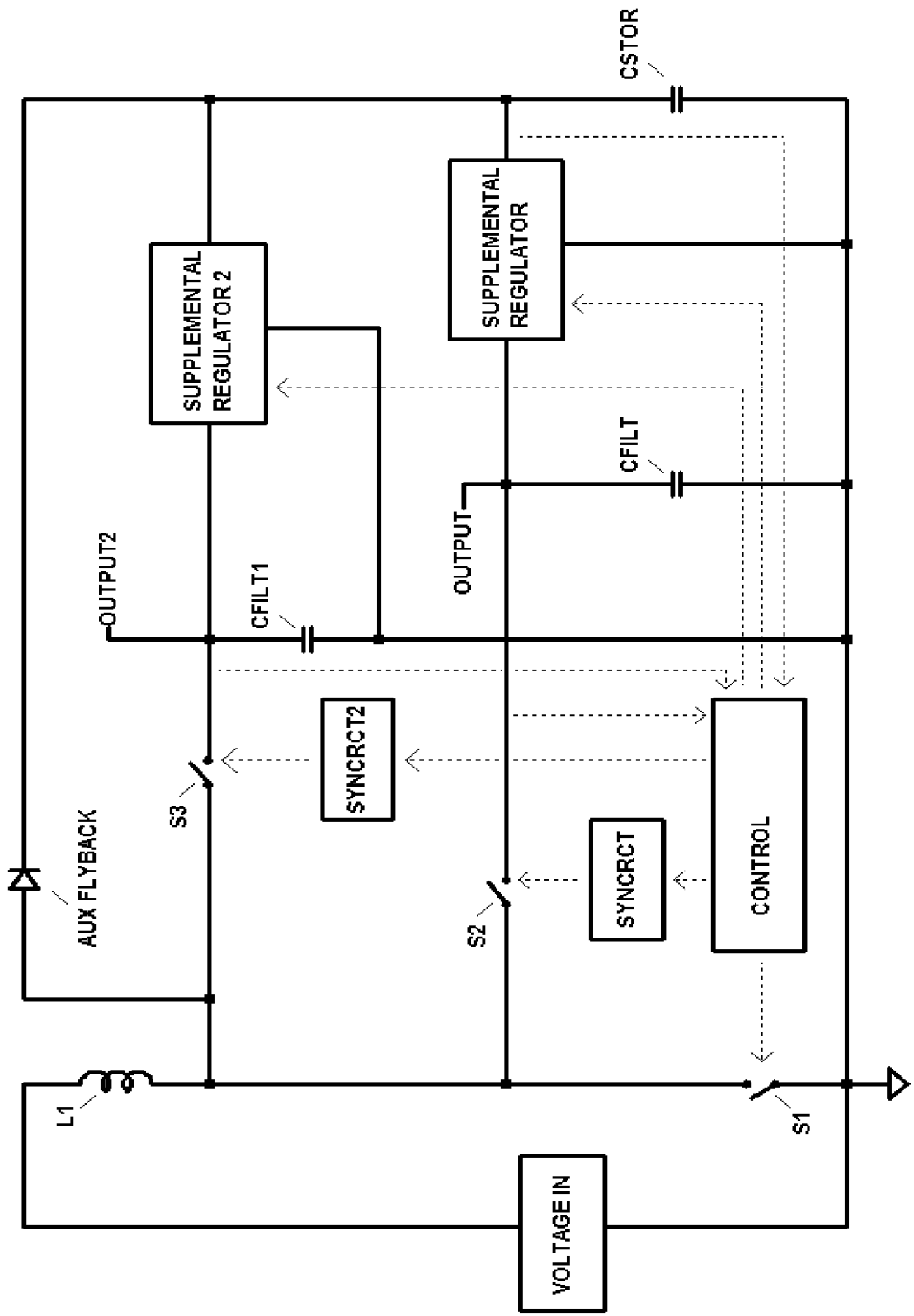
FIG. 9 is a block diagram of a multi-channel version.

FIG. 9 shows a block diagram of a multi-channel version of a compound converter. VOLTAGE IN supplies inductor L1 through switch S1, the same as in FIG. 1. The AUX FLYBACK diode supplying CSTOR is also identical to FIG. 1. The addition of switch S3, controlled by SYNCRCT2 to regulate the voltage at filter capacitor CFILT1 provides a second regulated output OUTPUT2. The same CSTOR voltage now provides input for both SUPPLEMENTAL REGULATOR and SUPPLEMENTAL REGULATOR2. SUPPLEMENTAL REGULATOR2 supports OUTPUT2 as determined by CONTROL. A number of additional outputs can be added in like manner.

It will be obvious to those skilled in the art that, although FIG. 9 is shown with a DC input voltage, the AC input circuitry of FIG. 2, or other input rectification circuitry, could alternatively be provided.

Figure 10:
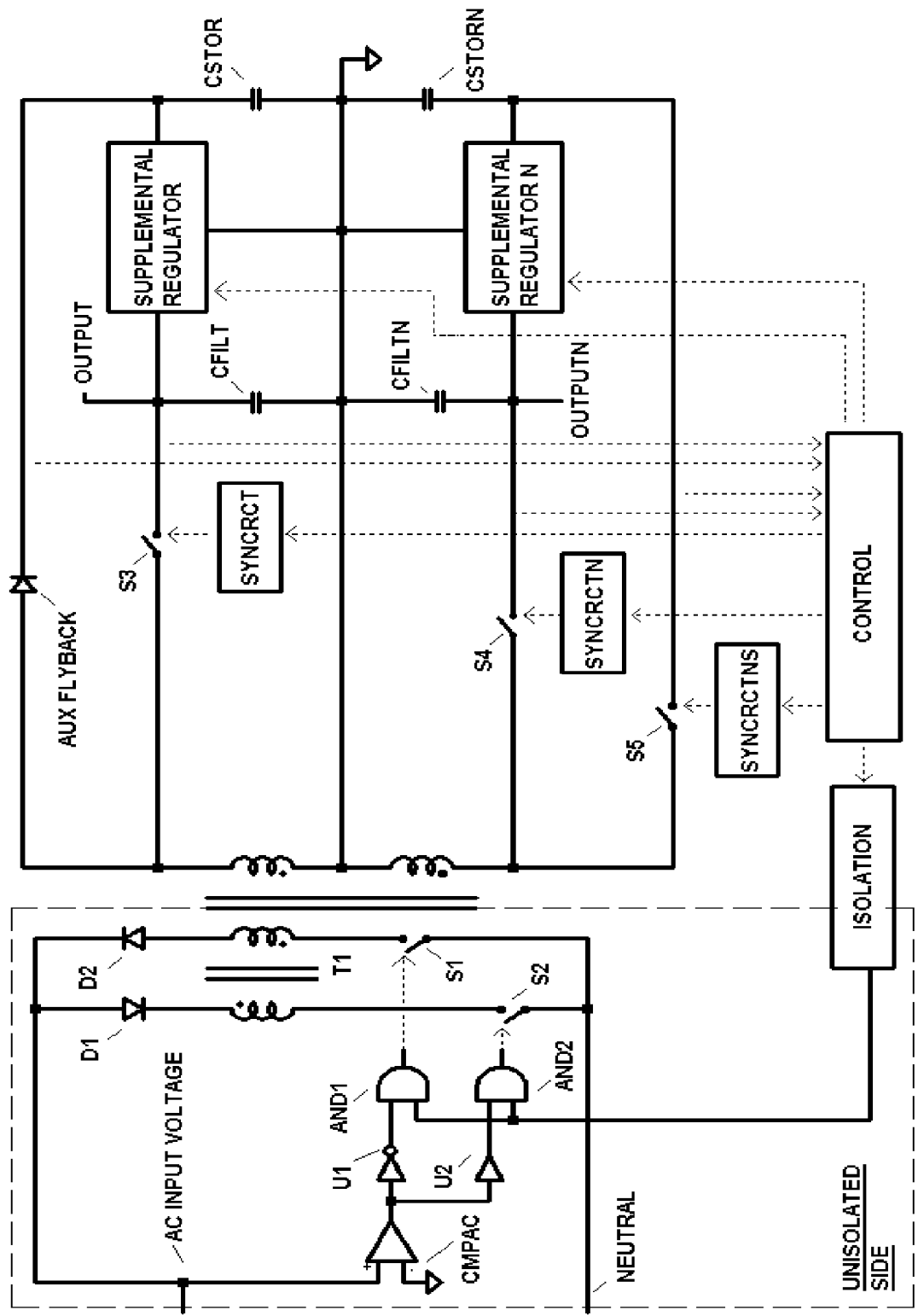
FIG. 10 shows a complementary output power converter.

FIG. 10 shows a complementary output power converter constructed of two compound power converters. The UNISOLATED SIDE circuit is identical to FIG. 2, shown here in slightly simplified form. A fourth winding is added to T1 to generate negative flyback voltages. Switches S4 and S5, controlled by SYNCRCTN and SYNCRCTNS, respectively, regulate the voltages at filter capacitors CFILTN and CSTORN. The SUPPLEMENTAL REGULATORN supports OUTPUTN as determined by CONTROL. The CONTROL function is the same for the negative portion except that the negative storage voltage CSTORN can be better regulated than CSTOR. In order for a diode to serve as the control for the AUX FLYBACK function, CSTORN should be of lower magnitude than CSTOR so that CSTOR will be energized only after CSTORN is satisfied. In the example, the CSTORN voltage is 36 volts, while the CSTOR target is 40 volts.

It will be obvious to those skilled in the art that, although FIG. 10 is shown with an AC input voltage, a DC input voltage can alternatively be accommodated with simplified circuitry, such as is shown in FIG. 1.

Figure 11:
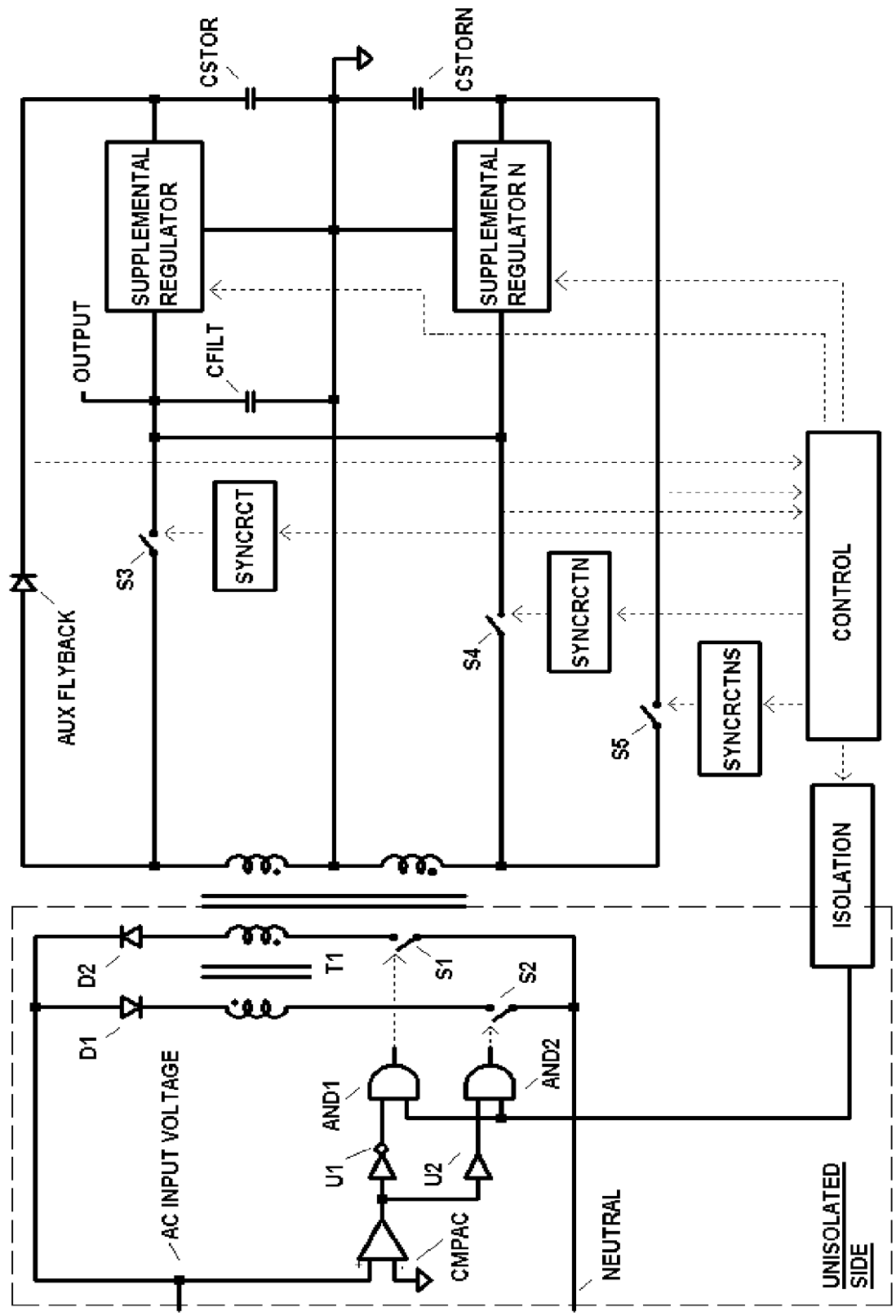
FIG. 11 shows a compound converter capable of AC to AC conversion.

FIG. 11 shows a variation for AC to AC conversion. The AC INPUT VOLTAGE is the same as the earlier figures. The circuit is identical to the complementary example of FIG. 10 except that both positive and negative halves of the converter drive a single OUTPUT. The CONTROL block here functions somewhat differently. The reference for the positive half is slightly higher than the reference for the negative half. That causes one or the other polarity to deliver power, based on the OUTPUT and reference voltages, with a narrow band in the middle where neither half is active, preventing simultaneous conduction. The output filter capacitance is reduced in value to allow the passage of higher frequencies. CSTOR and CSTORN can be increased to enable a wider OUTPUT excursion.

The circuit of FIG. 11 will also perform DC-AC conversion. It is apparent to anyone skilled in the art that, if only DC-AC conversion is needed, then the energizing circuitry can be simplified.

The examples given here are a sampling of the forms this invention can take. Anyone skilled in the art can apply variations that are covered under this teaching. Such variations include, but are not limited to: the substitution of saturable inductors for switches; the substitution of switches for diodes; the addition of an extra transformer or inductor tap for deriving alternate voltages; the substitution of a transformer or autotransformer for a simple inductor; the substitution of a simple inductor for a transformer if neither isolation nor a turns ratio is needed; or adding a turns ratio to a transformer or changing a turns ratio.

A compound converter is distinguished from two power converters in parallel and from two converters in series in that, in a compound converter, some of the energy moves through the auxiliary flyback stage and the supplemental regulator, and some of the energy moves only through the main flyback converter. The same mechanism that produces regulation at the main flyback output produces the auxiliary flyback output. The compound topology enables both greater efficiency and reductions in complexity. A compound converter provides for UPS operation with a large reservoir, or PFC function with a reservoir large enough to support the output during a single AC cycle. For UPS operation, the first supplemental energy storage element is sufficient to supply hold-over energy to the first output node for a specified period of time. A compound converter can also function to reduce ripple, to improve regulation, or to provide redundancy. Further, this power conversion topology is well-suited for the faster, bipolar blocking power switches that are now becoming available.

Figure 12:
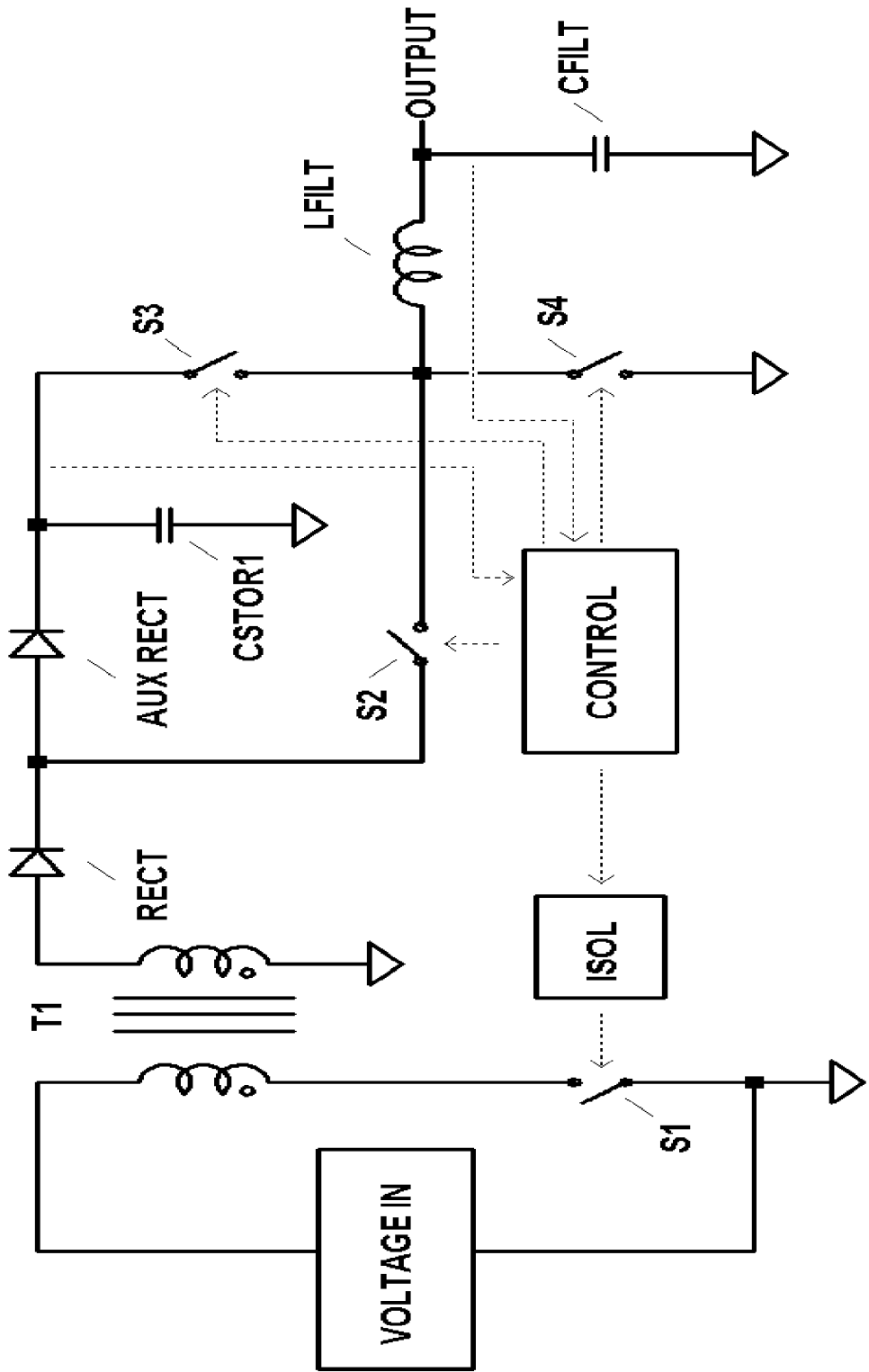
FIG. 12 shows a compound forward converter with a bidirectional buck supplementary converter.

FIG. 12 shows a forward converter variation with a buck converter as the supplementary converter. The VOLTAGE IN energizes the primary of transformer T1, responsive to switch S1. Switch S1 is controlled by circuit block CONTROL, through isolation block ISOL. Secondary current in transformer T1 is rectified by diode RECT and passes through switch S2 under the control of circuit block CONTROL. The current is filtered by an LC filter consisting of two-terminal inductor LFILT and capacitor CFILT to produce the OUTPUT voltage. Switch S2 is opened by circuit block CONTROL when the load at the OUTPUT is satisfied. Any excess secondary current then flows through diode AUX RECT to capacitor CSTOR1. Current remaining in LFILT transfers to the OUTPUT until zero current is reached, at which point circuit block CONTROL opens switch S4. Switch S3 remains open during all the above times.

As in the previous examples, circuit block CONTROL roughly regulates the voltage on CSTOR1 by varying the slowly changing on-time of switch S1. During periods when VOLTAGE IN is insufficient to supply the OUTPUT, or is entirely absent, switches S3 and S4, with inductor LFILT, form a buck converter. The buck converter operates when circuit block CONTROL closes switches S3 and S4 alternately to energize inductor LFILT from capacitor CSTOR1 and to transfer energy from inductor LFILT to the OUTPUT. Predictive energy balancing as described in U.S. Pat. Nos. 7,642,758 and 7,965,064 and U.S. Patent Application No. 2011/0115455 can be employed to smooth operation of the buck converter. Further, energy recovery as described in U.S. Patent Application No. 2009/0189581 can be accomplished by employing switches S3 and S4 in a different fashion. To recover unneeded OUTPUT energy from capacitor CFILT, circuit block CONTROL closes switch S4, energizing inductor LFILT with opposite polarity current until the OUTPUT voltage is reduced to the desired level. Circuit block CONTROL then opens switch S4 and closes switch S3 causing inductor LFILT to flyback and transfer energy to capacitor CSTOR1. Once that transfer is complete, circuit block CONTROL opens switch S3. At that point, either an additional reverse recovery cycle or a forward energy transfer cycle can be initiated.

Many variations of FIG. 12 will be evident to those skilled in the art. Transformer T1 can be replaced with a simple inductor to make a direct-coupled version. Diodes RECT and AUX RECT can be replaced with synchronous rectifiers. If energy recovery is not needed, then switch S4 can be replaced by a diode. A separate inductor could be used for the supplemental buck converter function. Zero current switching as described by Vinciarelli in U.S. Pat. No. 4,415,959 can be employed with the addition of a resonating capacitor. Zero current switching requires a fixed ON time for switch S1, and a variable frequency for controlling the total energy converted. With a rectified AC input, PFC can be achieved.

The compound converter of FIG. 12 can have even greater efficiency advantages over a two-stage converter than does the converter of FIG. 2 because of the potential for using zero voltage switching and the potential to recover excess energy from the OUTPUT. Voltage and current stresses, and radiated interference, can be reduced by using the forward conversion topology. In applications where the OUTPUT voltage is to be dynamically adjusted, the energy recovery function is valuable. In applications where the OUTPUT voltage is to be precisely regulated, the extra agility of predictive energy balancing is valuable.

Figure 13:
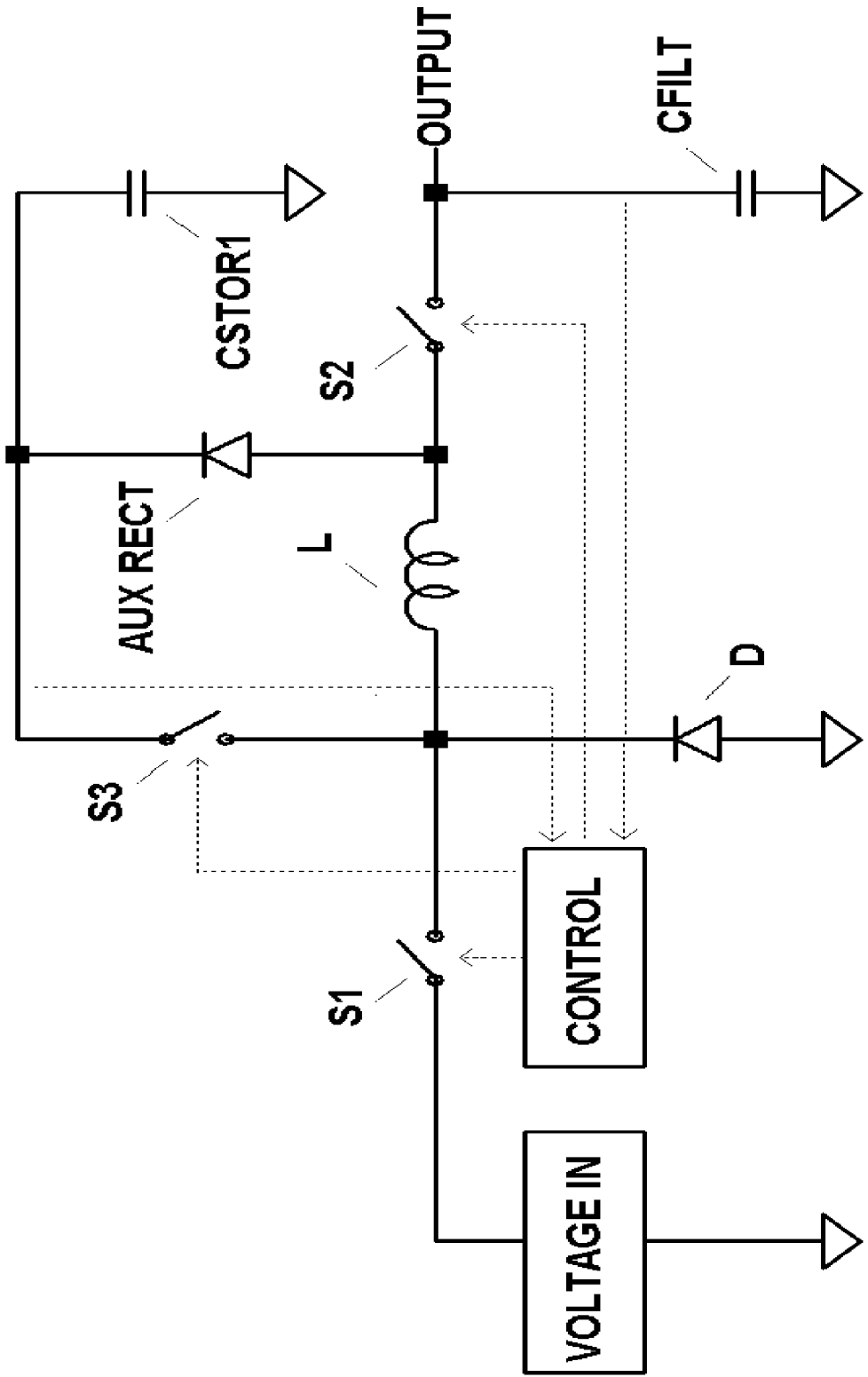
FIG. 13 shows a compound buck converter.

FIG. 13 shows a compound buck converter variation. VOLTAGE IN energizes inductor L responsive to switch S1. Switch S1 is controlled by circuit block CONTROL. In normal buck converter operation, switch S2 remains closed, and switch S3 remains open. Current flows through diode D to transfer inductive energy to the OUTPUT when switch S1 is opened. Capacitor CFILT filters the OUTPUT voltage. Switch S2 can be opened by circuit block CONTROL when the load at the OUTPUT is satisfied. Any excess current in inductor L then flows through diode AUX RECT to capacitor CSTOR1. As in previous examples, circuit block CONTROL can maintain a slight excess of average inductor energy, causing that excess to be transferred to capacitor CSTOR1. Should additional energy be needed for regulation of the OUTPUT, or should VOLTAGE IN be interrupted, switch S3, responsive to circuit block CONTROL, can energize inductor L from capacitor CSTOR1. The compound structure serves both to enable improved regulation and to provide holdover power and redundancy. If diode D is replaced with a switch, with S1 open and S2 closed, that switch can operate to reverse energize inductor L from the OUTPUT. Opening the additional switch then transfers energy to CSTOR1 in normal flyback fashion. The ability to operate the supplemental converter bidirectionally further improves regulation and enables the efficiencies of energy recovery.

Many combinations of the techniques described herein will be evident to those skilled in the art. Circuit blocks can be recombined in a matrix of possibilities. The power input for any output structure can be AC or DC. AC input converters can be configured to perform PFC, or not. Compound converters can be isolated or non-isolated. A compound converter can employ a flyback converter, a buck converter, a forward converter, or a zero voltage switching forward converter as the main converter. Other, equivalent, main converter options exist, such as SEPIC or buck/boost converters. Supplemental converters can also be of various types, including linear converters.

The output of a compound converter can be single, dual, multiple, complementary, bipolar, or bidirectional. Additional outputs can be added to any converter. The input configurations, output configurations, and main converter topologies shown may be mixed in any combination to provide a compound converter. The particular examples described herein are representative samples, only.

Certain embodiments of the present invention shown in the figures and described in the text have a number of elements and functions in common. In particular, each of these embodiments is a power converter for converting input power into regulated output power. Each power converter comprises an input node for receiving the input power, a first output node for providing the regulated output power, a main regulator connected between the input node and the first output node, a first supplemental energy storage element, a supplemental energy gating element connected between the main regulator and the first supplemental energy storage element, a first supplemental regulator connected between the first supplemental energy storage element and the first output node, and a controller configured to control the main regulator and the first supplemental regulator to (i) selectively allow energy to flow from the input node (a) to the first output node or (b) to the first supplemental energy storage element and (ii) selectively allow energy to flow from the first supplemental energy storage element to the first output node via the first supplemental regulator.

In the embodiments shown in FIGS. 1-2 and 9-13:

The input node is at VOLTAGE IN in FIGS. 1, 9, 12, and 13, and at AC INPUT VOLTAGE in FIGS. 2, 10, and 11;

The first output node is OUTPUT in all of the figures. Note that there is a second output node in each of FIG. 9 (i.e., OUTPUT2) and FIG. 10 (i.e., OUTPUTN);

The main regulator comprises inductor L1, switches S1 and S2, and capacitor CFILT in FIG. 1. In FIG. 2, the main regulator comprises transformer T1, switches S1-S3, diodes D1-D2, resistor R1, and capacitors C1 and CFILT. In FIG. 9, the main regulator comprises inductor L1, switches S1-S3, and capacitors CFILT and CFILT1. In FIG. 10, the main regulator comprises transformer T1, switches S1-S5, diodes D1-D2, and capacitors CFILT and CFILTN. In FIG. 11, the main regulator comprises transformer T1, switches S1-S5, diodes D1-D2, and capacitor CFILT. In FIG. 12, the main regulator comprises transformer T1, switches S1, S2, and S4, diode RECT, inductor LFILT, and capacitor CFILT. In FIG. 13, the main regulator comprises switches S1, S2, diode D, inductor L, and capacitor CFILT;

The first supplemental energy storage element is capacitor CSTOR in FIGS. 1-2 and 9-11 and capacitor CSTOR1 in FIGS. 12-13. Note that each of FIGS. 10-11 has a second supplemental energy storage element (i.e., capacitor CSTORN);

The supplemental energy gating element is diode AUX FLYBACK in FIGS. 1-2 and 9-11 and diode AUX RECT in FIGS. 12-13;

The first supplemental regulator is SUPPLEMENTAL REGULATOR in FIGS. 1 and 9-11. In FIG. 2, the first supplemental regulator is the buck converter BUCK. In FIG. 12, the first supplemental regulator comprises switches S3-S4. Note that, in FIG. 12, inductor LFILT and switch S4 participate in the supplemental regulating function. In FIG. 13, the first supplemental regulator comprises switch S3. Note that, in FIG. 13, inductor L and switch S2 participate in the supplemental regulating function. Note further that there is a second supplemental regulator in each of FIG. 9 (i.e., SUPPLEMENTAL REGULATOR 2) and FIGS. 10-11 (i.e., SUPPLEMENTAL REGULATOR N); and The controller is block CONTROL in FIGS. 1 and 9-13. In FIG. 2, the controller comprises comparators CMPAC, CMPPFC, CMPF, CMPS, and CMPB and associated flip-flops and other circuitry.

Although embodiments have been described in which the main regulator includes capacitor CFILT, in alternative embodiments in which the output node OUTPUT is connected to a capacitive or otherwise reactive load, CFILT may be omitted.

As used herein, the term "energy gating element" refers to any suitable (passive or active) devices for gating the flow of energy, such as, for example, diodes, rectifier diodes, synchronous rectifiers, or switches, including, but not limited to, FET, GaN, GaAs, SiC, or bipolar switches.

Depending on the particular embodiment, the term "inductive element" may refer to a simple inductor, a transformer, or any other suitable device or combination of devices that provide inductance. The term "capacitive element" may refer to a capacitor or any other suitable device or combination of devices that provide capacitance. The term "energy gating element" may refer to a switch, a rectifier, a diode, or any other suitable device or combination of devices that selectively allow energy to flow though the element.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

An approach to efficient PFC is shown in the '722 application. That approach focuses on topologies where a separate supplemental regulator moves energy from a storage reservoir to the output during periods when insufficient energy to support the output is immediately available from the AC line. One focus of the present invention is on blending the main and supplemental regulators into the same, single-stage structure. These converters use the same inductor or transformer winding(s) for both the main and supplemental power paths. In the '722 application, the supplemental converter was a distinct circuit block. In this specification, the supplemental path is blended with the elements of the main regulator.

Most of the examples here use constant ON time to achieve PFC. As used in this specification, the term Power Factor Correction or PFC implies that the power converter draws input current in proportion to and in phase with input voltage. That ON time can be slowly modulated for regulation of total stored energy. Alternatively, the frequency of operation can be slowly varied for the same purpose. In cases where the energy transferred is not in proportion to a volt-time product, the ON time may be mathematically adjusted to achieve better PFC, or the energy transferred can be measured by one of a variety of methods known to those familiar with the art. In all cases, a portion of the power moves directly from the input to the output, and another portion of the power moves into and/or out of storage. All three power movements (i.e., input to output, input to storage, and storage to output) are single-stage power conversions, and all are subject to individual control, either directly or indirectly.

In at least one embodiment, the invention provides a single-stage, AC input power converter with high Power Factor (e.g., greater than 0.98) and high efficiency. High efficiency is achieved by allowing a portion of the total power to move through only a single stage of power conversion. Power Factor Correction is achieved through actively managed energy storage. Economy and small size are achieved by using the same circuit elements that provide power to the output to regulate the input current and to manage the movement of energy into and out of storage.

Figure 14:
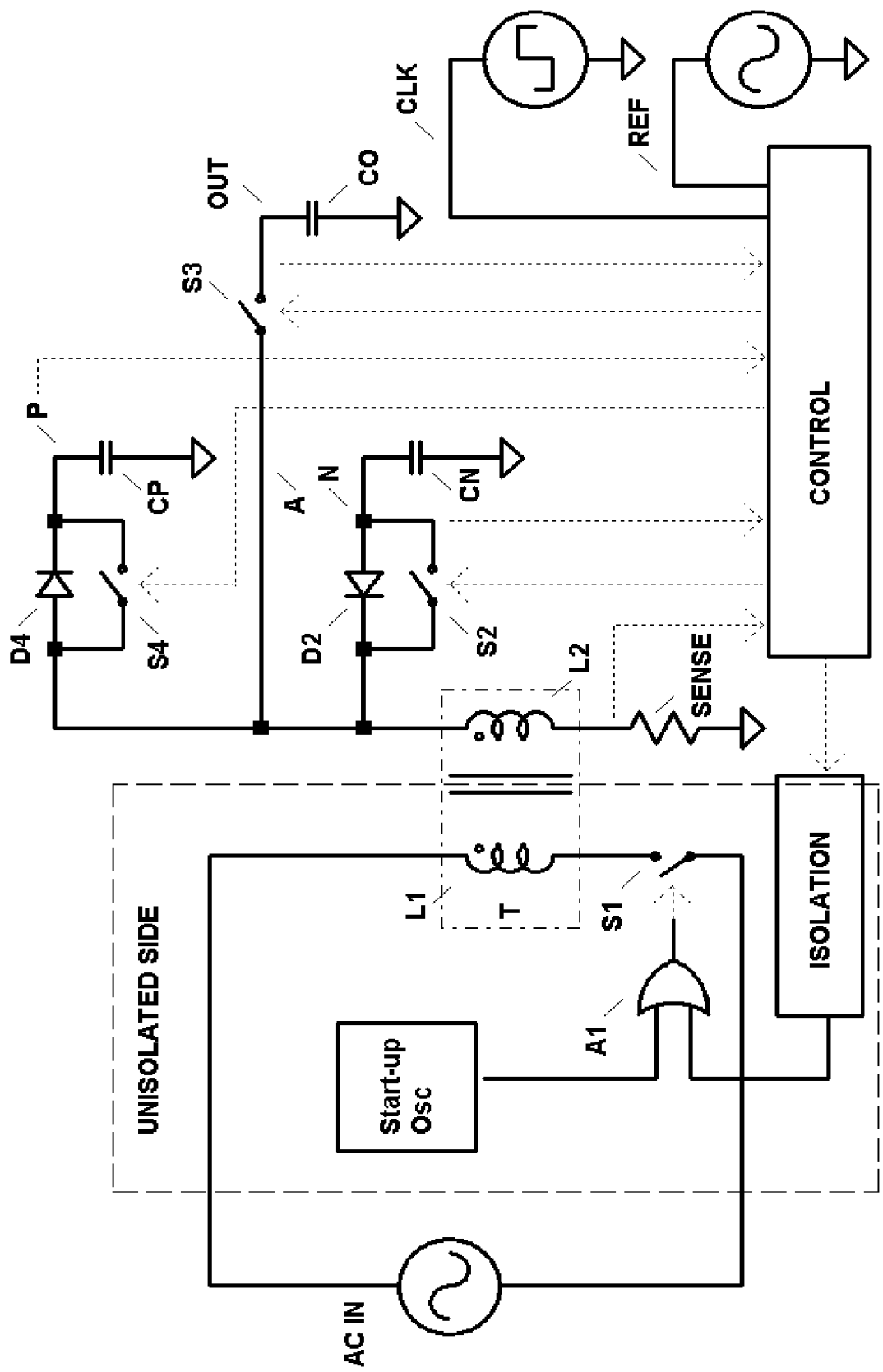
FIG. 14 shows a schematic block diagram of a transformer with primary and secondary winding, combined with 4 switches, 2 of which are bipolar-blocking, to form a bipolar, bidirectional amplifier/power converter with PFC.

A form of bidirectional, bipolar output, AC input power converter is shown in FIG. 14. Any AC input frequency is suitable, up to about 1/50th of the frequency of the control cycle clock, CK. An oscillator, Start-up Osc, runs initially to activate switch S1 through OR gate A1 to pump energy from input, AC IN, through transformer, T, into storage capacitors, CN & CP. Once the control block, CONTROL, is sufficiently powered by voltages N and/or P, CONTROL takes over the operation of S1, via wireless (i.e., non-ohmic) communication through isolation block, ISOLATION, and through OR gate A1. Isolation block, ISOLATION, can be one of many forms of digital isolator, including commercially available digital isolators or a pulse transformer. A small toroid core with as little as a single turn for primary and secondary windings can serve the purpose.

The output, OUT, filtered by capacitor CO, is regulated to match the reference, REF, by the following process, or its equivalent.

Each control cycle, as clocked by CLK, is divided into two halves. In the power converter of FIG. 14, the clock runs at 200 kHz. Any frequency above a few kHz would be suitable, though it is generally desirable to run at above 20 kHz to avoid audible noise. The maximum suitable clock frequency will be limited by the speed of the power switching elements employed. Each half of a control cycle typically includes (i) an energize phase, in which energy is stored in the transformer T from either the AC input, one of the storage capacitors CN and CP, or the output OUT, and (ii) a transfer phase, in which energy is transferred from the transformer T to either the output OUT or one of the storage capacitors CN and CP. Note that, as used in this specification, the term "half" does not necessarily mean that the control cycle is divided into two halves of equal duration.

During the first half-cycle, switch S1 is activated for a constant ON time, energizing transformer T primary winding L1 from input node AC IN. Energy is then available at secondary winding L2. If the inductive energy is in the correct polarity to service demand at the output, then that energy is provided through switch S3. Energy transfer continues until 1) the inductive energy is exhausted, as indicated by the voltage at the current sense resistor, SENSE, or 2) until the demand for regulation is met. In case 2, remaining inductive energy is transferred to storage element CN or CP, depending on its polarity. Switches S2 and S4 can be used for the purpose, or diodes D2 and D4 will perform that function without the intervention of control block CONTROL. The diodes are optional, given synchronous rectification, as follows. In particular, if the remaining inductive energy in the secondary winding L2 is positive (as determined by CONTROL detecting the voltage at SENSE), then CONTROL closes switch S4 to transfer the excess energy to storage element CP. Similarly, if the remaining inductive energy in the secondary winding L2 is negative, then CONTROL closes switch S2 to transfer the excess energy to storage element CN. If the magnitude of the voltage is sufficiently great, then energy will flow into the corresponding storage element CP or CN via diode D4 or D2, respectively.

The second half of the control cycle might begin with an energize period for transformer winding L2. If the output OUT is larger in magnitude than the reference REF, then the source of the energy is through S3. Energizing continues until the regulation point is reached. Inductive energy is then transferred to storage element CN or CP, depending on the polarity. Switches S2 and S4 can be used for the purpose, or diodes D2 and D4 will perform that function without the intervention of control block CONTROL.

If, at the start of the second half of the cycle, the output OUT must increase in magnitude in the positive direction in order to achieve regulation, then switch S2 is closed by CONTROL to energize L2 from storage CN. Energizing L2 through switch S2 is terminated by CONTROL (opening S2) by predictive energy balancing, or by a predetermined ON time, or by charging to a desired current. The inductive energy is then transferred from L2 to the output through switch S3. If the regulation point is reached before the inductive energy is exhausted, then switch S3 is opened causing remaining inductive energy to be transferred to storage reservoir CP. Switch S4 can be used for the purpose, or diode D4 will perform that function without the intervention of control block CONTROL.

If the output must increase in magnitude in the negative direction to achieve regulation, then switch S4 is closed by CONTROL to energize L2 from storage CP. Energizing through switch S4 is terminated by CONTROL (opening S4) by predictive energy balancing, or by a predetermined ON time, or by charging to a desired current. Then, inductive energy is transferred from L2 to the output through switch S3. If the regulation point is reached before the inductive energy is exhausted, then switch S3 is opened causing remaining inductive energy to be transferred to storage reservoir CN. Switch S2 can be used for the purpose, or diode D2 will perform that function without the intervention of control block CONTROL.

Each parallel combination of a switch and a diode here, and in subsequent figures, may be implemented with a conventional FET, which would include a body diode, or by using appropriate discrete elements.

The voltages at P and N may vary over a large range during normal operation. If one of those voltages diverges in magnitude beyond a predetermined point, then control block CONTROL can equalize the voltages P and N by energizing L2 to a higher level in the energize step above when energizing from the reservoir larger in magnitude. Then, after reaching regulation at the output, that additional energy is transferred to the reservoir of lesser magnitude.

Control block CONTROL also includes a slow, non-critical control loop which monitors the voltages at N and P. If the total amount of stored energy is too large, then the constant ON time is slightly reduced. If the total amount of stored energy is too small, then the constant ON time is slightly increased. These ON time changes are heavily filtered so as not to reduce the Power Factor by changing the ON time significantly during a single AC cycle.

Figure 15:
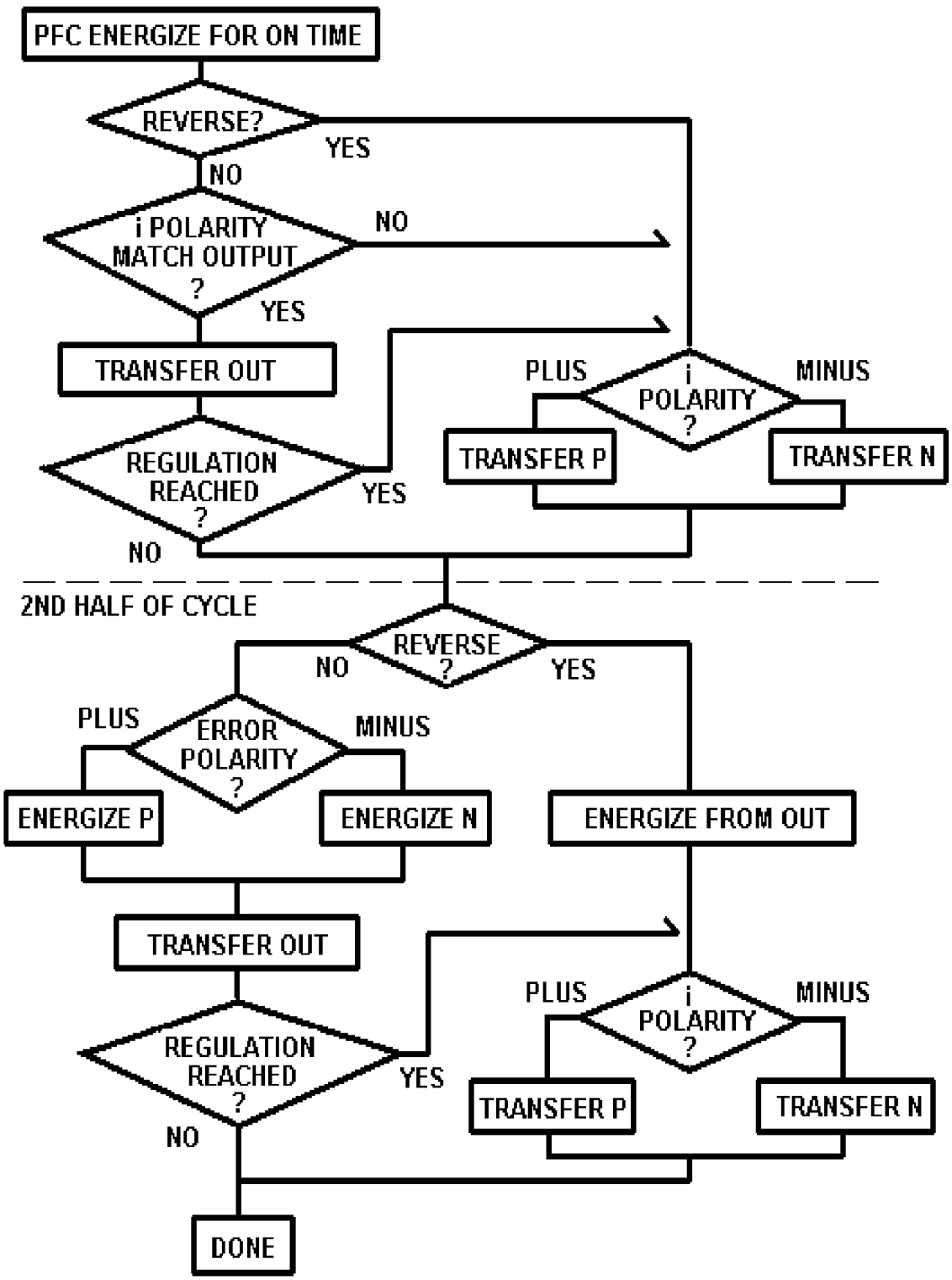
FIG. 15 shows a flow chart for control of the power converter of FIG. 14.

The operation above is shown in flowchart form in FIG. 15. That control can be implemented as a state machine, in programmable logic, in a microcontroller, or using discrete circuitry. Combinations of these methods have been verified through SPICE simulation, or through the use of actual analog and digital circuitry.

Figure 16:
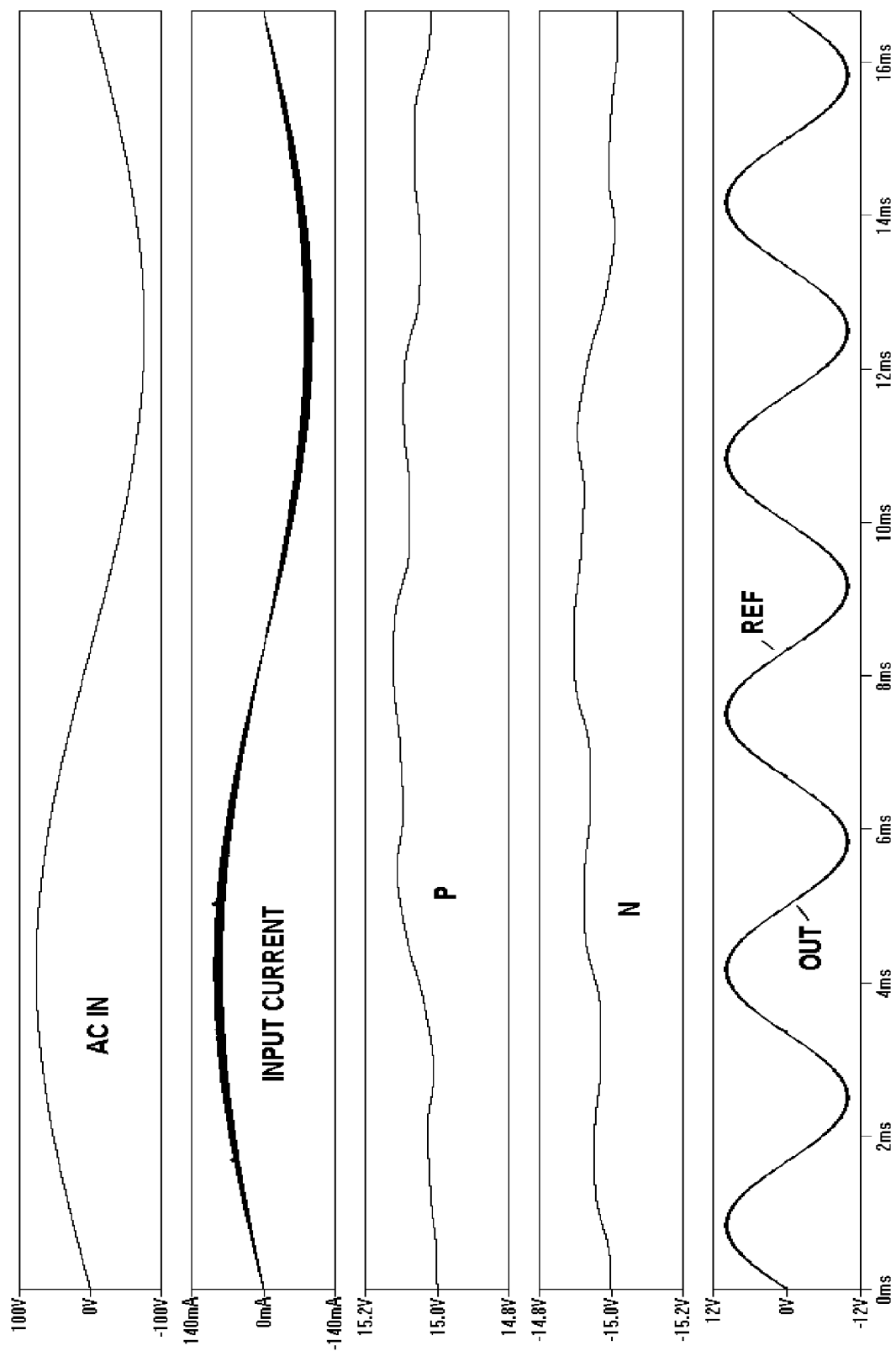
FIG. 16 shows simulated waveforms for the converter of FIG. 14 in operation.

FIG. 16 shows SPICE waveforms of the example of FIG. 14 in operation. The top trace shows one cycle of 60 Hz AC input voltage, AC IN. The second trace shows the input current, INPUT CURRENT, low-pass filtered to remove most of the switching frequency. Input current is also shown after that filtering in the waveforms that follow. The filtered input current can be seen to be proportional to, and in phase with, the AC input voltage. That is the desired input current waveform for ideal PFC. The third trace shows the positive storage voltage, P. Voltage P is seen to increase and decrease, modulated by both the AC input voltage and by the demand at the output. Over the one complete AC cycle shown, voltage P ends at near the level it begins. The fourth trace shows the negative storage voltage, N. Voltage N is seen to increase and decrease, modulated by both the AC input voltage and by the demand at the output. Over the one complete AC cycle shown, voltage N ends at near the level it begins. The fifth axis shows the reference voltage, REF, and the output voltage, OUT. The two traces superimpose so as to be largely indistinguishable.

Should the total stored energy climb above a preset limit, a separate slow loop would reduce the constant ON time. Should the total stored energy fall below a preset limit, the separate slow loop would increase the constant ON time. If P or N were to become larger than the other by more than a preset limit, then energy can be transferred from the reservoir larger in magnitude to the reservoir smaller in magnitude during forward transfers in the second half of a control cycle.

Figure 17:
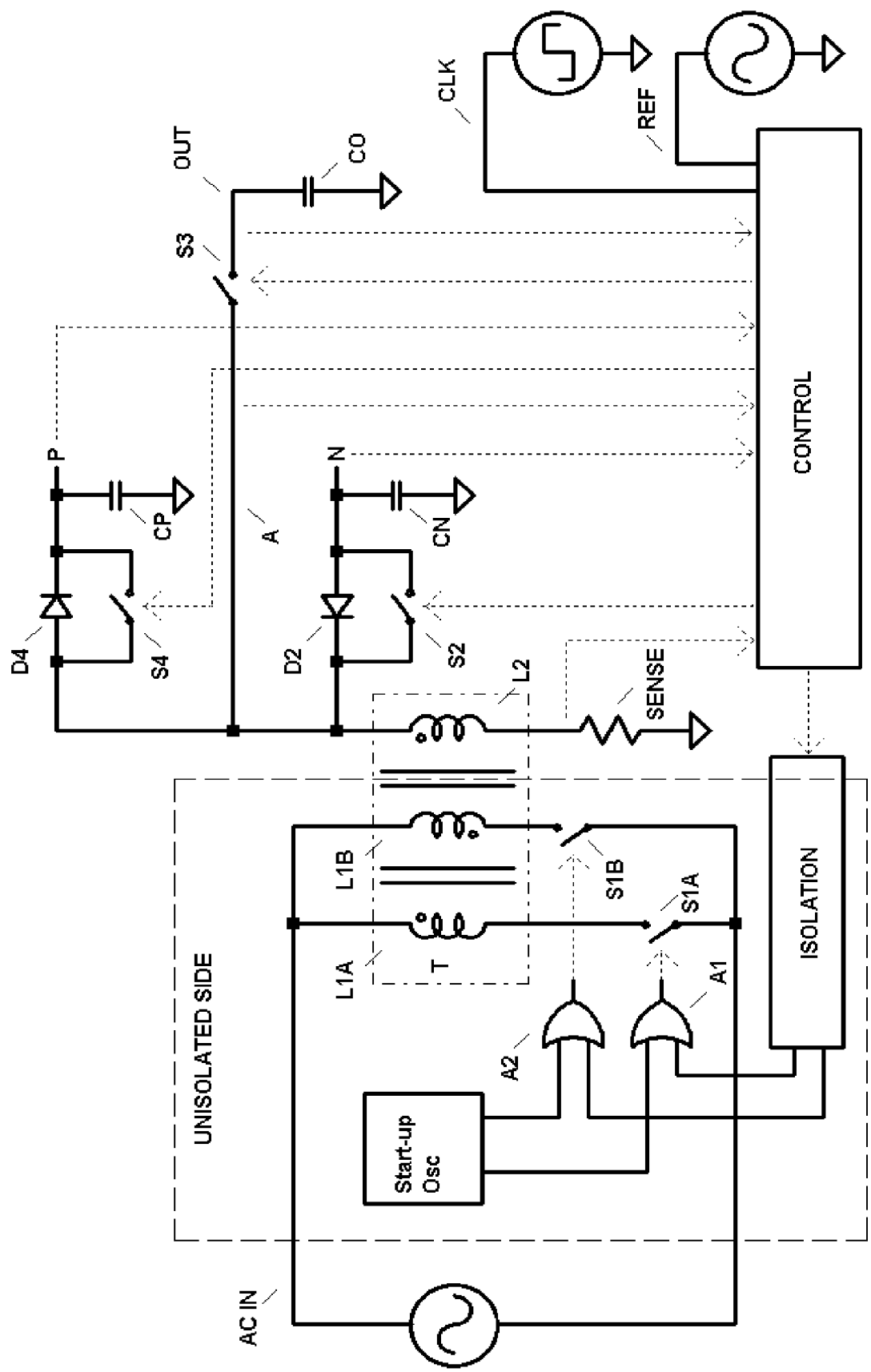
FIG. 17 shows a schematic block diagram of a dual primary, single secondary transformer in a topology with 5 switches, 3 of which are bipolar-blocking, to form a bipolar, bidirectional amplifier/power converter with PFC.

FIG. 17 shows a variation on FIG. 14 with the primary of transformer, T, split into two oppositely poled windings L1A and L1B, driven by switches S1A and S1B, respectively. The second primary winding L1B assures that available energy from the unisolated (aka upstream or input) side can always be placed in the correct polarity for direct support of the output. That ability reduces the percentage of energy that moves into, and out of, storage, improving efficiency.

An oscillator, Start-up Osc, runs initially to activate switches S1A and S1B through OR gates A1 and A2 to pump energy from input, AC IN, through transformer, T, into storage capacitors, CN & CP. Switches S1A and S1B will never both be on at the same time. If switches S1A and S1B are activated alternately, then energy will be moved to reservoirs CP and CN in alternation. Once the control block, CONTROL, is sufficiently powered by N and/or P, CONTROL takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose. Alternatively, a second pulse transformer could control the second switch.

The output, OUT, filtered by capacitor CO, is regulated to match the reference, REF, by the following process, or its equivalent.

Each control cycle, as clocked by CLK, is divided into two halves. During the first half-cycle, switch S1A or S1B is activated for a constant ON time, energizing transformer T primary winding L1A or L1B. Because flyback energy transfers invert, the polarity chosen is the opposite of the polarity of the demand at the output. Energy is then available at secondary winding L2 in the correct polarity for transfer to OUT through switch S3. Energy transfer continues until 1) the inductive energy is exhausted, as indicated by the voltage at the current sense resistor, SENSE, or 2) until the regulation point is reached. In case 2, remaining inductive energy is transferred to storage element CN or CP, depending on polarity. Switches S2 and S4 can be used for the purpose, or diodes D2 and D4 will transfer remaining inductive energy to the similarly poled storage reservoir without the intervention of the control block, CONTROL.

The second half of the control cycle begins with a test to determine if the output, OUT is larger in magnitude than the reference, REF. If so, then a reverse transfer is performed, where the source of the energy is the output, through S3. Energizing L2 continues until the regulation point is reached. Inductive energy is then transferred from L2 to storage element CN or CP, depending on polarity. Switches S2 and S4 can be used for the purpose, or diodes D2 and D4 will perform that function without the intervention of control block CONTROL.

If, at the start of the second half of the cycle, the output needs to increase in magnitude in the positive direction in order to achieve regulation, then switch S2 is closed to energize from storage CN. Energizing through switch S2 is terminated by predictive energy balancing, or by a predetermined ON time, or by charging to a desired current. The voltage at point A during charging may be useful for developing a volt-time product representing the current in winding L2. Inductive energy is then transferred from L2 to the output through switch S3. If the regulation point is reached before the inductive energy is exhausted, then switch S3 opens, so that remaining inductive energy is transferred to storage element P. Switch S4 can be used for the purpose, or diode D4 will perform that function without the intervention of control block CONTROL.

If the output must increase in magnitude in the negative direction to achieve regulation, then switch S4 is closed to energize from storage CP. Energizing through switch S4 is terminated by predictive energy balancing, or by a predetermined ON time, or by charging to a desired current. Then, inductive energy is transferred from L2 to the output through switch S3. If the regulation point is reached before the inductive energy is exhausted, then switch S3 opens, so that remaining inductive energy is transferred to storage element CN. Switch S2 can be used for the purpose, or diode D2 will perform that function without the intervention of control block CONTROL.

The voltages at P and N may vary over a large range without interfering with normal operation. If they diverge in magnitude beyond a predetermined amount, then control block CONTROL can equalize P and N by energizing to a higher level in the energize step above when energizing from the reservoir larger in magnitude. Then, after reaching regulation at the output, that additional energy is transferred to the reservoir of lesser magnitude.

Control block CONTROL also includes a slow, non-critical control loop which monitors the voltage at N and P. If the total amount of stored energy is too large, then the constant ON time is slightly reduced. If the total amount of stored energy is too small, then the constant ON time is slightly increased. These ON time changes are heavily filtered so as not to reduce the Power Factor by changing the ON time significantly during a single AC cycle.

Figure 18:
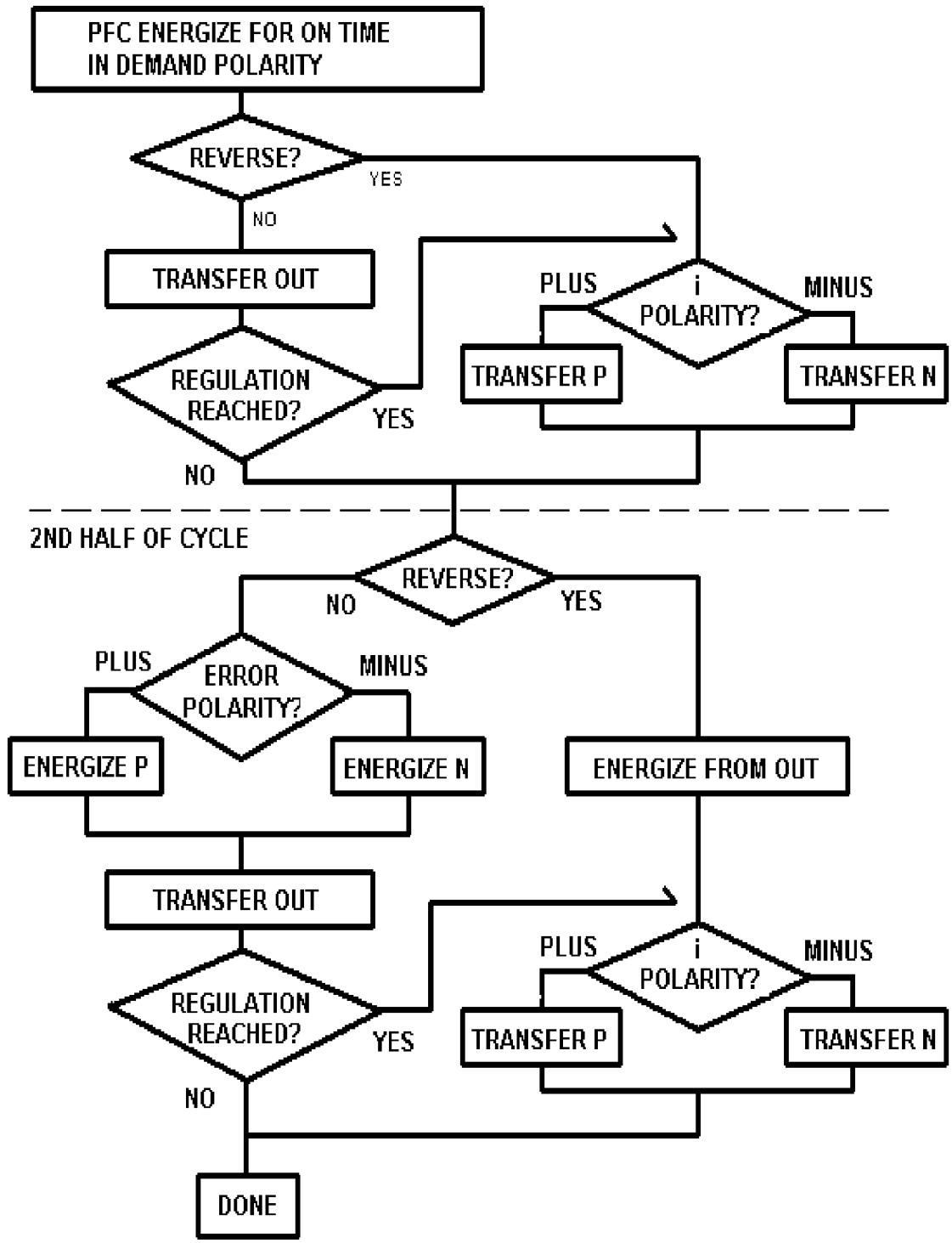
FIG. 18 shows a flow chart for control of the power converter of FIG. 17.

The operation above is shown in flowchart form in FIG. 18. That control can be implemented as a state machine, in programmable logic, in a microcontroller, or using discrete circuitry.

Figure 19:
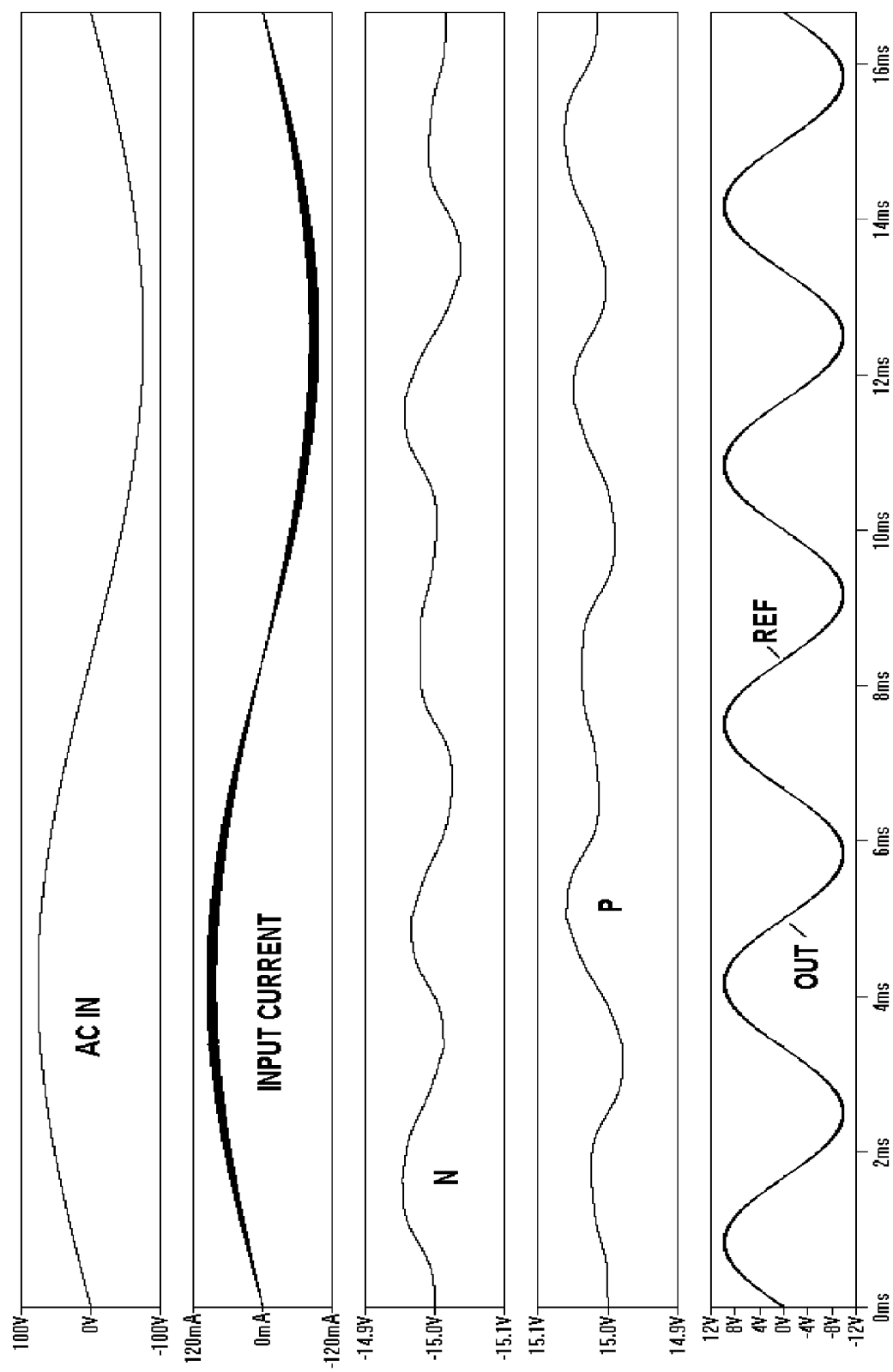
FIG. 19 shows simulated waveforms for the converter of FIG. 17 in operation.

FIG. 19 shows SPICE waveforms of the example of FIG. 17 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated by both the AC input voltage and by the demands at the output. Over the one complete AC cycle shown, voltage N ends at near the level it begins. The fourth trace shows the positive storage voltage, P. Voltage P is seen to increase and decrease, modulated by both the AC input voltage and by the demands at the output. Over the one complete AC cycle shown, voltage P ends at near the level it begins. The fifth axis shows the reference voltage, REF, and the output voltage, OUT. The two traces superimpose so as to be largely indistinguishable. The results shown of FIG. 19 are essentially equivalent to the results of FIG. 16, even though the method of achieving those results is different.

Figure 20:
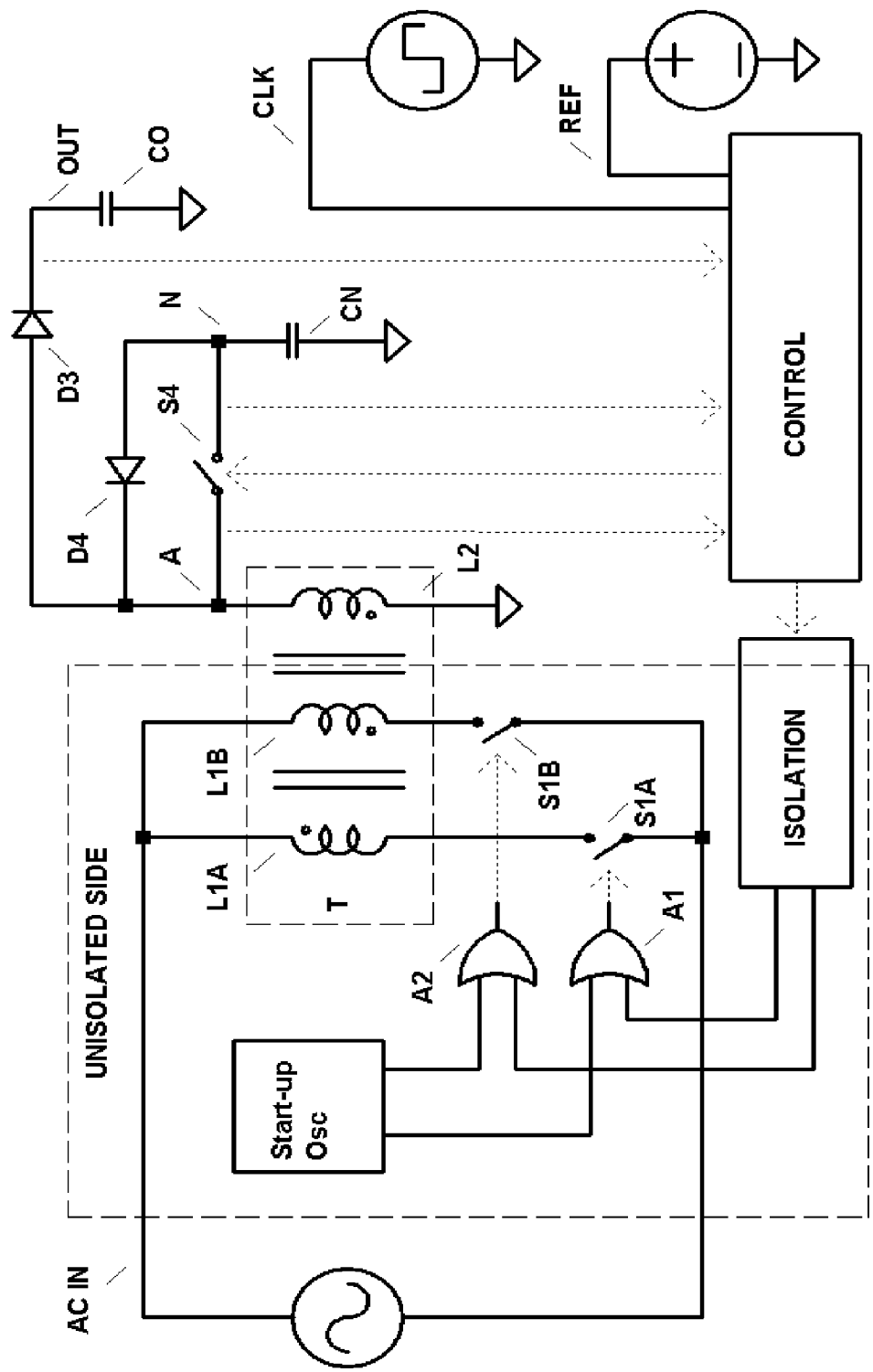
FIG. 20 shows a schematic block diagram of a dual primary, single secondary transformer in a topology with 3 switches forming a unipolar, unidirectional power converter with PFC.

FIG. 20 shows a unipolar output variation on FIG. 14 involving only a single polarity of storage and only one switch on the isolated (aka downstream or output) side. The primary of transformer, T, is split into two oppositely poled windings L1A and L1B, driven by switches S1A and S1B. The second primary winding L1B assures that available energy from the unisolated side can always be placed in the correct polarity for direct support of the output. That ability reduces the percentage of energy that moves into, and out of, storage for improved efficiency. A single-turn pulse transformer can control both isolated side switches based on the polarity of pulses generated. Note that diodes can be inserted in series with windings L1A and L1B so that no bipolar blocking switches would be needed. Without those diodes, switches S1A and S1B are bipolar blocking.

An oscillator, Start-up Osc, runs initially to activate switches S1A and S1B through OR gates A1 and A2 to pump energy from input, AC IN, through transformer, T, into storage capacitor, CN. Because flyback energy transfers invert, the polarity chosen is the opposite of the polarity at N. Once the control block, CONTROL, is sufficiently powered by N, it takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose. For example, a positive-going pulse could turn ON switch S1A, with the return to zero turning OFF switch S1A. A negative-going pulse could turn ON switch S1B, with the return to zero turning OFF switch S1B.

The output, OUT, filtered by capacitor CO, is regulated to match the reference, REF, by the following process, or its equivalent.

Each control cycle, as clocked by CLK, is divided into two halves. During the first half-cycle, either switch S1A or S1B is activated, based on the AC IN polarity, until one of two conditions is met: 1) the constant ON time elapses, thereby meeting the PFC requirement, or 2) the transformer contains enough energy to satisfy the energy demand at the output. In either case, the actual ON time is preserved in digital or analog fashion for use later in the cycle, and the inductive energy is transferred to the output through diode D3. The voltage at point A during charging is useful for developing a volt-time product representing the current in winding L2.

The second half of the control cycle follows a different course for case 1 and 2 above. In case 1, the output did not reach the regulation point, so the next step is to energize L2 from the storage reservoir, CN, through switch S4 up to the demand energy, as calculated by the CONTROL block. Case 1 completes with the transfer of that energy through diode D3 to support the output, OUT. In case 1, the PFC requirement is met in the first half-cycle, and the regulation requirement is divided between half-cycles.

In case 2, the output did reach the regulation point, but the PFC ON time was not completed, so the next step is to energize L2 from the AC input, AC IN, for the remainder of the ON time requirement. Note that there is not a linear relationship between PFC ON time and energy, so calculation circuitry is used to determine the necessary additional PFC ON time required. That calculation can be done by the CONTROL block, or, for speed and simplicity, a table embodied in a memory can contain that information such that, for any first half-cycle PFC ON time, the table contains a corresponding second half-cycle PFC ON time. Case 2 completes with the transfer of the inductive energy through diode D4 or switch S4 to storage reservoir, CN. In case 2, the regulation requirement is met in the first half-cycle, and the PFC requirement is divided between half-cycles.

The voltage at N may vary over a large range during normal operation. Control block CONTROL also includes a slow, non-critical control loop which monitors the voltage at N. If N becomes too large, then the constant ON time is slightly reduced. If N becomes too small, then the constant ON time is slightly increased. These ON time changes are heavily filtered so as not to reduce the Power Factor by changing the ON time significantly during a single AC cycle.

Figure 21:
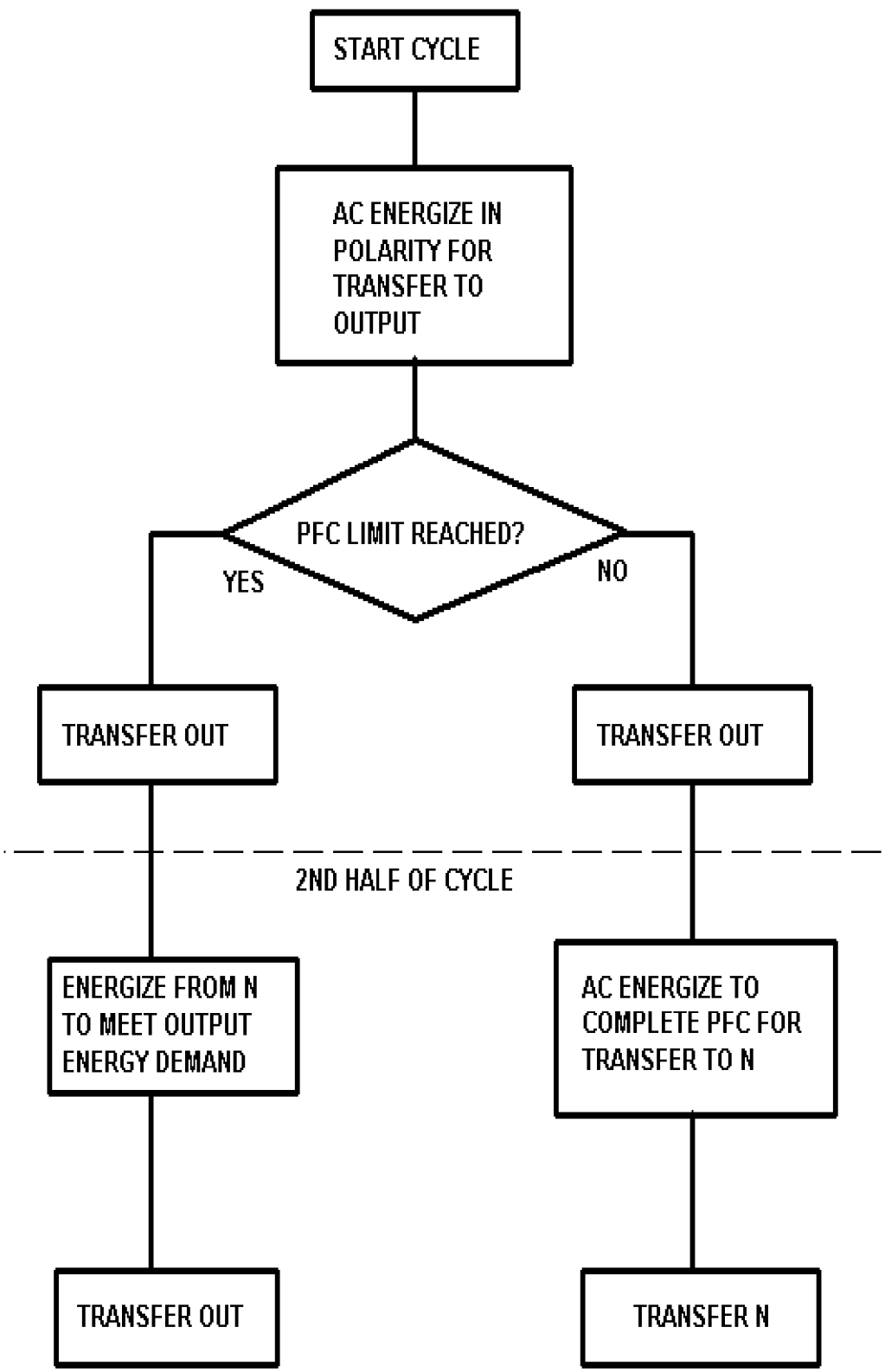
FIG. 21 shows a flow chart for control of the power converter of FIG. 20.

The operation above is shown in flowchart form in FIG. 21. That control can be implemented as a state machine, in programmable logic, in a microcontroller, or using discrete circuitry.

Figure 22:
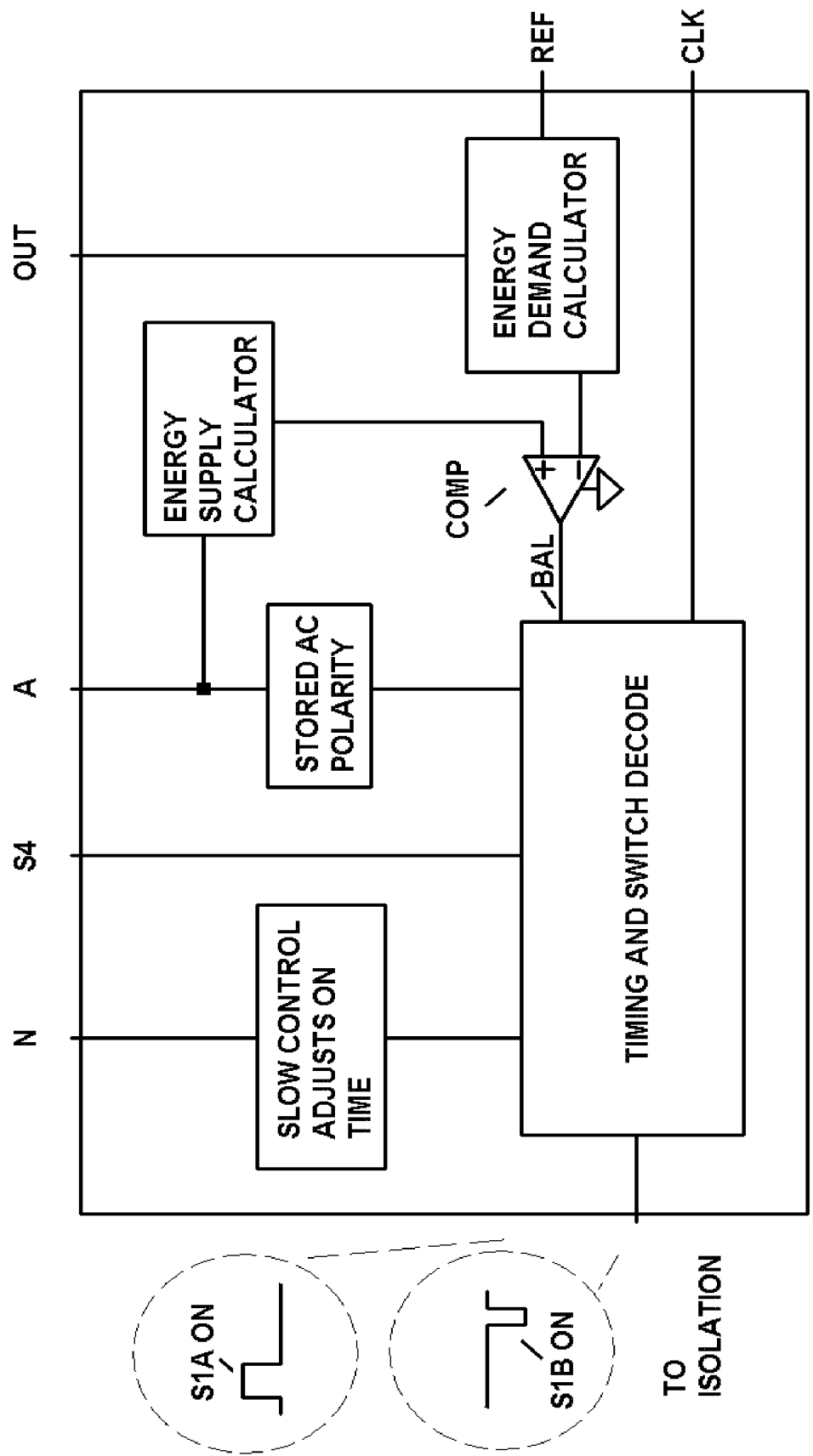
FIG. 22 shows a schematic block diagram of a detail of the control block of FIG. 20.

FIG. 22 shows a detail of the contents of the CONTROL block of FIG. 20. The ENERGY DEMAND CALCULATOR uses output OUT and reference REF to calculate energy demand: $(REF^2-OUT^2)*scaling$. The scaling term adjusts for the ratio of switched inductance to filter capacitance. The ENERGY SUPPLY CALCULATOR uses a volt-time product representing the inductive current to generate a term linearly proportional to energy supply: (node A voltage*charging time)$^2$. Comparator, COMP, compares the supply and demand terms, to produce a balance signal, BAL, which is used to predictively terminate energizing periods.

The improved transient response provided by the predictive energy balancing method described above is not necessary for operation. A conventional control method will also serve. In that case, demand is calculated based on the difference between REF and OUT, and supply is a volt-time product derived at point A during charging or a measurement of inductor current, without squaring.

The block STORED AC POLARITY preserves the last polarity, because the AC input voltage polarity is not directly known on the isolated side of the power converter until switch S1A or S1B is closed. Just after zero crossing, that stored polarity information will be wrong for one cycle, but that fact is of little consequence because there is little AC energy available at the time of zero crossing.

The block TIMING AND SWITCH DECODE performs the steps in the flowchart of FIG. 21, as paced by clock, CLK. That block provides switch drive for switch S4 and drive for the isolation block, ISOLATION. Here, during a positive pulse, switch S1A turns on, and, during a negative pulse, switch S1B turns on. A conventional filtered feedback loop, SLOW CONTROL ADJUSTS ON TIME, monitors the storage voltage, N. The ON time is modulated to cause the average storage voltage to approximate a predetermined target. The target in one possible implementation is −36 volts for an output voltage of 24 volts. Voltage N is of opposite polarity to the output voltage, but can be greater or lesser in magnitude.

Figure 23:
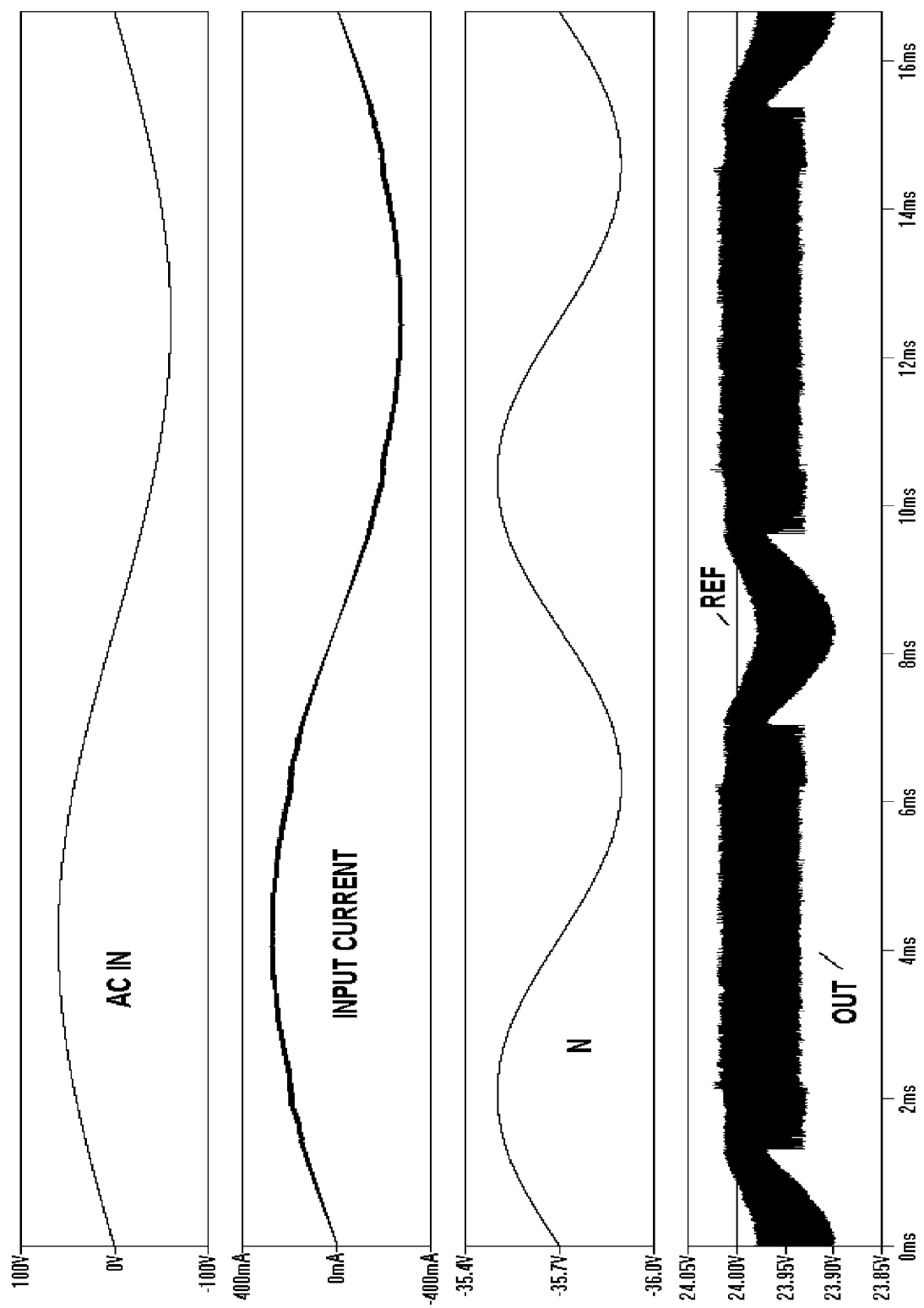
FIG. 23 shows simulated waveforms for the converter of FIG. 20 in operation.

FIG. 23 shows SPICE waveforms of the example of FIG. 20 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. Over the one complete AC cycle shown, voltage N ends at near the level it begins. The fourth axis shows the reference voltage, REF, and the output voltage, OUT. The vertical scale is expanded so that the output ripple of approximately 100 mv can be seen as the width of the output trace.

Figure 24:
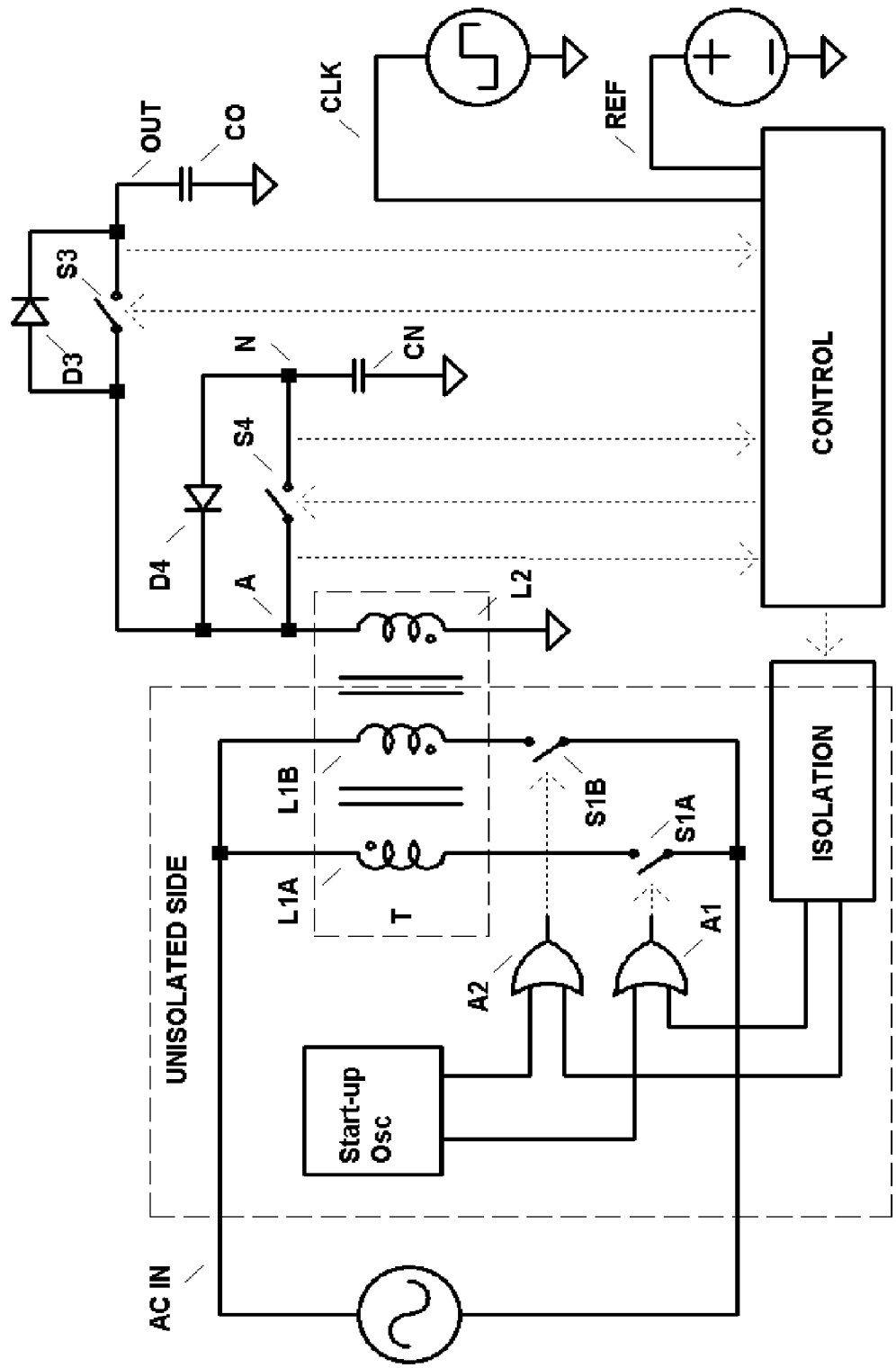
FIG. 24 shows a schematic block diagram of a dual primary, single secondary transformer in a topology with 4 switches forming a unipolar, bidirectional power converter with PFC.

FIG. 24 shows a bidirectional variation of FIG. 20 involving only the addition of one unipolar blocking switch S3 connected across diode D3, plus the control for that switch. The primary of transformer, T, split into oppositely poled windings L1A and L1B, is driven by switches S1A and S1B. The second primary winding S1B assures that available energy from the unisolated side can always be placed in the correct polarity for direct support of the output. That ability reduces the percentage of energy that moves into, and out of, storage for improved efficiency. A single-turn pulse transformer can control both isolated side switches based on the polarity of pulses generated.

An oscillator, Start-up Osc, runs initially to activate switches S1A and S1B through OR gates A1 and A2 to pump energy from input, AC IN, through transformer, T, into storage capacitor, CN. Once the control block, CONTROL, is sufficiently powered by N, it takes over the operation of S1A and S1B, via wireless communication through isolation block, ISOLATION, and through OR gates A1 and A2. Isolation block, ISOLATION, can be a commercially available two-channel digital isolator, or a pulse transformer driven in one polarity to activate S1A and in the other polarity to activate S1B. A small toroid core with as little as a single turn for primary and secondary in combination with pulse and sign detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, it is established which direction energy needs to move in order to achieve regulation. If a forward transfer is indicated, meaning the output should increase, then the steps taken exactly follow the steps in the example of FIG. 20. For clarity, those steps are repeated here.

During the first half-cycle, either switch S1A or S1B is activated, based on the AC IN polarity, until one of two conditions is met: 1) the constant ON time elapses, or 2) the transformer contains enough energy to satisfy the energy demand at the output. In either case, the actual ON time is stored for use later in the cycle, and the inductive energy in L2 is transferred to the output through diode D3. The voltage at point A during charging is useful for developing a volt-time product representing the energizing current in transformer T for step 2, above.

The second half of the control cycle follows a different course for case 1 and 2 above. In case 1, the output did not reach the regulation point, so the next step is to energize L2 from the storage reservoir, N, up to the demand energy, as calculated by the CONTROL block. Case 1 completes with the transfer of that L2 energy through diode D3 to support the output, OUT. In this case, the PFC requirement is met in the first half-cycle, and the regulation requirement is met in the second half-cycle.

In case 2, the output did reach the regulation point, but the PFC ON time was not completed, so the next step is to energize from the AC input, AC IN, for the remainder of the ON time requirement. Note that there is not a linear relationship between PFC ON time and energy, so a calculation is involved to determine the necessary additional PFC ON time required. That calculation can be done by the CONTROL block, or, for speed and simplicity, a table can contain that information such that for any first half-cycle PFC ON time, there is a corresponding second half-cycle PFC ON time. Case 2 completes with the transfer of that energy in L2 through diode D4 or switch S4 to storage reservoir, CN. In this case, the regulation requirement is met in the first half-cycle, and the PFC requirement is met in the second half-cycle.

If, at the start of the first half-cycle, it is established that energy needs to move in the reverse direction, that is, the output magnitude should decrease, then a reverse transfer is indicated. During the first half-cycle, either switch S1A or S1B is activated, based on the AC IN polarity, so that energy is correctly poled to be transferred to storage reservoir CN, and energizing L1 continues until the PFC ON time has elapsed. That energy is then transferred to CN via diode D4, or by a switch, S4, used as a synchronous rectifier. In the second half of the cycle, switch S3 energizes transformer winding L2 until the regulation point is reached. That energy is then transferred to CN via diode D4, or by a switch, S4, used as a synchronous rectifier. When following this control path, the PFC requirement is met in the first half-cycle, and the regulation requirement is met in the second half-cycle.

The voltage at N may vary over a large range during normal operation. Control block CONTROL also includes a slow, non-critical control loop which monitors the voltage at N. If N becomes too large, then the constant ON time is slightly reduced. If N becomes too small, then the constant ON time is slightly increased. These ON time changes are heavily filtered so as not to reduce the Power Factor by changing the ON time significantly during a single AC cycle.

Figure 25:
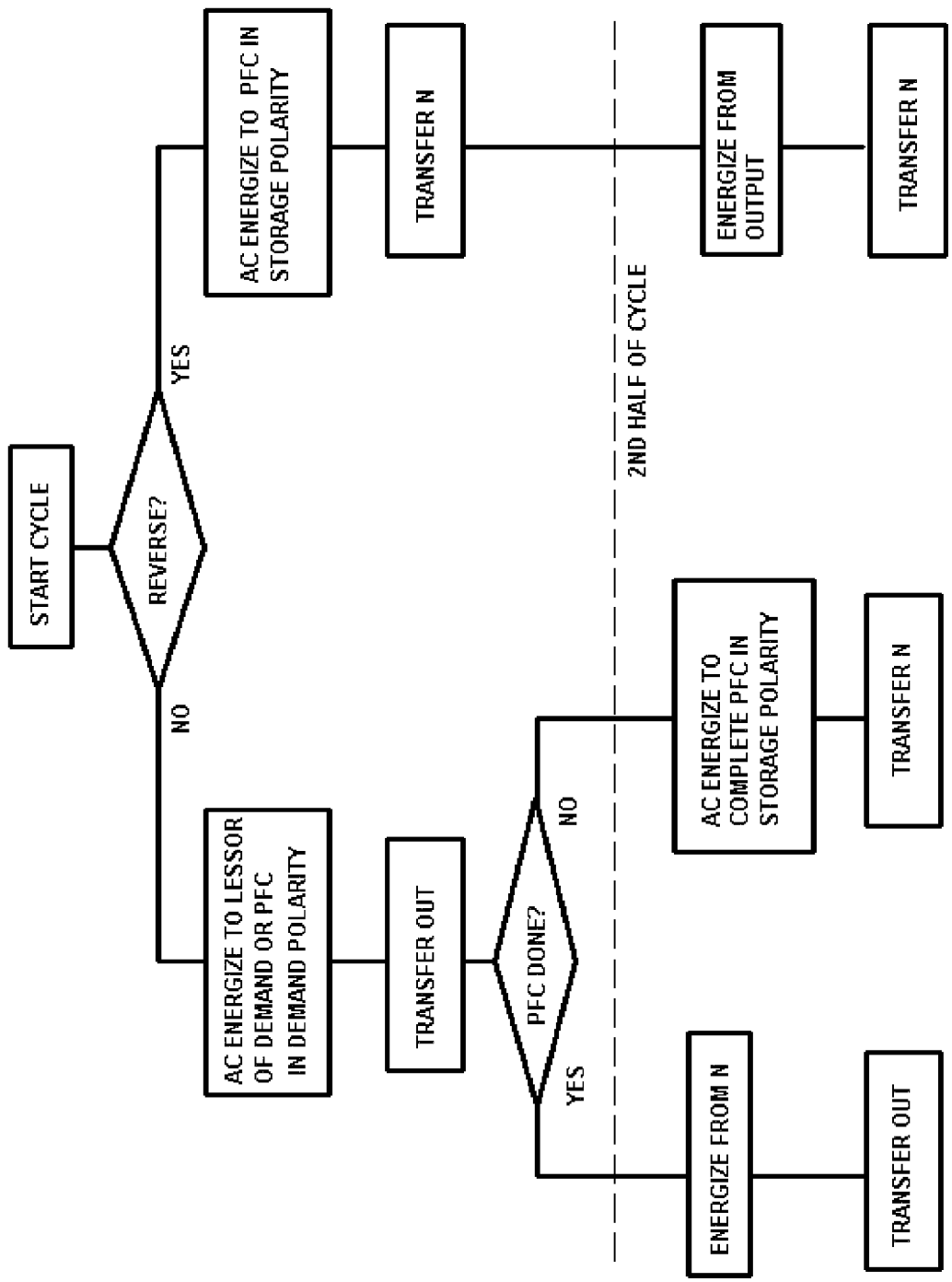
FIG. 25 shows a flow chart for control of the power converter of FIG. 24.

The operation above is shown in flowchart form in FIG. 25. That control can be implemented as a state machine, in programmable logic, in a microcontroller, or using discrete circuitry.

Figure 26:
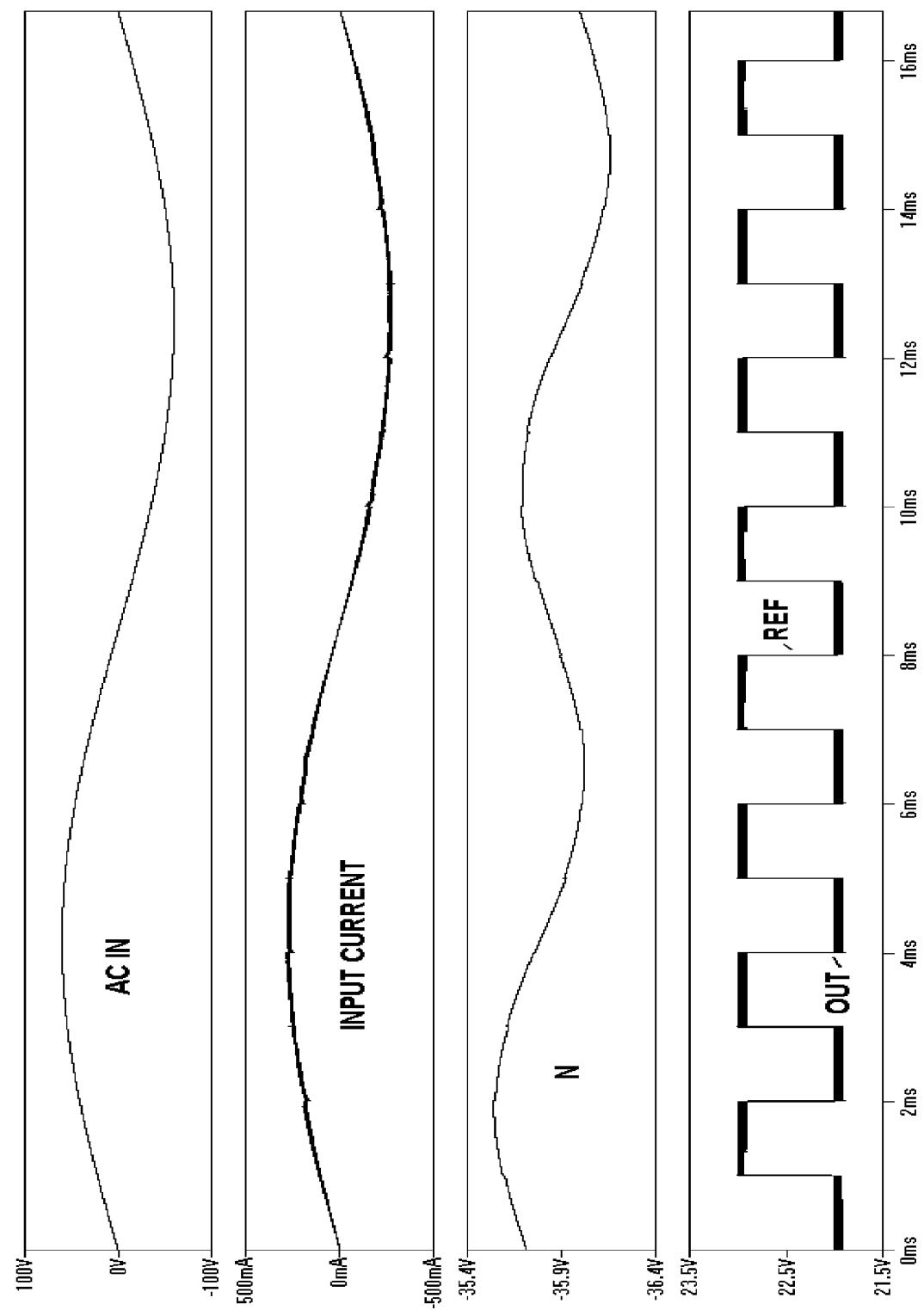
FIG. 26 shows simulated waveforms for the converter of FIG. 24 in operation.

FIG. 26 shows SPICE waveforms of the example of FIG. 24 in operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. Over the one complete AC cycle shown, voltage N ends more negative than it begins. That indicates that the ON time is longer than it needs to be to maintain an average storage voltage of 36 volts at point N. Remember that the ON time changes only slowly, so it may take many AC cycles to stabilize. The fourth axis shows the reference voltage, REF, here an offset square wave at 500 Hz with an amplitude of 2 volts, and the output voltage, OUT. The bidirectional regulation can be seen as the power converter follows both the positive and negative transitions faithfully.

Figure 27:
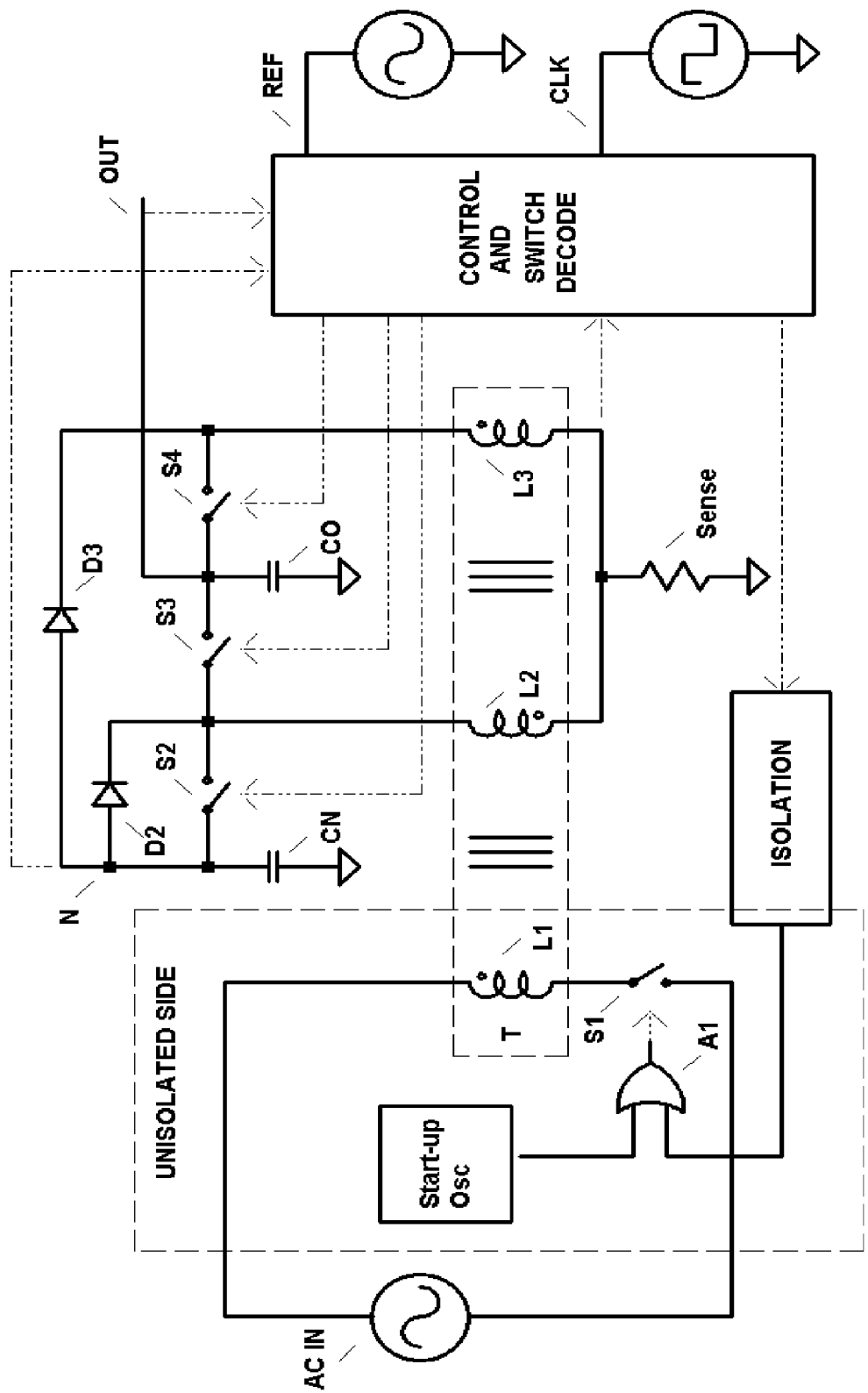
FIG. 27 shows a schematic block diagram of a single primary, dual secondary transformer in a topology with 4 switches, 3 of which are bipolar blocking, forming a bipolar, bidirectional power converter with PFC.

FIG. 27 shows a bipolar, bidirectional topology employing a dual secondary winding for transformer T, consisting of two oppositely poled windings L2 and L3. The isolated side winding, L1, is driven by switch S1. The two secondary windings assure that available energy from the unisolated side can always be applied in the correct polarity for direct support of the output. That ability reduces the percentage of energy that moves into, and out of, storage for improved efficiency. A single-turn pulse transformer can isolate the control for the unisolated side switch.

Again, an oscillator, Start-up Osc, runs initially to activate switch S1 through OR gate A1 to pump energy from input, AC IN, through transformer, T, into storage capacitor, CN. Once the control block, CONTROL AND SWITCH DECODE, is sufficiently powered by N, CONTROL AND SWITCH DECODE takes over the operation of S1, via wireless communication through isolation block, ISOLATION, and through OR gate A1. Isolation block, ISOLATION, can be a commercially available digital isolator, or a pulse transformer. A small toroid core with as little as a single turn for primary and secondary in combination with pulse detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, switch S1 is activated until the constant ON time period elapses. If the input energy polarity matches the output demand polarity, then inductive energy is transferred to OUT through L3 and S4. If the input energy polarity does not match the output demand polarity, then inductive energy is transferred to OUT through L2 and S3. In either case, either S3 or S4 is turned off by CONTROL AND SWITCH DECODE when the demand is met. Excess inductive energy, if any, then passes through either D2 or D3 into storage reservoir CN.

At the start of the second half-cycle, it is established whether energy needs to move in the forward or reverse direction. If the output magnitude needs to increase, then a forward transfer is indicated. If the output magnitude needs to decrease, then a reverse transfer is indicated. For the forward case, the next step is to energize L2 from the storage reservoir, CN, through switch S2 up to the demand energy, as calculated by the CONTROL AND SWITCH DECODE block. Current sense resistor, Sense, provides a voltage proportional to inductive current for determining energy supply, or a volt-time product can provide that information. Then, based on the polarity of demand at the output, energy is transferred from L2 or L3 to OUT through either switch S3 or S4. For the reverse case, the next step is to energize L2 or L3 from the output through either switch S3 or S4 until the regulation point is reached, at which point the switch is opened. Then, that energy will transfer to storage reservoir, CN, through diode D2 or D3. In this topology, the PFC requirement is met in the first half-cycle, and the regulation requirement is met in the second half-cycle.

The voltage at N may vary over a large range without interfering with normal operation. Control block CONTROL AND SWITCH DECODE also includes a slow, non-critical control loop which monitors the voltage at N. If N becomes too large, the constant ON time is slightly reduced. If N becomes too small, the constant ON time is slightly increased. These ON time changes are heavily filtered so as not to reduce the Power Factor by changing the ON time significantly during a single AC cycle.

Figure 28:
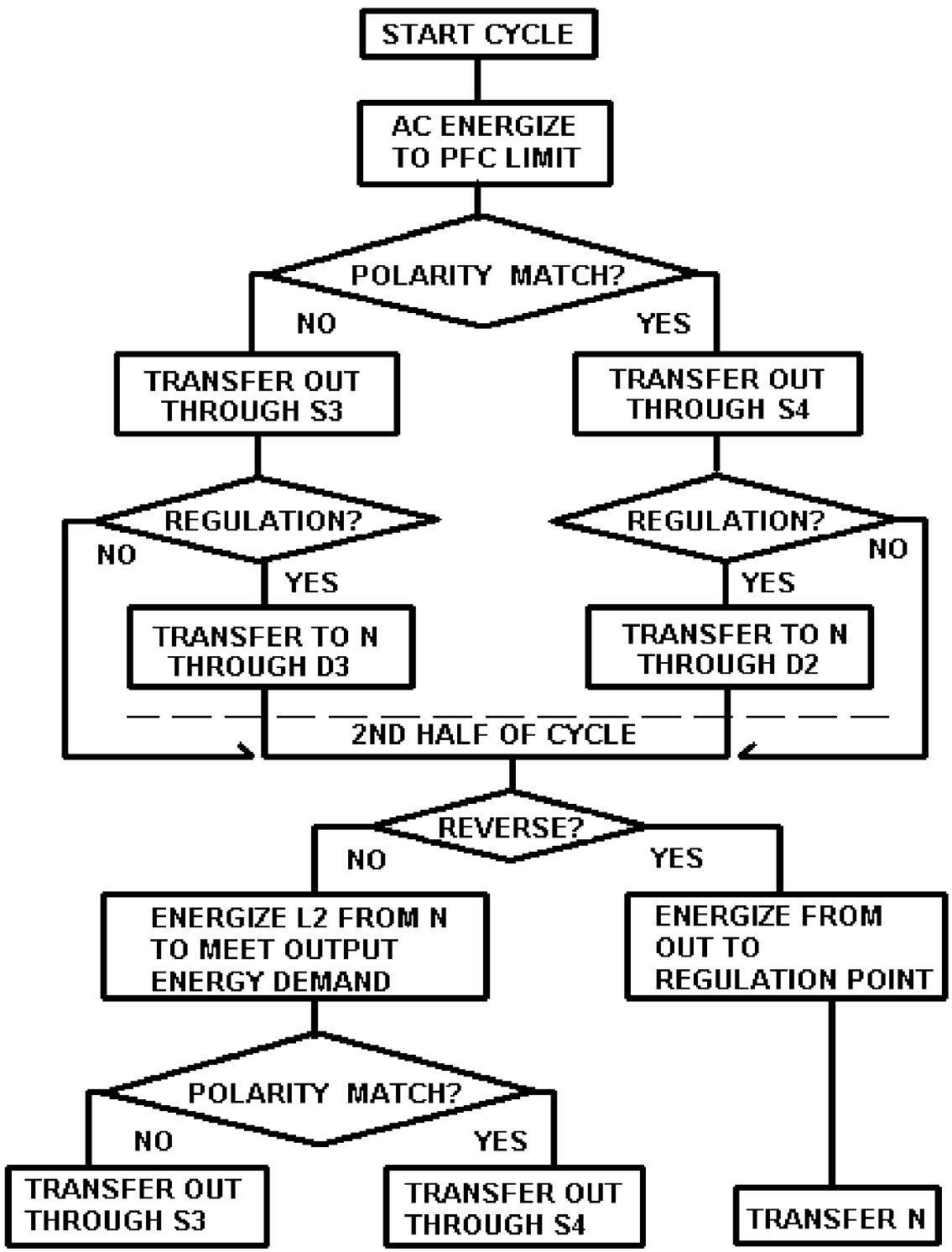
FIG. 28 shows a flow chart for control of the power converter of FIG. 27.

The operation above is shown in flowchart form in FIG. 28. That control can be implemented as a state machine, in programmable logic, in a microcontroller, or using discrete circuitry.

Figure 29:
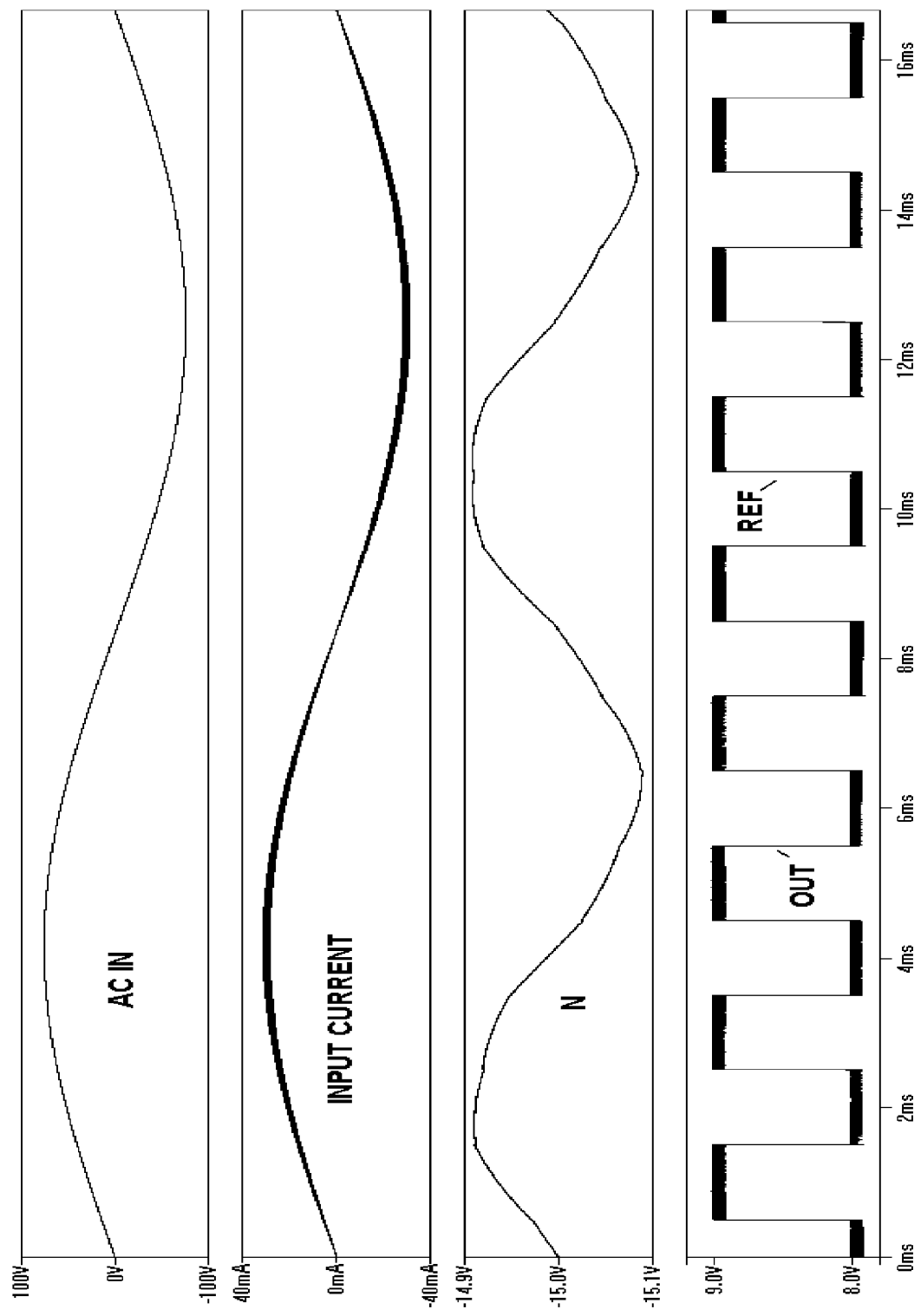
FIG. 29 shows simulated waveforms for the converter of FIG. 27 in unipolar operation.

FIG. 29 shows SPICE waveforms of the example of FIG. 27 in unipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated at twice the frequency of the AC input voltage. The fourth axis shows the reference voltage, REF, here an offset square wave at 500 Hz with an amplitude of 1 volt, and the output voltage, OUT. The bidirectional behavior can be seen as the power converter faithfully follows both the positive and negative transitions of the reference voltage.

Figure 30:
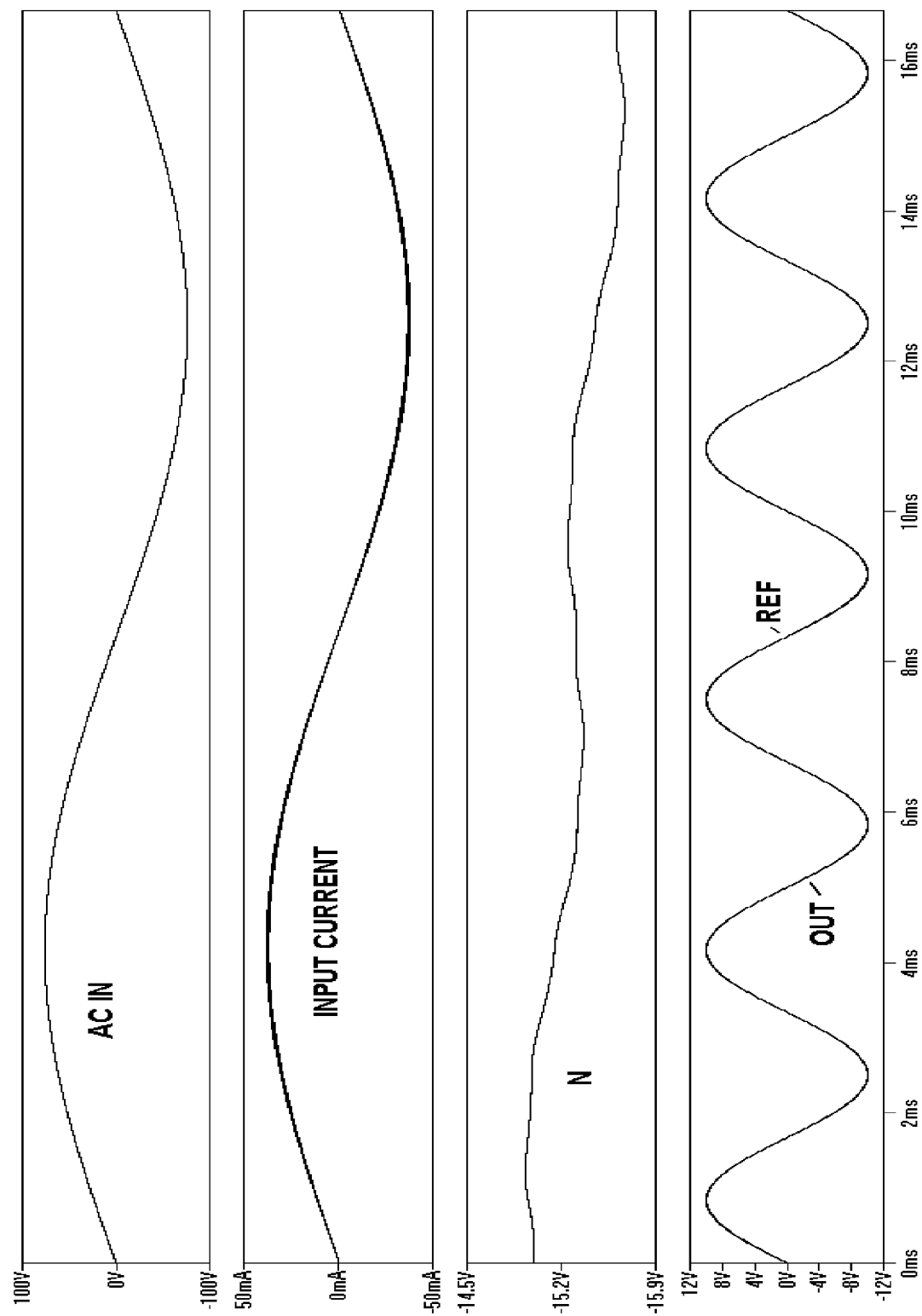
FIG. 30 shows simulated waveforms for the converter of FIG. 27 in bipolar operation.

FIG. 30 shows SPICE waveforms of the example of FIG. 27 in bipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the negative storage voltage, N. Voltage N is seen to increase and decrease, modulated by twice the frequency of the AC input voltage and by the output frequency. The ON time is here longer than needed to maintain the storage voltage at −15.5 volts, so N is seen to increase in magnitude. The fourth axis shows the reference voltage, REF, here a sine wave at 300 Hz with an amplitude of +/−10 volts, and the output voltage, OUT. The bipolar, bidirectional behavior can be seen as the output trace is indistinguishable from the reference trace.

Figure 31:
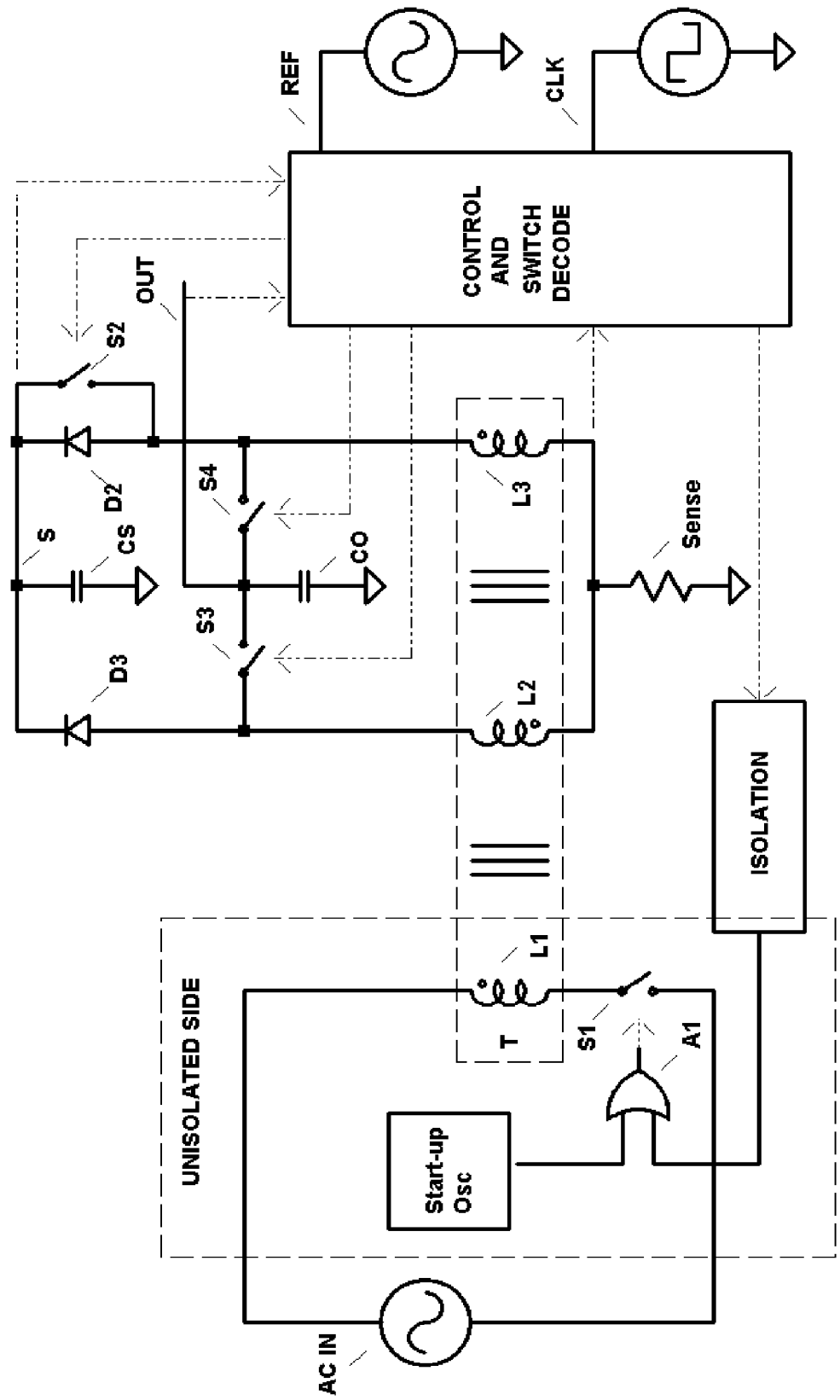
FIG. 31 shows a schematic block diagram of the power converter of FIG. 27 with a positively poled storage reservoir.

FIG. 31 shows the power converter of FIG. 27 with a positive storage voltage. Compared with diodes D2 and D3 and switch S2 of FIG. 27, the locations of the two diodes D2 and D3 and switch S2 in FIG. 31 are reversed to reverse the storage voltage polarity. The storage capacitor is renamed CS, and the storage voltage is renamed as S. The only change in control exchanges the selection of S3 and S4 as used when transferring energy from storage to the output. Since this topology of power converter can utilize positive or negative storage, system requirements can determine the preferred polarity for the storage reservoir.

Figure 32:
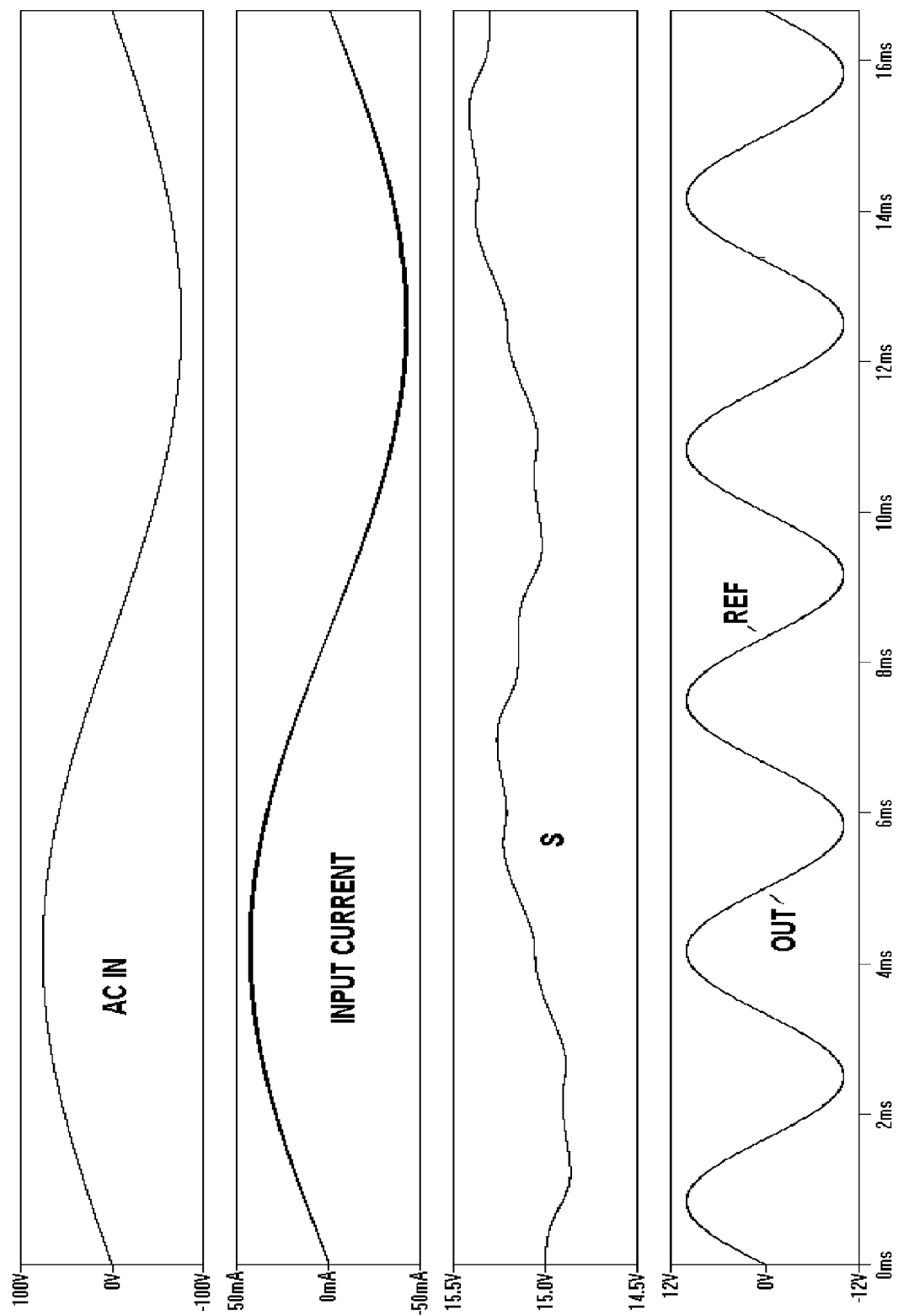
FIG. 32 shows simulated waveforms for the converter of FIG. 31 in operation.

FIG. 32 shows SPICE waveforms of the example of FIG. 31 in bipolar operation. The top trace shows one cycle of 60 Hz AC input voltage, AC IN. The second trace shows the input current, INPUT CURRENT, low-pass filtered to remove most of the switching frequency. The filtered input current can be seen to be proportional to, and in phase with, the AC input voltage. The third trace shows the positive storage voltage, S. Voltage S is seen to increase and decrease, modulated by twice the frequency of the AC input voltage and by the output frequency. The ON time is here longer than needed to maintain the storage voltage at 15 volts, as indicated by the increase in S over one AC cycle. The fourth axis shows the reference voltage, REF, here a sine wave at 300 Hz with an amplitude of +/−10 volts, and the output voltage, OUT. The bipolar, bidirectional behavior can be seen as the output trace is indistinguishable from the reference trace.

A unipolar variation on the power converter of FIG. 31 can use a rectified AC input, allowing switch S1 to be a conventional switch with a body diode. Then, for a unipolar output voltage, switch S3 or S4 can be eliminated, depending on output polarity. The result is a bidirectional, unipolar power converter with PFC requiring one bipolar blocking switch S2 and two unipolar blocking switches S1 and either S3 or S4.

Figure 33:
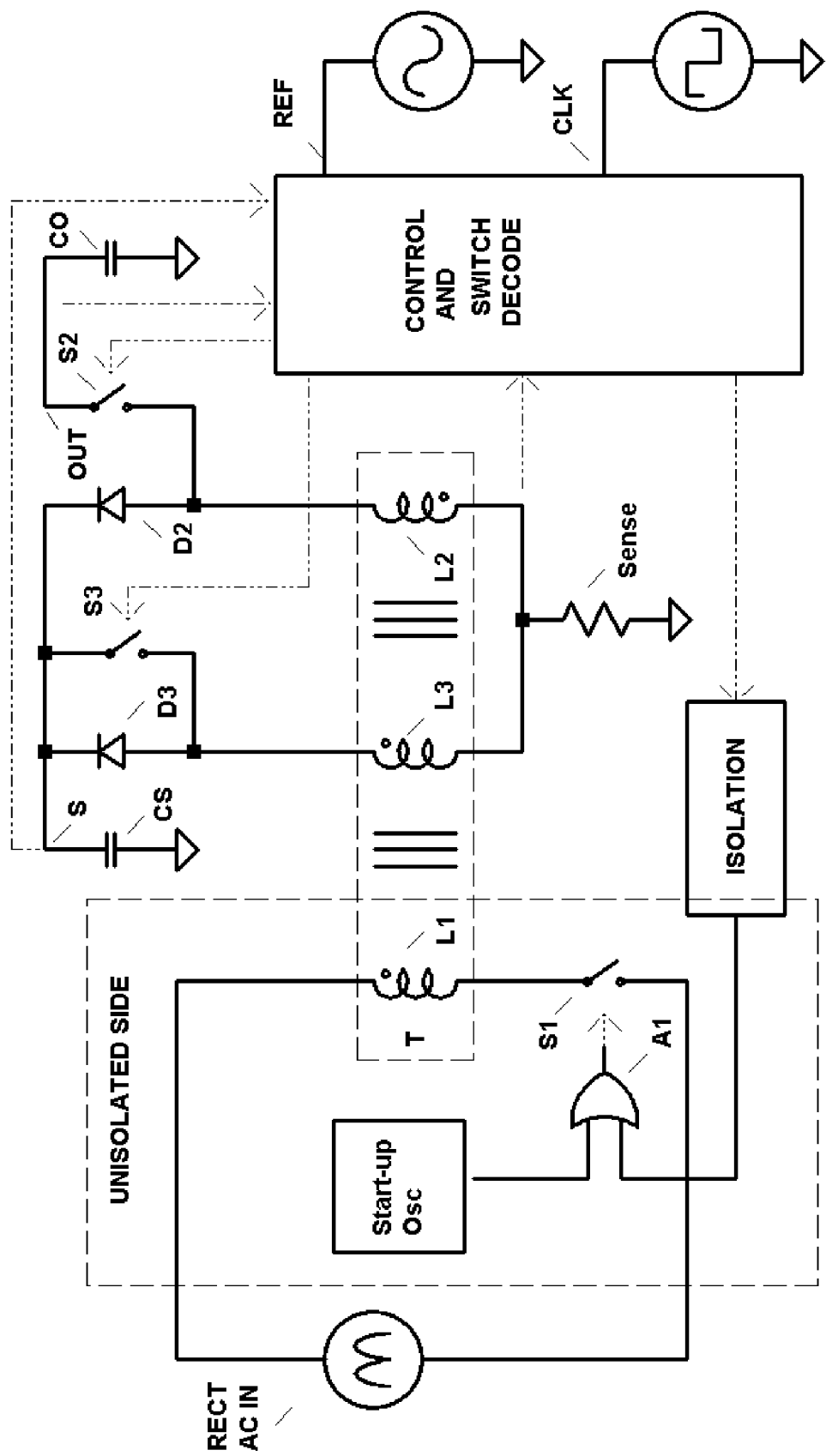
FIG. 33 shows a schematic block diagram of a single primary, dual secondary transformer in a topology with 3 switches, 1 of which is bipolar blocking, forming a unipolar, bidirectional power converter with PFC.

FIG. 33 shows a unipolar, bidirectional topology employing a dual secondary winding for transformer T, consisting of oppositely poled windings L2 and L3. In FIG. 33, both the storage voltage, S, and the output, OUT, are positive. The AC input, RECT AC IN, is received as a rectified input in this case. The isolated side winding, L1, is driven by switch S1, which need not be bipolar blocking. The two secondary windings assure that available energy from the unisolated side can always be applied in the correct polarity for direct support of the output. That ability reduces the percentage of energy that moves into, and out of, storage for improved efficiency. A single-turn pulse transformer can isolate the control for the unisolated side switch.

An oscillator, Start-up Osc, runs initially to activate switch S1 through OR gate A1 to pump energy from input, RECT AC IN, through transformer, T, and diode D3 into storage capacitor, CS. Once the control block, CONTROL AND SWITCH DECODE, is sufficiently powered by S, CONTROL AND SWITCH DECODE takes over the operation of S1, via wireless communication through isolation block, ISOLATION, and through OR gate A1. Isolation block, ISOLATION, can be a commercially available digital isolator, or a pulse transformer. A small toroid core with as little as a single turn for primary and secondary in combination with pulse detection can serve the purpose.

The output, OUT, filtered by capacitor CO, is regulated to match the reference, REF, by the following process, or its equivalent.

Each control cycle, as clocked by CLK, is divided into two halves. At the start of the first half-cycle, switch S1 is activated until the constant ON time period elapses. Then, L2 energy is transferred to OUT through S2 until any demand is met. Once the regulation point has been reached, switch S2 opens, and any excess inductive energy in L2 passes through D2 into storage reservoir CS.

At the start of the second half-cycle, it is established whether energy needs to move in the forward or reverse direction. If the output magnitude needs to increase, then a forward transfer is indicated. If the output magnitude needs to decrease, then a reverse transfer is indicated. For the forward case, the next step is to energize L3 from the storage reservoir, CS, through switch S3 up to the demand energy, as calculated by the CONTROL AND SWITCH DECODE block. Current sense resistor, Sense, can provide a voltage proportional to inductive current for determining energy supply. Then, energy is transferred from L2 to OUT through switch S2. For the reverse case, the next step is to energize L2 from the output through switch S2 until the regulation point is reached at which point the switch is opened. Then, that energy will transfer from L3 to storage reservoir, CS, through diode D3 or switch S3. In this topology, the PFC requirement is met in the first half-cycle, and the regulation requirement is met in the second half-cycle.

The voltage at S may vary over a large range without interfering with normal operation. Control block CONTROL AND SWITCH DECODE also includes a slow, non-critical control loop which monitors the voltage at S. If S becomes too large, then the constant ON time is slightly reduced. If S becomes too small, then the constant ON time is slightly increased. These ON time changes are heavily filtered so as not to reduce the Power Factor by changing the ON time significantly during a single AC cycle.

Figure 34:
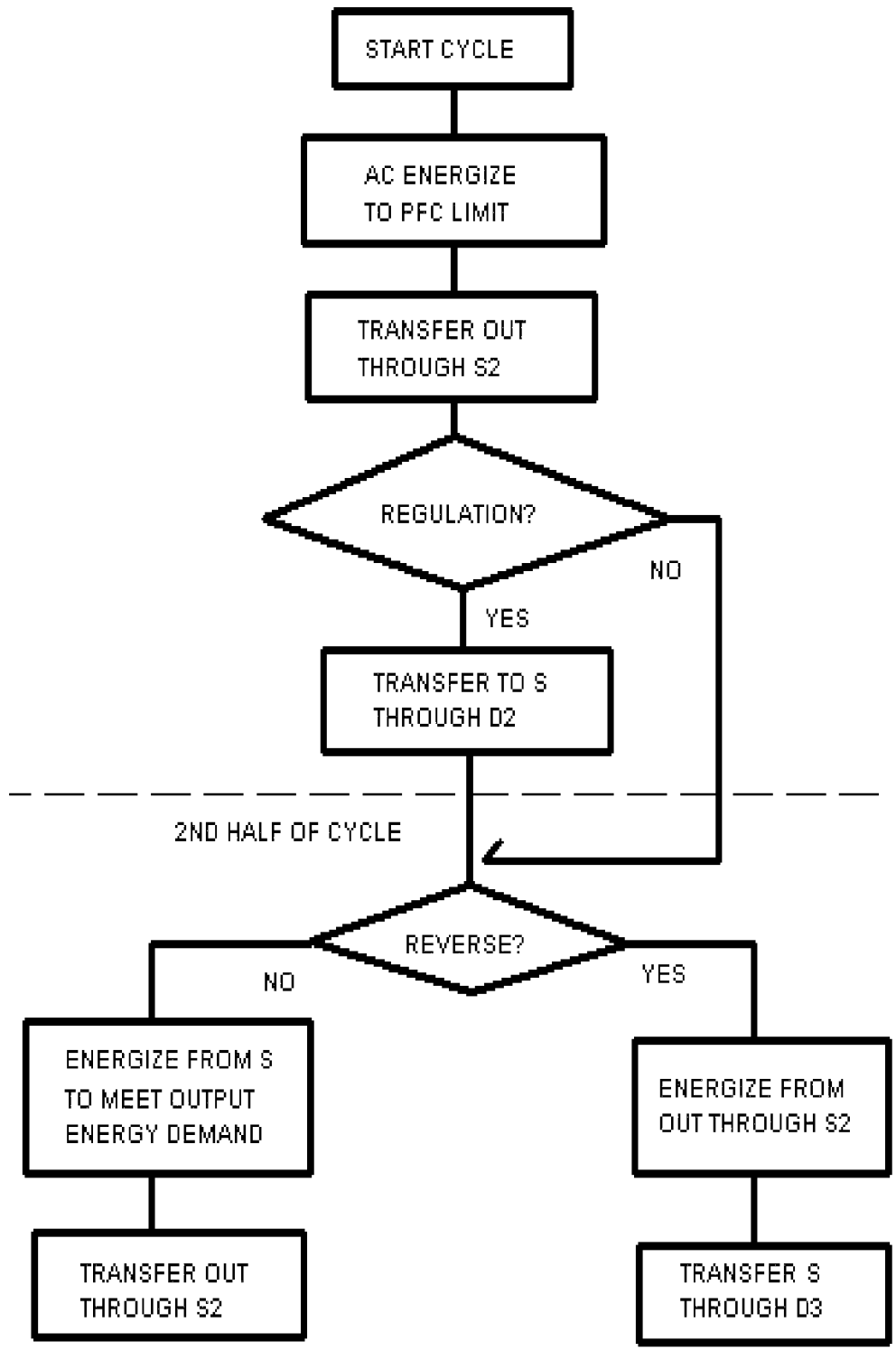
FIG. 34 shows a flow chart for control of the power converter of FIG. 33.

The operation above is shown in flowchart form in FIG. 34. That control can be implemented as a state machine, in programmable logic, in a microcontroller, or using discrete circuitry.

Figure 35:
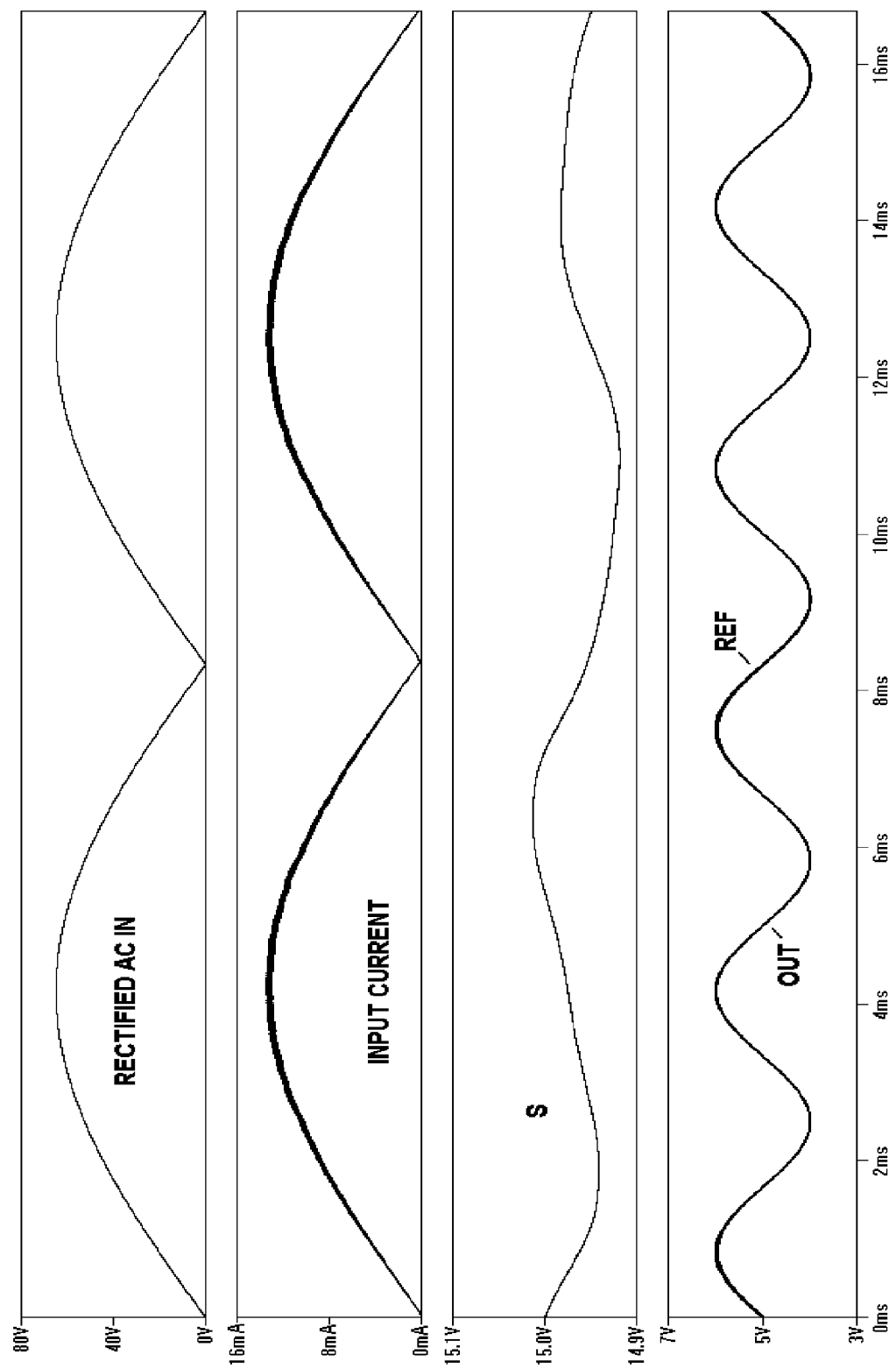
FIG. 35 shows simulated waveforms for the converter of FIG. 33 in operation.

FIG. 35 shows SPICE waveforms of the example of FIG. 33 in unipolar operation. The top trace shows one cycle of 60 Hz AC input voltage, AC IN. The second trace shows the rectified input current, INPUT CURRENT, low-pass filtered to remove most of the switching frequency. The filtered input current can be seen to be proportional to, and in phase with, the AC input voltage. The third trace shows the storage voltage, S. Voltage S is seen to increase and decrease, modulated at twice the frequency of the AC input voltage. The fourth axis shows the reference voltage, REF, here an offset sine wave at 300 Hz with an amplitude of 2 volts, and the output voltage, OUT. The bidirectional behavior can be seen as the power converter faithfully follows the reference voltage.

Figure 36:
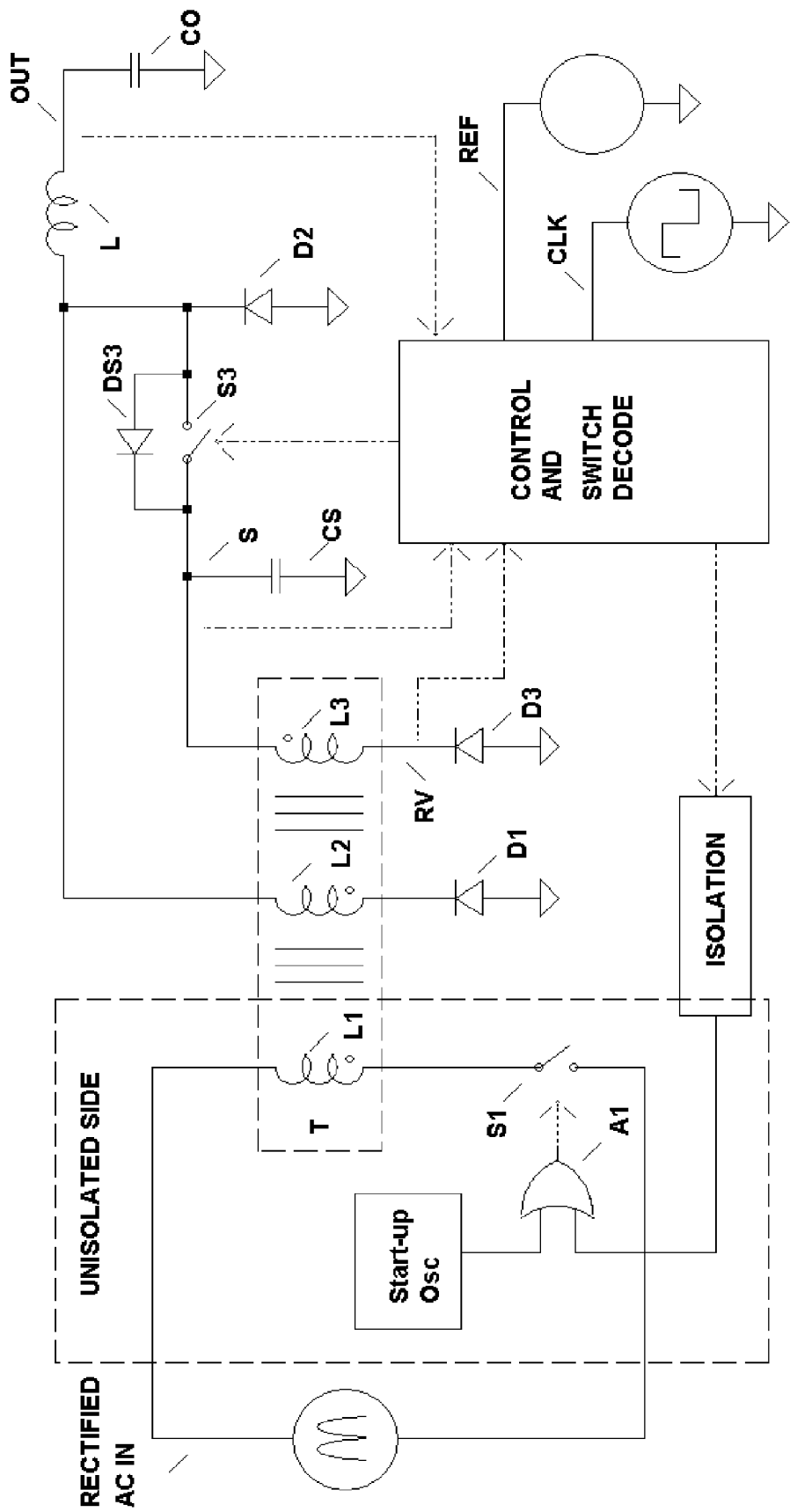
FIG. 36 shows a schematic block diagram of a single primary, dual secondary transformer in a topology with 2 switches, forming a unipolar, unidirectional power converter with PFC.

FIG. 36 shows a unipolar, unidirectional topology employing a dual secondary winding for transformer T, consisting of oppositely poled windings L2 and L3. This topology offers near-ideal PFC, good output regulation, excellent efficiency, low cost, and scalable power levels while employing just two switches. Both switches can be conventional FETs with body diodes, e.g., bipolar blocking is not necessary. The AC input, RECTIFIED AC IN, is rectified in this case. The unisolated side winding, L1, is driven by switch S1. The two secondary windings, L2 and L3, are oppositely poled. Winding L2 provides a forward energy path to the output, OUT, in combination with diode D1 and inductor L. Winding L3 provides a flyback path through diode D3 that moves inductive energy to the storage capacitor, CS. The combination of forward and flyback energy transfers enables higher power levels while preserving Power Factor Correction, and provides good regulation with excellent efficiency.

Diode D2 acts as the freewheeling diode for the buck inductor, L. Switch S3 provides a supplemental energy path from storage, CS, through the buck inductor, to the output, OUT, as filtered by filter capacitor CO. Diode DS3 is the body diode of switch S3, shown explicitly. The UNISOLATED SIDE is identical to that of FIGS. 14, 27, and 31 with the exception that the AC input node is RECTIFIED AC IN. An oscillator, Start-up Osc, turns on switch S1 at a low rate through OR gate A1 to energize storage capacitor CS, through transformer T. Energy is moved to CS through winding L3 and diode D3. Once the CONTROL AND SWITCH DECODE block is powered by voltage S, the CONTROL AND SWITCH DECODE block takes over the control of switch S1 via wireless communication through the isolation block, ISOLATION, and then via the second input to OR gate A1.

The CONTROL AND SWITCH DECODE block is paced by clock CLK. It uses a voltage reference, REF, for comparison when regulating the voltage or current at output OUT. The operation is similar to other implementations described here. Voltage RV provides a reflection of the AC input voltage for use in the calculation of the appropriate ON time. Energy is moved directly from input to output through the forward winding L2. A portion of the inductive energy will move directly to storage in CS via a flyback transfer through the flyback winding L3. Energy will also move to storage through the body diode of S3, DS3, when the voltage at L2 is higher than the storage voltage. The amount of energy that flows through DS3 to storage in CS is dependent on the input and storage voltages and on the transformer turns ratio. Adequate output regulation can be achieved by allowing the storage voltage S to center near that voltage which causes the output to rise only slightly during peaks in the input voltage. Because of the implicit output regulation, there is a tradeoff between output regulation and the percentage of converted energy which moves through the forward winding. Less energy moved through the forward winding, L2, allows better regulation.

Figure 37:
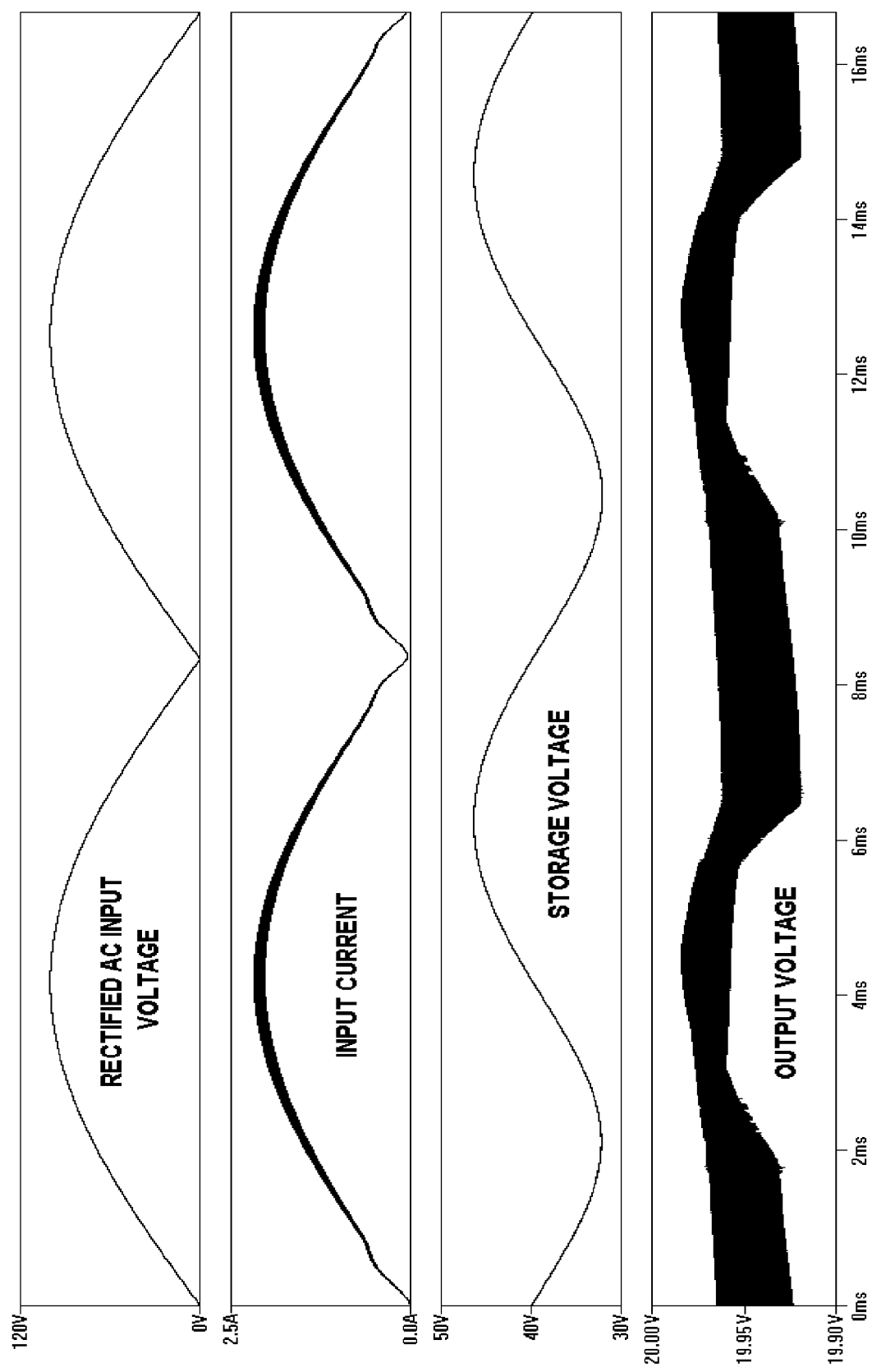
FIG. 37 shows simulated waveforms for the converter of FIG. 36 in operation.

Approximately half the power moves through each winding for the OUTPUT VOLTAGE waveform shown in FIG. 37, which is a SPICE simulation of the example of FIG. 36. The top trace shows one cycle of 60 Hz AC input voltage, RECTIFIED AC INPUT VOLTAGE. The second trace shows the input current, INPUT CURRENT. The input current can be seen to be proportional to, and in phase with, the AC input voltage. The third trace shows S, the STORAGE VOLTAGE. Voltage S is seen to increase and decrease, modulated at twice the frequency of the AC input voltage. The fourth axis shows the output, OUTPUT VOLTAGE. The slight reduction in the output during periods of lower AC input voltage is caused by the proportionally reduced reference voltage used by the supplemental power path. In many of these examples, it is desirable for the supplemental regulation to regulate to a voltage slightly below the regulation point of the main regulation. There does not have to be a separate reference. The reduced reference might be VREF*0.995. The supplemental power path need not supply energy to the output during peaks in the AC input. Peak energy from winding L2 can divide between (i) the body diode DS3 of S3 and (ii) inductor L. The body diode energy flows then into the storage capacitor CS, and the inductor energy flows to the output. This form of regulation is less than ideal. Even so, the entire voltage envelope for the nominal 20 volt output supply is seen here to be 70 mv. The slight distortion of the input current trace near zero volts input can be eliminated with an additional calculation.

Figure 38:
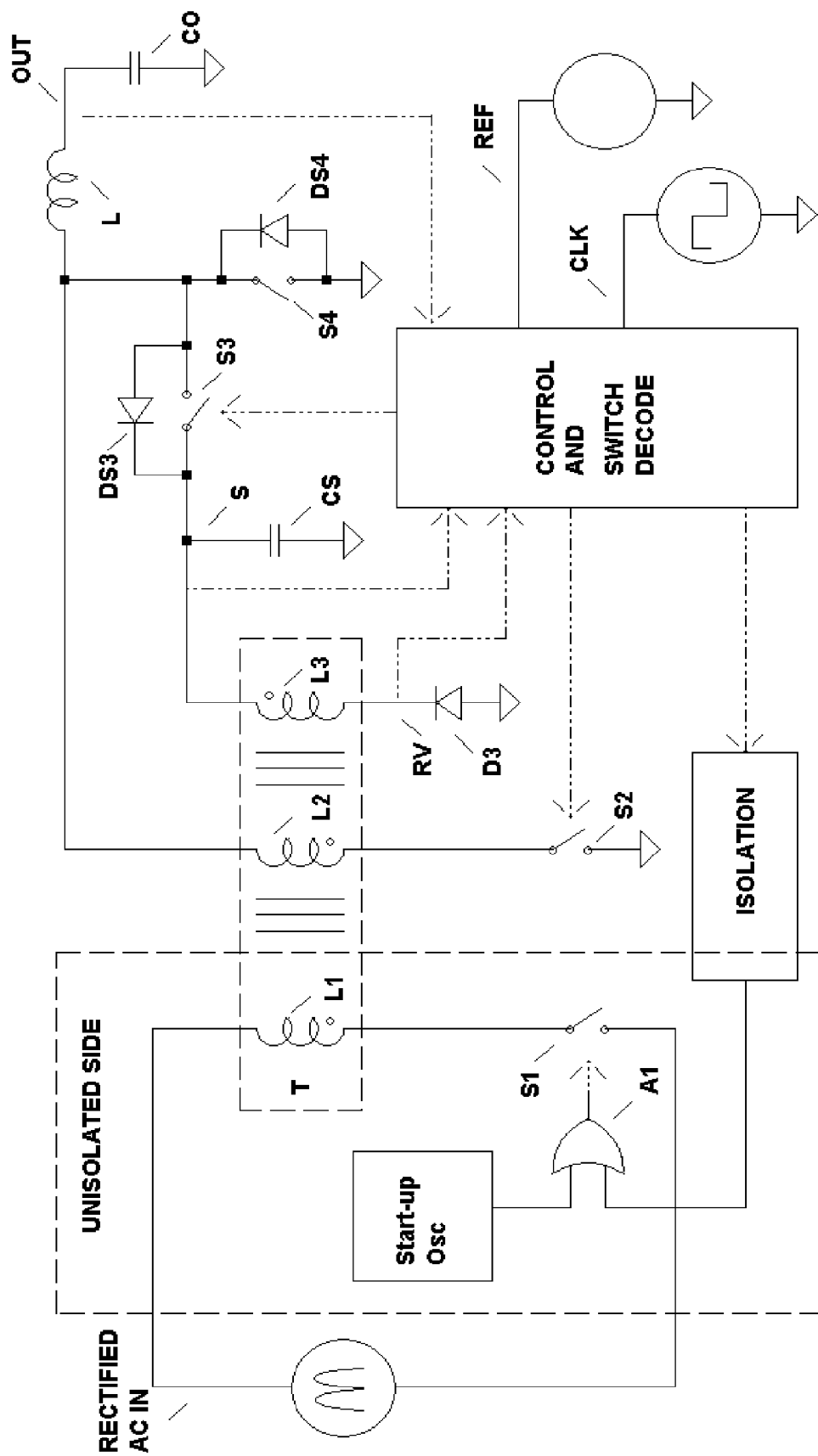
FIG. 38 shows a schematic block diagram of variations on the converter of FIG. 36 in block form.

Better regulation can be obtained using inductor L bidirectionality. FIG. 38 shows a variation on FIG. 36 with a synchronous rectifier switch, S4, in place of D2. The body diode of switch S4 is shown explicitly as DS4. Energy can be moved from the output, OUT, to inductor L by closing switch S4 at a time in the control cycle when no current is flowing in inductor L. Then, energy would flow from the output OUT into inductor L, until the regulation point was reached, at which time switch S4 opens. Then, the body diode of S3, shown explicitly as DS3, would be forward biased to transfer that inductive energy to the storage capacitor, CS. Switch S3 could be used to synchronously rectify that movement of energy into storage, for improved efficiency. With the ability to move energy from the output to storage, improved output regulation can be gained by correcting any voltage overshoot at the output. Also, a higher percentage of the total power can be routed through the forward winding, L2, without sacrificing regulation.

FIG. 38 includes one other variation that can be used in combination with, or instead of, bidirectional control for the supplemental converter. Using a bidirectionally blocking switch, S2, in place of diode D1, provides an alternative type of regulation. Any surplus energy in forward winding L2, e.g., energy not needed immediately to support the load, can selectively be moved directly to storage, CS, via a flyback transfer through the flyback winding L3, and diode D3, by opening switch S2. That mechanism reduces, or eliminates, the need for bidirectionality at the supplemental converter while maintaining excellent regulation. Since an efficient version of this topology would use synchronous rectification for D1 of FIG. 36, the only addition for better regulation would be to make that synchronous rectifier bipolar blocking. One effect of the use of a bidirectionally blocking switch S2 for regulation is that a larger percentage of the total power converted passes through the flyback winding. In cases where that is considered undesirable, FIG. 40 shows another alternative.

Figure 39:
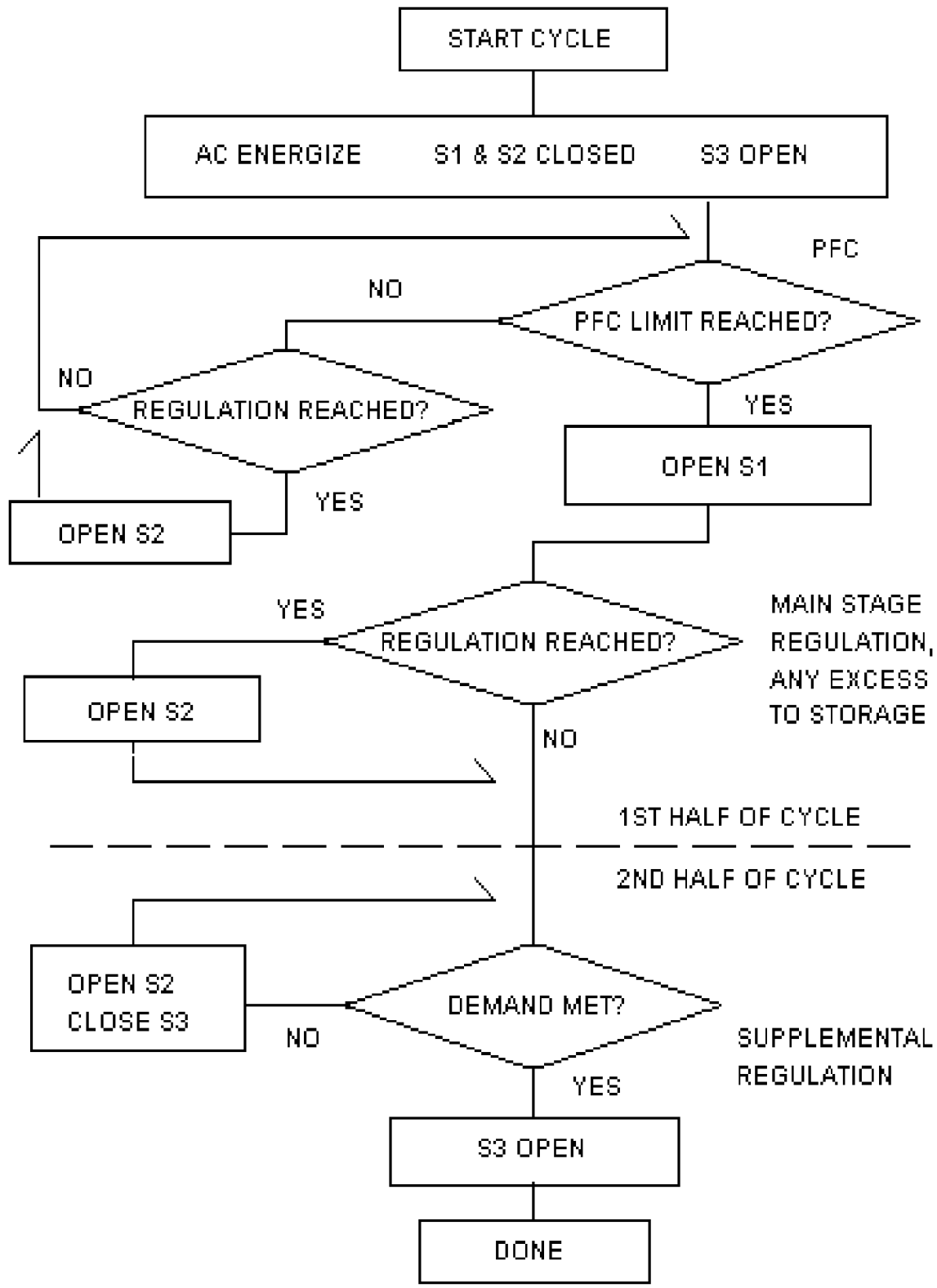
FIG. 39 shows a flow chart for control of the power converter of FIG. 38.

The operation for FIG. 38 is shown in flowchart form in FIG. 39. That control can be implemented as an integrated circuit, a state machine, in programmable logic, in a microcontroller, or using discrete circuitry. Elements of the first and second halves of the control cycle could be interchanged. The slow loop to control the storage voltage modulates the ON time for switch S1 over many AC input cycles to maintain good Power Factor Correction. The slow loop is not shown in the flowchart of FIG. 37.

Figure 40:
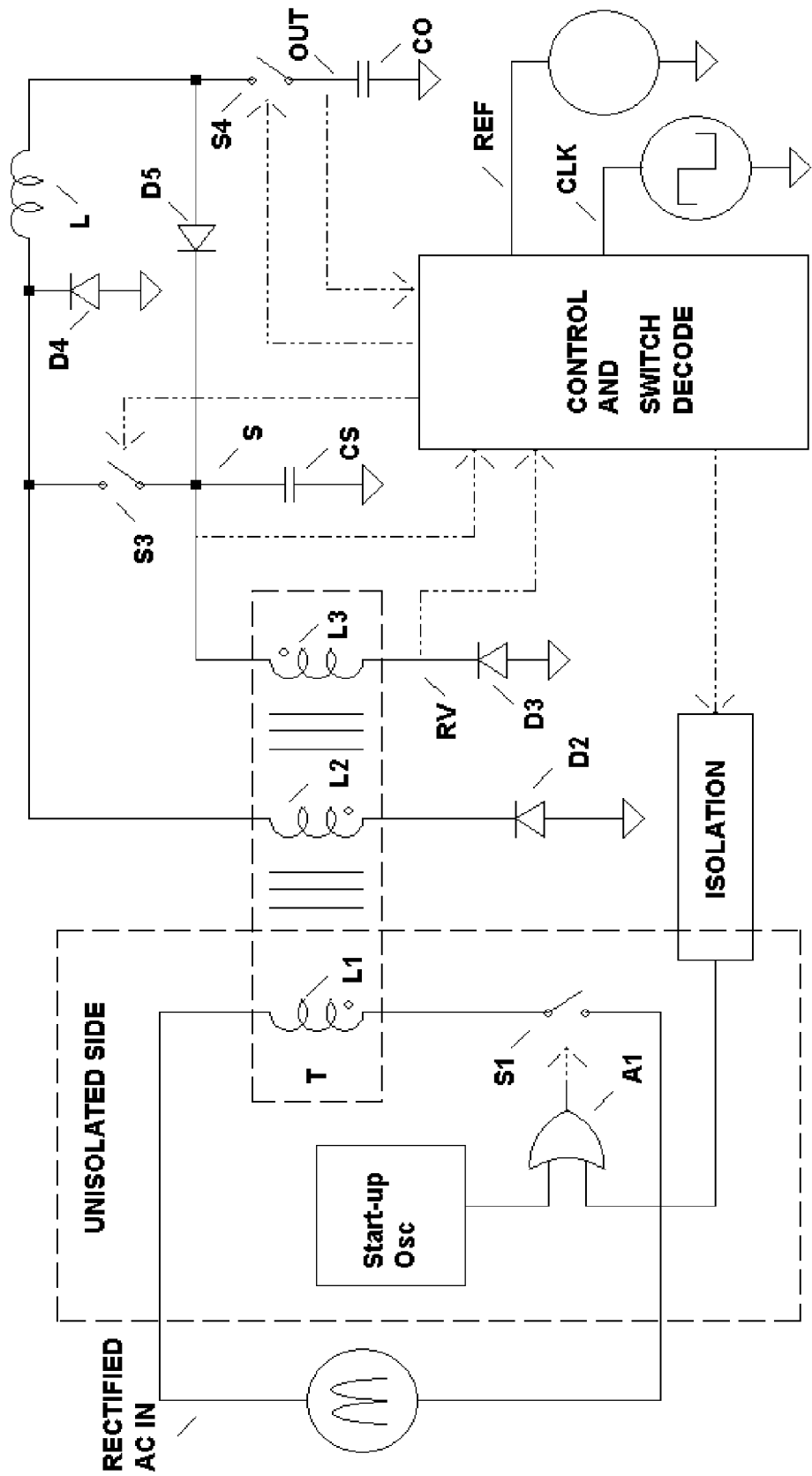
FIG. 40 shows a schematic block diagram of another variation on the converter of FIG. 36.

The circuit variation shown in FIG. 40 places a regulation switch, S4, between buck inductor L and the output, OUT, and places a diode, D5, from the junction of L and switch S4 to storage CS. Then, whenever the regulation switch S4 is opened, buck inductor energy flows through diode D5 to storage CS. That regulation approach allows minimizing the energy passing through the flyback winding L3. Otherwise, the structure and operation of FIG. 40 is the same as that of FIG. 36.

In FIGS. 36, 38, 40, and 41, the energy moved during an ON time period of switch S1 is not solely dependent on the volt-time product at winding L1. Therefore, calculating circuitry is needed for near-ideal Power Factor Correction. Alternatively, the energizing power can be integrated and that integral can be compared to an amount of energy that is in proportion to the input voltage. The converters of FIGS. 36, 38, 40, and 41 would use a non-critical control loop to slowly change the ON time in order to keep the storage voltage S within desired limits.

Again Predictive Energy Balancing is a valuable tool for improving regulation, but it is not required. The buck inductor L can have relatively low inductance, so that voltage overshoot at the output caused by energy flowing in the freewheeling diode D2 of FIG. 36, D4 of FIG. 40, or the synchronous rectifier S4 of FIG. 38, can be small, even when using simple comparators for control. Best efficiency occurs when the reference for the supplemental path is proportionally reduced to cause regulation at a slightly lower voltage than the main path. That technique causes the supplemental regulator to shut down entirely during peak periods at the AC input.

Figure 41:
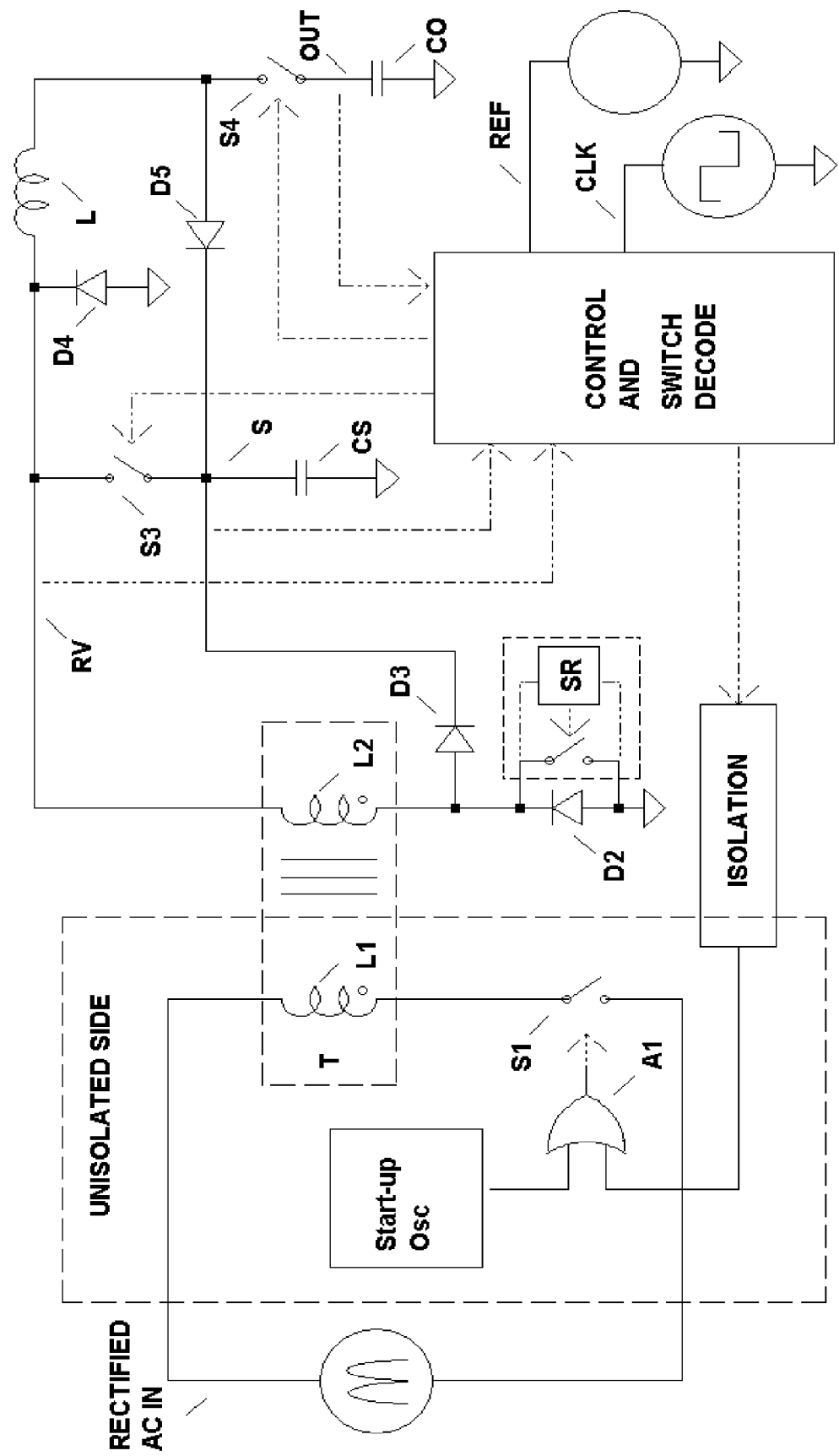
FIG. 41 shows a schematic block diagram of a variation on the converter of FIG. 36 having a single secondary winding.

It is impractical to show all the possible variations on the converter of FIG. 36. One possibility is to place a single secondary winding in a diode bridge to utilize inductive energy in both polarities. This variation is shown in FIG. 41. It is identical to FIG. 40 with the exception that (i) flyback winding L3 has been eliminated and (ii) diode D3 connects between the dotted end of winding L2 and the storage reservoir CS. Flyback energy in L2 then flows through D4 and D3 into storage reservoir CS. The reflection RV of the rectified AC input voltage, if desired for control, is obtained from the winding L2, in the absence of winding L3. Many of the variations applied to other examples shown can also be applied here. For example, any of the diodes can be replaced by synchronous rectifiers, for improved efficiency. For example, if diode D2 of FIG. 40 is implemented as a synchronously rectified diode, then a switch and switch control block SR would be included in the circuit, as shown in FIG. 41, where body diode D2 is an inherent part of the switch.

The unisolated side could use the dual primary of FIGS. 17, 20, and 24 to eliminate the diode bridge, or a comparator on the unisolated side could be used to detect the AC polarity and select the appropriate switch. Additional outputs can be added and individually regulated. Those skilled in the art could make a bipolar version, or a bipolar bidirectional version. Quasi-resonant techniques can be applied for reducing switch losses. The clock frequency can adapt to match the load. The power converter of FIG. 36 can pass into and out of continuous conduction mode once each AC half cycle.

Figure 42:
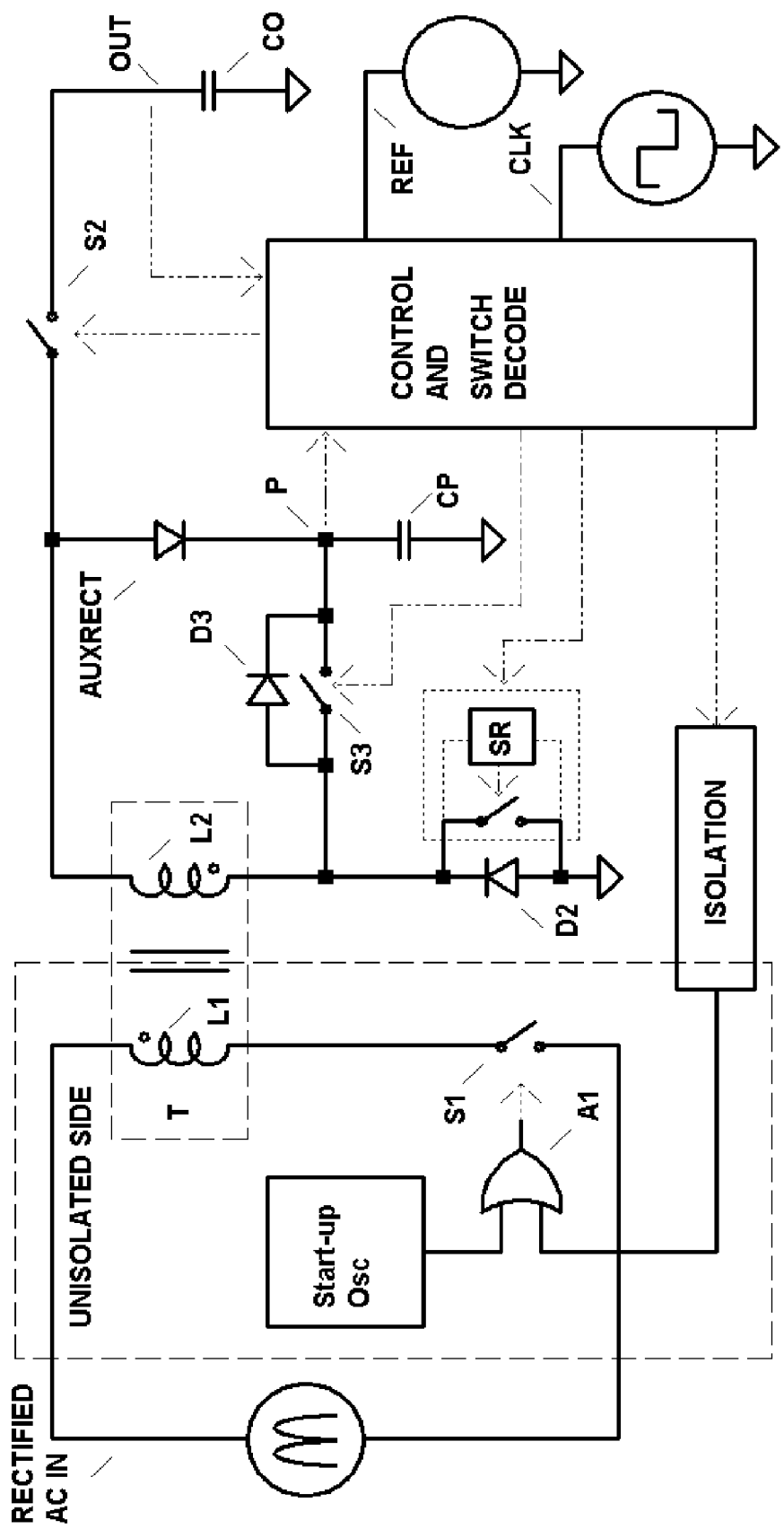
FIG. 42 shows a Power Factor Corrected power converter with a simple transformer and equi-polar output and storage voltages capable of unidirectional operation.

A form of unidirectional, unipolar output, rectified AC input power converter is shown in FIG. 42. FIG. 42 shows a Power Factor Corrected power converter with a simple transformer and equi-polar output and storage voltages capable of unidirectional operation. With controllable synchronous rectification, the power converter of FIG. 42 can be operated bidirectionally. The output voltage and the storage voltage are of the same polarity (i.e., equi-polar) for convenience and economy. The power converter of FIG. 42 can produce a positive output. To produce a negative output, the power converter of FIG. 42 can be modified by (i) changing the polarization of the transformer and (ii) reversing the three diodes AUXRECT, D2, and D3. Note that the sign of the output of the comparison between the output signal OUT and the reference signal REF performed within the CONTROL AND SWITCH DECODE block would be inverted.

The start-up process is controlled by a start-up oscillator (Start-up Osc), on the UNISOLATED SIDE of transformer T, which periodically turns on switch S1 through OR gate A1 to pump energy from input, RECTIFIED AC IN, through transformer T into storage capacitor CP by way of diodes D2 and AUXRECT. Once the control block CONTROL AND SWITCH DECODE, is sufficiently powered by voltage P, and voltage P is deemed high enough for proper operation, the CONTROL AND SWITCH DECODE block takes over the operation of S1, through isolation block ISOLATION, and through the other input of OR gate A1. Isolation block ISOLATION can be a pulse transformer or one of many forms of digital isolator, including commercially available digital isolators. A small toroid core with as little as a single turn for each of the primary and secondary windings can be used to provide isolation.

The output voltage OUT, filtered by capacitor CO, is compared to a reference voltage REF by the CONTROL AND SWITCH DECODE block, and regulated by the following process, or its equivalent.

Control cycles are clocked by CLK. At the start of a cycle, switch S1 is activated for a constant ON time, energizing the primary winding L1 of transformer T. Energy is then available at the secondary winding L2 of transformer T. The transformer T is shown polled such that the inductive energy will be in the correct polarity to directly service a positive output. That inductive energy is provided through diode D2 and switch S2, which is turned on by the CONTROL AND SWITCH DECODE block. Energy transfer continues until 1) the inductive energy is exhausted or 2) until the regulation requirement is met, whichever comes first. If the regulation requirement is met, then the CONTROL AND SWITCH DECODE block opens switch S2, so that any remaining inductive energy in transformer T is transferred to storage element CP through diode AUXRECT.

If the regulation requirement is met, then both the Power Factor Correction and output regulation requirements for the control cycle have been met, so there is no further activity until the next cycle begins. If the inductive energy is exhausted before the regulation requirement is met, then the output did not reach the regulation point. In that case, the supplemental power path may then provide supplemental energy to support the output OUT. In particular, the CONTROL AND SWITCH DECODE block closes switch S3. Switch S2 remains closed. Since voltage P is larger than voltage OUT, winding L2 acts as a buck inductor with diode D2 performing as a freewheeling diode. When sufficient energy has been placed in inductor L2, the CONTROL AND SWITCH DECODE block opens switch S3 to complete the regulation for the cycle. The next operating cycle for the power converter begins at the beginning of the next rising edge of the clock signal CLK. In alternative embodiments, the operating cycles begin at falling clock edges.

The CONTROL AND SWITCH DECODE block monitors the voltage at P. If the voltage P is too small, then the duration of the constant ON time is increased, which will result in an increase in the voltage P. If the voltage P is too large, then the duration of the constant ON time is decreased, which will result in a decrease in the voltage P. In that manner, the voltage P is kept within preset limits. Note that the "constant ON time" is effectively constant over one AC input cycle period, but can slowly change over many AC cycles. That approach enables near ideal PFC while allowing the storage voltage, P to be kept within the desired limits.

Diode D2 can optionally be supplemented with a synchronous rectifier SR for improved efficiency.

Switch S2 may be bipolar blocking. As is well known in the art, bipolar blocking can be accomplished by placing two opposed switches in series, or by placing a diode in series with a single switch.

In the case of two opposed switches, and with a controllable synchronous rectifier SR, the power converter may be made bidirectional while maintaining near-ideal PFC. The supplemental buck converter can function as a flyback converter operating in the opposite direction. To move energy from the output OUT to storage capacitor CP, switch S2 is closed while the synchronous rectifier switch SR is closed. Energy is then loaded into inductor L2 from capacitor CO. When the output has reached the regulation point, opening switch S2 causes flyback in winding L2 which forward biases diode D3, moving power to storage capacitor CP. Switch S3 can be closed to perform synchronous rectification to improve the efficiency of that transfer of energy to storage capacitor CP.

In the bidirectional case, the CONTROL AND SWITCH DECODE block would, after the transfer of input energy to storage, initiate a reverse energy transfer whenever the output filter was found to hold excess energy.

The diode AUX RECT may also be synchronously rectified for better efficiency.

It will be evident to those skilled in the art that the power converter of FIG. 42 can be modified. For example, the CONTROL AND SWITCH DECODE block could regulate output current instead of output voltage by comparing the output current to a reference current. Multiple outputs can be supported by adding additional bipolar blocking switches and output filter capacitors. The reference REF could be an AC signal, for amplifier operation. A rechargeable battery could be placed in parallel with storage capacitor CP for UPS operation. The isolation block ISOLATION can be eliminated in cases where isolation is not required. The input could be a DC voltage, with the constant ON time function used to reduce fluctuations in the input current. The clock frequency can be reduced at low loads to improve efficiency, and to minimize standby power.

The location of the regulation intelligence on the isolated, secondary side of the power converter offers advantages for ease of digital control. The topology is suited to a wide range of input and output voltages. Power can be scaled from a few Watts to well over 100 Watts, limited by the maximum energy storage capacity of the transformer.

Figure 43:
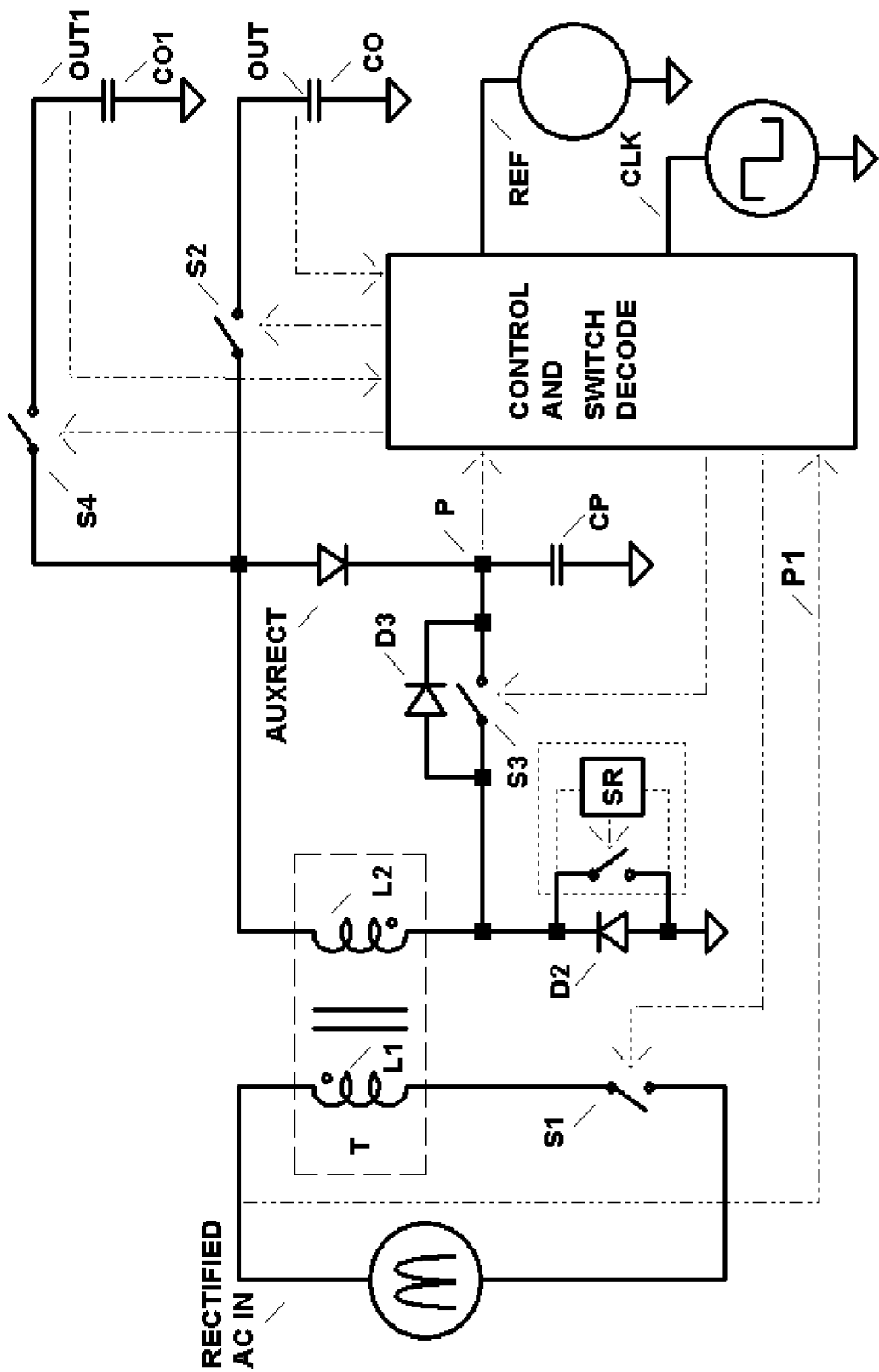
FIG. 43 shows a Power Factor Corrected power converter with a simple transformer, equi-polar storage voltage, and multiple regulated outputs.

FIG. 43 shows a Power Factor Corrected power converter with a transformer, equi-polar storage voltage, and multiple regulated outputs. The converter shown has two outputs and no isolation. The control is much the same as that of the converter of FIG. 42 with the addition of a second output voltage OUT1, as filtered by capacitor CO1.

Because the ISOLATION block of FIG. 42 has been removed, the Start-up Osc block is unnecessary. The CONTROL AND SWITCH DECODE block can be powered from the RECTIFIED AC IN via path P1 until the power converter has started normal operation. Then, the CONTROL AND SWITCH DECODE block can be powered more efficiently from the output. Note that, although not explicitly indicated in FIG. 43, path P1 can inform the CONTROL AND SWITCH DECODE block of the instantaneous polarity of the AC input for variations employing a split transformer winding for rectification, regardless of whether power is supplied to the CONTROL AND SWITCH DECODE block via path P1.

Control differs from FIG. 42 to accommodate the second output voltage. The addition of bipolar-blocking switch S4 allows regulation of the second output voltage. One possible sequence of switch operation is described here.

At the start of a cycle, switch S1 is activated for a constant ON time, energizing the primary winding L1 of transformer T. Switch S3 will be off during the constant ON time.

Switches S2 and S4 should not conduct during this time period, but may be closed if in series with diodes, because the diodes will block conduction during this time period. Energy is available at the secondary winding L2 of transformer T when switch S1 is opened. The transformer T is shown polled such that the inductive energy will be in the correct polarity to directly service a positive output at output node OUT. That inductive energy is provided through diode D2 and switch S2, which may be turned on by the CONTROL AND SWITCH DECODE block after switch S1 is turned off. Energy transfer continues until 1) the inductive energy is exhausted or 2) the regulation requirement is met at output node OUT, whichever comes first. If the regulation requirement is met, then the CONTROL AND SWITCH DECODE block opens switch S2. If output node OUT1 requires energy to reach regulation and there is remaining inductive energy in transformer T, then switch S4 is closed to transfer inductive energy to output node OUT1. If the point of regulation for output node OUT1 is reached, then switch S4 is opened so that any remaining inductive energy in transformer T is transferred to storage element CP through diode AUXRECT. The regulation points for output nodes OUT and OUT1 may be in (the same or different) ratio to reference REF, or there may be a second reference (not shown) for the purpose.

If the regulation requirements are met, then both the Power Factor Correction and output regulation requirements for the control cycle will have been met, so there is no further activity until the next cycle begins. If the inductive energy is exhausted before both regulation requirements are met, then the supplemental power path may then provide supplemental energy to support the outputs OUT and/or OUT1. Assuming neither output reached the regulation point, the CONTROL AND SWITCH DECODE block closes switch S3 while switch S2 remains closed. Since voltage P is larger than either output voltage, winding L2 acts as a buck inductor with diode D2 performing as a freewheeling diode. When sufficient energy has been placed in inductor L2 to support both output nodes OUT and OUT1 (as determined by the CONTROL AND SWITCH DECODE block, the CONTROL AND SWITCH DECODE block opens switch S3. When output OUT reaches regulation, the CONTROL AND SWITCH DECODE block opens switch S2 and closes switch S4. When output OUT1 reaches the regulation point, the CONTROL AND SWITCH DECODE block opens switch S4. The next operating cycle for the power converter begins with the next clock signal CLK.

If one or the other output did not need supplemental energy in the course of any particular cycle, then the steps to supply that output with supplemental energy are skipped by the CONTROL AND SWITCH DECODE block.

The mechanism for keeping the storage voltage P within limits can be the same as that described for FIG. 42.

Alternative control sequences achieving the same or an analogous purpose will be evident to those skilled in the art. For example, the two outputs could be addressed, one each, in alternate control cycles, or each output could have its own energize and transfer periods within one control cycle. Excess energy can be loaded into the transformer during supplemental energy transfers and then returned to storage at the end of the cycle.

Other variations include adding more than one additional output, using bidirectional energy transfers as taught for FIG. 42, or employing entirely separate means for regulating the additional outputs. Diodes can optionally be made synchronous rectifiers, for example, SR, to improve efficiency.

The input is here shown as a rectified AC input. An un-rectified input can be accommodated by employing the split primary winding of FIG. 20 with the switching configured to match that shown in the UNISOLATED SIDE of that figure.

The power converters of FIGS. 14, 17, 20, 24, 27, 31, 33, 36, 38, and 40 and other embodiments of the invention that are not explicitly shown, including the power converters of FIGS. 12 and 13 of the '722 application, are switched-mode power converters that have at least one feature in common: they all have at least one multi-functional inductor on the output side of the power converter that supports both main regulation and supplemental regulation in a time-multiplexed manner within a single control cycle of the power converter, such that (i) during main regulation, input energy is transferred from the power converter's input node to the power converter's output node via the inductor and (ii) during supplemental regulation, stored energy is transferred from at least one energy storage element on the output side of the power converter to the output node via the inductor. In particular:

- In FIGS. 14, 17, 20, and 24, the secondary winding L2 is such a multi-functional inductor;
- In FIGS. 27, 31, and 33, the two secondary windings L2 and L3 are both examples of such multi-functional inductors; and
- In FIGS. 36, 38, and 40, the buck inductor L is such a multi-functional inductor.

In some embodiments, if, during main regulation, the output demand is satisfied and there is excess inductor energy in the multi-functional inductor, then the excess energy may be transferred to an energy storage device as part of main regulation.

In general and depending on the particular embodiment, a power converter of the invention can be configured to support some or all of the following operations:

Operation (1): Transfer of input energy from the input node to a multi-functional inductor;
Operation (2): Transfer of output energy from the output node to a multi-functional inductor;
Operation (3): Transfer of stored energy from an energy storage element to a multi-functional inductor;
Operation (4): Transfer of inductor energy from a multi-functional inductor to the output node; and
Operation (5): Transfer of inductor energy from a multi-functional inductor to an energy storage element.

Depending on the particular embodiment, a power converter of the invention can be configured to perform some or all of those five operations in different sequences of operations during the course of a control cycle to handle a variety of different scenarios. For example, if, at the start of a control cycle, (i) the polarity of the input signal matches the polarity of the output demand and (ii) the output energy is deficient, and if the output demand is not satisfied during the main regulation, then the power converter of FIG. 14 can be configured to perform the following sequence of four steps during the control cycle:

Step 1: Operation (1): Transfer of input energy from the input node AC IN to the secondary winding L2 via primary winding L1 of transformer T (switch S1 closed; switches S2, S3, S4 open)—energize phase of first half of control cycle—part of main regulation;

Step 2: Operation (4): Transfer of inductor energy from winding L2 to the output node OUT via switch S3 (S3 closed; S1, S2, S4 open)—transfer phase of first half of control cycle—part of main regulation;

Step 3: Operation (3): Depending on polarity of output demand, transfer of stored energy to winding L2 either (i) from storage capacitor CP via switch S4 (S4 closed; S1, S2, S3 open) or (ii) from storage capacitor CN via switch S2 (S2 closed; S1, S3, S4 open)—energize phase of second half of control cycle—part of supplemental regulation; and Step 4: Operation (4): Transfer of inductor energy from winding L2 to output node OUT via switch S3 (S3 closed; S1, S2, S4 open)—transfer phase of second half of control cycle—part of supplemental regulation.

If instead, at the start of a control cycle, (i) the polarity of the input signal matches the polarity of the output demand and (ii) the output energy is deficient, but the output demand is satisfied during main regulation, then the power converter of FIG. 14 can be configured to perform the following sequence of three steps during the control cycle:

Step 1: Operation (1): Transfer of input energy from the input node AC IN to the secondary winding L2 via primary winding L1 (S1 closed; S2, S3, S4 open)— energize phase of first half of control cycle—part of main regulation;

Step 2: Operation (4): Transfer of inductor energy from winding L2 to the output node OUT via switch S3 (S3 closed; S1, S2, S4 open)—transfer phase of first half of control cycle—part of main regulation; and Step 3: Operation (5): Depending on polarity of inductor energy, transfer of excess inductor energy, if any, from winding L2 to either storage capacitor CP via switch S4 (S4 closed; S1, S2, S3 open) or storage capacitor CN via switch S2 (S2 closed; S1, S3, S4 open)—storage transfer phase of first half of control cycle—part of main regulation.

If, at the start of a control cycle, the polarity of the input signal does not match the polarity of the output demand, then the power converter of FIG. 14 can be configured to perform the following sequence of four steps during the control cycle:

Step 1: Operation (1): Transfer of input energy from the input node AC IN to the secondary winding L2 via primary winding L1 (S1 closed; S2, S3, S4 open)— energize phase of first half of control cycle—part of main regulation;

Step 2: Operation (5): Depending on polarity of input energy, transfer of inductor energy from winding L2 to either storage capacitor CP via switch S4 (S4 closed; S1, S2, S3 open) or storage capacitor CN via switch S2 (S2 closed; S1, S3, S4 open)—transfer phase of first half of control cycle—part of neither main nor supplemental regulation;

Step 3: Operation (3): Depending on polarity of output demand, transfer of stored energy to winding L2 either (i) from storage capacitor CP via switch S4 (S4 closed; S1, S2, S3 open) or (ii) from storage capacitor CN via switch S2 (S2 closed; S1, S3, S4 open)—energize phase of second half of control cycle—part of supplemental regulation; and Step 4: Operation (4): Transfer of inductor energy from winding L2 to the output node OUT via switch S3 (S3 closed; S1, S2, S4 open)—transfer phase of second half of control cycle—part of supplemental regulation.

If, at the start of a control cycle, there is excess energy at the output node OUT, then the power converter of FIG. 14 can be configured to perform the following sequence of four steps during the control cycle:

Step 1: Operation (2): Transfer of excess output energy from the output node OUT to the secondary winding L2 via switch S3 (S3 closed; S1, S2, S4 open)—energize phase of first half of control cycle—part of main regulation;

Step 2: Operation (5): Depending on polarity of inductor energy, transfer of inductor energy from winding L2 to either storage capacitor CP via switch S4 (S4 closed; S1, S2, S3 open) or storage capacitor CN via switch S2 (S2 closed; S1, S3, S4 open)—transfer phase of first half of control cycle—part of main regulation;

Step 3: Operation (1): Transfer of input energy from the input node AC IN to the secondary winding L2 via primary winding L1 (S1 closed; S2, S3, S4 open)— energize phase of second half of control cycle—part of PFC regulation; and Step 4: Operation (5): Depending on polarity of inductor energy, transfer of inductor energy from winding L2 to either storage capacitor CP via switch S4 (S4 closed; S1, S2, S3 open) or storage capacitor CN via switch S2 (S2 closed; S1, S3, S4 open)—transfer phase of second half of control cycle—part of PFC regulation.

Given the teachings of this specification, those skilled in the art will understand how some or all of the five different operations listed above can be sequenced to perform main and/or supplemental regulation for some of the other power converter embodiments of the invention. Because Operation (1) can admit AC input current in proportion to AC input voltage, power converter embodiments of the invention are able to perform near-ideal PFC. Operation (5) will complete through diode D4 or D2 without turning on S4 or S2, but at slightly reduced efficiency.

All the examples shown employ a 200 kHz clock, and all waveforms are shown while driving representative resistive loads. All are capable of running at other clock frequencies and with other input frequencies or voltages, and serving various loads. Most can run from DC input voltages, where constant (or limited rate of change) input current can be an advantage. All unipolar examples, with minor modifications evident to those skilled in the art, can operate in the opposite polarity. With large storage reservoirs, these topologies can serve as Uninterruptible Power Supplies (UPSs) with the capacitors providing hold-over energy. Synchronous rectification can be added to many of these topologies. All can use a volt-time product for terminating energize periods instead of current sensing. Given synchronous rectification capabilities for terminating energy transfers, current sense resistors can be eliminated. Many of these topologies can make good use of bipolar blocking GaN switches.

Although the invention has been described in the context of embodiments in which capacitors are used as energy storage elements, in other embodiments, other types of energy storage elements may be used such as (without limitation) batteries and super-capacitors.

Other variations of these examples will be evident to those skilled in the art. Those variations include, but are not limited to, regulating current instead of voltage at an output, adding additional output ports, using series diodes to avoid the need for bipolar blocking switches, and removing the ISOLATION block for applications where isolation is not required.

Different topologies show different optimization for flexibility, simplicity, efficiency, size, and cost. Predictive Energy Balancing can improve the regulation of many of these topologies, but is not necessary.

Signals and corresponding terminals, nodes, ports, or paths may be referred to by the same name and are interchangeable for purposes here.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Glossary unipolar: Exclusively positive or exclusively negative.

bipolar output: An output that can operate in both the positive and negative quadrants.

bidirectional regulation: Regulation that can move energy to or take energy from an output.

bipolar blocking switch: A switch that can block the flow of current, regardless of the polarity of the voltage across the switch.

Power Factor Correction (PFC): Control which causes input current to be drawn in proportion to input voltage.

storage reservoir or storage element: A capacitor, super capacitor, or rechargeable battery or other reversible medium for storing energy.

main regulation: Regulation provided by moving energy from an input to an output.

supplemental regulation: Regulation provided by moving energy from a storage reservoir to an output.

time-multiplexed: Using the same element or structure in different ways at different times.

Predictive Energy Balancing (PEB): A control technique that is taught in U.S. Pat. Nos. 7,642,758, 7,965,064, and 8,570,008, the teachings of which are incorporated herein by reference, and in various articles in the trade press.

forward transfer: The movement of energy from input to output.

reverse transfer: The movement of energy from output to a storage reservoir.

flyback transfer: The voltage-inverting movement of energy into and out of an inductor.

forward transfer: An energy transfer via a transformer where current flows in both the unisolated winding and the isolated winding at the same time.

What is claimed is:

1. An article of manufacture comprising a controller for a power converter for converting input power into regulated output power, the power converter comprising:
   the controller;
   an input node configured to receive the input power;
   a first output node configured to provide the regulated output power;
   a first inductive element;
   a first supplemental energy storage element;
   a first energy gating element configured to enable the first inductive element to be energized from the input node; and
   a supplemental regulator configured to enable energy to be transferred from the first supplemental energy storage element to the first output node, wherein the controller is configured to provide:
   (A) an input-to-output power path in which energy flows from the input node to the first output node via the first inductive element;
   (B) an input-to-storage power path in which energy flows from the input node to the first supplemental energy storage element via the first inductive element; and
   (C) a storage-to-output power path in which energy flows from the first supplemental energy storage element to the first output node via the supplemental regulator, wherein the controller is configured to actively control whether energy flows from the first inductive element to (i) the first output node or (ii) the first supplemental energy storage element.

2. The article of claim 1, wherein the power converter further comprises:
   a second energy gating element configured to enable energy to be transferred from the first inductive element to the first output node; and
   a third energy gating element configured to enable energy to be transferred from the first inductive element to the first supplemental energy storage element, wherein:
   for the input-to-output power path, the controller configures the power converter such that energy flows from the input node to the first output node via the first inductive element and the second energy gating element;
   for the input-to-storage power path, the controller configures the power converter such that energy flows from the input node to the first supplemental energy storage element via the first inductive element and the third energy gating element; and
   the controller is configured to actively control whether energy flows from the first inductive element to (i) the first output node via the second energy gating element or (ii) the first supplemental energy storage element via the third energy gating element.

3. The article of claim 2, wherein:
   the supplemental regulator is a buck converter comprising a second inductive element connected to a fourth energy gating element; and
   for the storage-to-output power path, the controller is configured to control the fourth energy gating element to enable energy to flow from the first supplemental energy storage element through the second inductive element to the first output node.

4. The article of claim 1, wherein the controller is configured to operate the power converter to move a majority of the input power from the input node to the regulated output power at the first output node via a single stage of power conversion.

5. The article of claim 4, wherein the controller is configured to perform power factor correction to greater than 0.98.

6. The article of claim 1, wherein the controller is configured to actively control whether energy flows from the first inductive element to the first output node or to the first supplemental energy storage element based on a determination of satisfaction of an output demand at the first output node.

7. The article of claim 6, wherein, if the power converter is configured such that energy is flowing from the first inductive element to first output node, when the controller determines that the output demand has been satisfied, the controller re-configures the power converter such that energy flows from the first inductive element to the first supplemental energy storage element.

8. The article of claim 6, wherein the controller is configured to determine that the output demand has been satisfied by comparing a feedback voltage dependent on the output voltage to a reference voltage.

9. The article of claim 1, wherein the controller is configured to maintain a constant on time for the first energy gating element over at least half of a single AC cycle of the input power.

10. The article of claim 1, wherein the controller is configured to control the first energy gating element by admitting input current flowing into the first inductive element from the input node in proportion to input voltage at the input node.

11. The article of claim 1, wherein:
for the input-to-output power path, the controller is configured to compare a feedback voltage dependent on the output voltage to a first reference voltage to determine if an output demand at the first output node has been satisfied;
for the storage-to-output power path, the controller is configured to compare the feedback voltage to a second reference voltage to determine if the output demand has been satisfied; and
the second reference voltage is smaller in magnitude than the first reference voltage to prevent the supplemental regulator from operating when the input-to-output power path can provide sufficient power to satisfy the output demand.

12. The article of claim 1, wherein the controller is configured to maintain a voltage level of the first supplemental energy storage element within a range whose voltage level values are all larger in magnitude than a voltage level of the first output node.

13. The article of claim 1, wherein:
the first inductive element is a transformer comprising oppositely poled first and second primary windings and a secondary winding;
the first energy gating element is configured to enable the first primary winding to be energized from the input node;
a second energy gating element is configured to enable the second primary winding to be energized from the input node; and
the controller is configured to control the first and second energy gating elements based on instantaneous input polarity of the input power to ensure that input energy appears in the same polarity at the secondary winding regardless of the instantaneous input polarity.

14. The article of claim 1, wherein:
the supplemental regulator comprises a second inductive element;
for the input-to-output power path, the controller configures the power converter such that energy flows from the input node to the first output node via the first inductive element and the second inductive element;
for the input-to-storage power path, the controller configures the power converter such that energy flows from the input node to the first supplemental energy storage element via the first inductive element; and
for the storage-to-output power path, the controller configures the power converter such that energy flows from the first supplemental energy storage element to the first output node via the second inductive element.

15. The article of claim 14, wherein the controller is configured to provide a second input-to-storage path in which energy flows from the input node to the first supplemental energy storage element via the first inductive element.

16. The article of claim 14, wherein, after determining that an output demand at the first output node has been satisfied, the controller selectively configures the power converter to transfer remaining energy in the second inductive element either (i) the first output node or (ii) the first supplemental energy storage element.

17. The article of claim 14, wherein the power converter is a forward power converter.

18. The article of claim 17, wherein a primary-side controller is configured to (1) generate an integrated energy value based on energy moved into the first inductive element and (2) compare the integrated energy value to a reference value that is in proportion to input voltage at the input node to determine when to open the first energy gating element.

19. The article of claim 1, wherein:
the power converter is a flyback power converter;
the first inductive element is a transformer comprising a primary winding and a secondary winding;
the secondary winding is part of the supplemental regulator;
the input node, the first output node, and the first supplemental energy storage element have the same polarity;
for the input-to-output power path, the controller configures the power converter such that energy flows from the input node to the first output node via the transformer;
for the input-to-storage power path, the controller configures the power converter such that energy flows from the input node to the first supplemental energy storage element via the transformer; and
for the storage-to-output power path, the controller configures the power converter such that energy flows from the first supplemental energy storage element to the first output node via the secondary winding.

20. The article of claim 19, wherein, after determining that an output demand at the first output node has been satisfied, the controller selectively configures the power converter to transfer remaining energy in the secondary winding to either (i) the first output node or (ii) the first supplemental energy storage element.

21. The article of claim 19, wherein:
the power converter further comprises a second output node;
the controller is further configured to provide:
a second input-to-output power path in which energy flows from the input node to the second output node via the transformer; and
a second storage-to-output power path in which energy flows from the first supplemental energy storage element to the second output node via the secondary winding;
the controller is configured to actively control whether energy flows from the secondary winding to (i) the first output node, (ii) the first supplemental energy storage element, or (iii) the second output node; and
the controller is configured to actively control whether energy flows from the first supplemental energy storage element to (1) the first output node via the secondary winding or (2) the second output node via the secondary winding.

22. The article of claim 19, wherein the controller is configured to operate the power converter as a bidirectional power converter.

23. The article of claim 1, wherein:
the first inductive element is a transformer having two oppositely poled secondary windings; and the controller is configured to actively control the power converter to support:
(1) transfer of energy from either secondary winding to the first supplemental energy storage element; and
(2) transfer of energy from either secondary winding to the first output node.

24. The article of claim 23, wherein:
the power converter is a bidirectional power converter; and
the controller is further configured to provide an output-to-storage power path in which energy flows from the first output node to the first supplemental energy storage element.

25. The article of claim 1, further comprising a second supplemental energy storage element, wherein the controller is configured to actively control the power converter to support:
(1) transfer of energy from the first inductive element to either the first or second supplemental energy storage element; and
(2) transfer of energy from either the first or second supplemental energy storage element to the first output node.

26. The article of claim 25, wherein:
the power converter is a bidirectional power converter; and
the controller is further configured to provide:
(a) a first output-to-storage power path in which energy flows from the first output node to the first supplemental energy storage element; and
(b) a second output-to-storage power path in which energy flows from the first output node to the second supplemental energy storage element.

27. The article of claim 1, wherein:
the power converter is a bidirectional power converter; and
the controller is further configured to provide an output-to-storage power path in which energy flows from the first output node to the first supplemental energy storage element.

28. The article of claim 1, wherein the power converter is a bipolar power converter.

29. The article of claim 1, wherein the article is the controller.

30. The article of claim 1, wherein the article is the power converter.

* * * * *

UNITED STATES PATENT AND TRADEMARK OFFICE
CERTIFICATE OF CORRECTION

PATENT NO. : 9,960,696 B2  
APPLICATION NO. : 15/245282  
DATED : May 1, 2018  
INVENTOR(S) : Thomas E. Lawson and William H. Morong Page 1 of 1

It is certified that error appears in the above-identified patent and that said Letters Patent is hereby corrected as shown below:

On the Title Page

Item (73) assignee name, "CognilPower" should be --CogniPower--.

Signed and Sealed this  
Twenty-sixth Day of June, 2018

Andrei Iancu  
*Director of the United States Patent and Trademark Office*